United States Patent
Wootton et al.

(10) Patent No.: US 9,235,704 B2
(45) Date of Patent: Jan. 12, 2016

(54) SYSTEM AND METHOD FOR A SCANNING API

(75) Inventors: Bruce Wootton, Alameda, CA (US); Kevin Patrick Mahaffey, San Francisco, CA (US); Timothy Micheal Wyatt, Oakland, CA (US)

(73) Assignee: LOOKOUT, INC., San Francisco, CA (US)

( * ) Notice: Subject to any disclaimer, the term of this patent is extended or adjusted under 35 U.S.C. 154(b) by 471 days.

(21) Appl. No.: 13/335,779

(22) Filed: Dec. 22, 2011

(65) Prior Publication Data

US 2012/0110174 A1 May 3, 2012

Related U.S. Application Data

(63) Continuation-in-part of application No. 12/868,676, filed on Aug. 25, 2010, which is a continuation-in-part of application No. 12/255,621, filed on Oct. 21, 2008.

(51) Int. Cl.
*G06F 21/56* (2013.01)
*H04L 29/06* (2006.01)
*H04W 4/00* (2009.01)
*G06F 11/34* (2006.01)

(52) U.S. Cl.
CPC .......... *G06F 21/564* (2013.01); *H04L 63/1416* (2013.01); *H04W 4/00* (2013.01); *G06F 11/3409* (2013.01); *G06F 2213/0038* (2013.01)

(58) Field of Classification Search
CPC .............. G06F 21/564; G06F 11/3409; G06F 2213/0038; H04W 4/00; H04L 63/1416
USPC .......................................................... 726/30
See application file for complete search history.

(56) References Cited

U.S. PATENT DOCUMENTS

| | | | |
|---|---|---|---|
| 3,416,032 | A | 12/1968 | Jahns et al. |
| 4,553,257 | A | 11/1985 | Mori et al. |
| 5,319,776 | A | 6/1994 | Hile et al. |
| 5,574,775 | A | 11/1996 | Miller, II et al. |
| 5,715,518 | A | 2/1998 | Barrere et al. |

(Continued)

FOREIGN PATENT DOCUMENTS

| | | |
|---|---|---|
| GB | 2430588 A1 | 3/2007 |
| WO | WO2005101789 A1 | 10/2005 |

(Continued)

OTHER PUBLICATIONS

Wassermann et al., Static Detection of Cross-Site Scripting Vulnerabilities, May 2008, ACM/IEEE International Conference on Software Engineering, pp. 171-180.*

(Continued)

*Primary Examiner* — Kenneth Chang
(74) *Attorney, Agent, or Firm* — Dergosits & Noah LLP

(57) ABSTRACT

Application programs for mobile communication devices are stored in a data store. The applications may be collected from any number of different sources such as through an application programming interface (API), from web crawling, from users, or combinations of these. The applications are analyzed and the analysis results reported. The applications may be "continuously" analyzed so that any changes in assessments can be reported. If an application for which an analysis is sought is not in the data store, information about a different, but related application may be provided.

20 Claims, 19 Drawing Sheets

(56) References Cited

U.S. PATENT DOCUMENTS

| | | | |
|---|---|---|---|
| 6,185,689 B1 | 2/2001 | Todd et al. |
| 6,269,456 B1 | 7/2001 | Hodges et al. |
| 6,272,353 B1 | 8/2001 | Dicker et al. |
| 6,301,668 B1 | 10/2001 | Gleichauf et al. |
| 6,453,345 B2 | 9/2002 | Trcka et al. |
| 6,529,143 B2 | 3/2003 | Mikkola et al. |
| 6,696,941 B2 | 2/2004 | Baker |
| 6,792,543 B2 | 9/2004 | Pak et al. |
| 6,892,225 B1 | 5/2005 | Tu et al. |
| 6,907,530 B2 | 6/2005 | Wang |
| 6,959,184 B1 | 10/2005 | Byers et al. |
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,237 B2 | 1/2007 | Schneier et al. |
| 7,171,690 B2 | 1/2007 | Kouznetsov et al. |
| 7,178,166 B1 * | 2/2007 | Taylor et al. ............ 726/25 |
| 7,181,252 B2 | 2/2007 | Komsi |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,290,276 B2 | 10/2007 | Ogata |
| 7,304,570 B2 | 12/2007 | Thomas et al. |
| 7,305,245 B2 | 12/2007 | Alizadeh-Shabdiz |
| 7,308,256 B2 | 12/2007 | Morota et al. |
| 7,308,712 B2 | 12/2007 | Banzhof |
| 7,325,249 B2 | 1/2008 | Sutton et al. |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,392,544 B1 * | 6/2008 | Pavlyushchik ............ 726/24 |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,415,536 B2 | 8/2008 | Nakazawa |
| 7,433,694 B2 | 10/2008 | Morgan et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz |
| 7,525,541 B2 | 4/2009 | Chun et al. |
| 7,539,871 B1 * | 5/2009 | Osborn ................ 713/176 |
| 7,551,579 B2 | 6/2009 | Alizadeh-Shabdiz |
| 7,551,929 B2 | 6/2009 | Alizadeh-Shabdiz |
| 7,634,800 B2 | 12/2009 | Ide et al. |
| 7,685,132 B2 | 3/2010 | Hyman |
| 7,696,923 B2 | 4/2010 | Houri |
| 7,768,963 B2 | 8/2010 | Alizadeh-Shabdiz |
| 7,769,396 B2 | 8/2010 | Alizadeh-Shabdiz et al. |
| 7,774,637 B1 | 8/2010 | Beddoe et al. |
| 7,783,281 B1 | 8/2010 | Cook et al. |
| 7,809,353 B2 | 10/2010 | Brown et al. |
| 7,809,366 B2 | 10/2010 | Rao et al. |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,907,966 B1 | 3/2011 | Mammen |
| 7,916,661 B2 | 3/2011 | Alizadeh-Shabdiz et al. |
| 7,991,854 B2 | 8/2011 | Bahl |
| 7,992,135 B1 * | 8/2011 | Wong et al. ............ 717/126 |
| 7,999,742 B2 | 8/2011 | Alizadeh-Shabdiz et al. |
| 8,014,788 B2 | 9/2011 | Alizadeh-Shabdiz et al. |
| 8,019,357 B2 | 9/2011 | Alizadeh-Shabdiz et al. |
| 8,031,657 B2 | 10/2011 | Jones et al. |
| 8,037,203 B2 | 10/2011 | Accapadi et al. |
| 8,054,219 B2 | 11/2011 | Alizadeh-Shabdiz |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz |
| 8,108,555 B2 | 1/2012 | Awadallah et al. |
| 8,121,617 B1 | 2/2012 | LaGrotta et al. |
| 8,126,456 B2 | 2/2012 | Lotter et al. |
| 8,127,358 B1 * | 2/2012 | Lee ................ G06F 21/564 726/22 |
| 8,135,395 B2 | 3/2012 | Cassett et al. |
| 8,195,196 B2 | 6/2012 | Haran et al. |
| 8,244,799 B1 * | 8/2012 | Salusky ............ H04L 63/126 709/201 |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,302,193 B1 * | 10/2012 | Gardner et al. ............ 726/24 |
| 8,346,860 B2 | 1/2013 | Berg et al. |
| 8,356,080 B2 | 1/2013 | Luna et al. |
| 8,364,785 B2 | 1/2013 | Plamondon |
| 8,370,580 B2 | 2/2013 | Mobarak et al. |
| 8,370,933 B1 | 2/2013 | Buckler |
| 8,401,521 B2 | 3/2013 | Bennett et al. |
| 8,447,856 B2 | 5/2013 | Drako |
| 8,463,915 B1 | 6/2013 | Kim |
| 8,484,332 B2 | 7/2013 | Bush et al. |
| 8,504,775 B2 | 8/2013 | Plamondon |
| 8,726,391 B1 * | 5/2014 | Zhong et al. ............ 726/25 |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108058 A1 | 8/2002 | Iwamura |
| 2002/0183060 A1 | 12/2002 | Ko et al. |
| 2002/0191018 A1 | 12/2002 | Broussard |
| 2003/0028803 A1 | 2/2003 | Bunker et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken et al. |
| 2003/0120951 A1 * | 6/2003 | Gartside et al. ............ 713/201 |
| 2003/0131148 A1 | 7/2003 | Kelley et al. |
| 2003/0217109 A1 * | 11/2003 | Ordille et al. ............ 709/206 |
| 2003/0233581 A1 * | 12/2003 | Reshef ............ G06F 21/554 726/25 |
| 2004/0022258 A1 | 2/2004 | Tsukada et al. |
| 2004/0025042 A1 | 2/2004 | Kouznetsov et al. |
| 2004/0111643 A1 * | 6/2004 | Farmer ............ 713/201 |
| 2004/0133624 A1 | 7/2004 | Park |
| 2004/0158741 A1 * | 8/2004 | Schneider ............ 713/201 |
| 2004/0185900 A1 | 9/2004 | McElveen |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |
| 2005/0197099 A1 | 9/2005 | Nehushtan |
| 2005/0216759 A1 * | 9/2005 | Rothman et al. ............ 713/200 |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |

(56) References Cited

U.S. PATENT DOCUMENTS

| | | |
|---|---|---|
| 2005/0282533 A1 | 12/2005 | Draluk |
| 2006/0010497 A1* | 1/2006 | O'Brien et al. ............... 726/26 |
| 2006/0026283 A1 | 2/2006 | Trueba |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0090196 A1* | 4/2006 | van Bemmel et al. .......... 726/4 |
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011319 A1 | 1/2007 | McClure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Bryne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0078939 A1* | 4/2007 | Kallen ........................ 709/207 |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0143851 A1* | 6/2007 | Nicodemus et al. ........... 726/25 |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0174915 A1* | 7/2007 | Gribble et al. ................. 726/24 |
| 2007/0186282 A1 | 8/2007 | Jenkins |
| 2007/0190995 A1 | 8/2007 | Wang et al. |
| 2007/0214504 A1 | 9/2007 | Milani Comparetti et al. |
| 2007/0220608 A1 | 9/2007 | Lahti et al. |
| 2007/0240217 A1* | 10/2007 | Tuvell et al. .................. 726/24 |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0293263 A1 | 12/2007 | Eslambolchi et al. |
| 2007/0297610 A1 | 12/2007 | Chen et al. |
| 2008/0028470 A1 | 1/2008 | Remmington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Hershaft |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0148407 A1* | 6/2008 | Katkar ........................... 726/24 |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0209567 A1* | 8/2008 | Lockhart et al. ............... 726/25 |
| 2008/0235801 A1 | 9/2008 | Soderberg et al. |
| 2008/0244691 A1* | 10/2008 | Hilerio et al. .................. 726/1 |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0292487 A1 | 11/2009 | Duncan et al. |
| 2009/0293125 A1 | 11/2009 | Szor |
| 2010/0019731 A1 | 1/2010 | Connolly et al. |
| 2010/0064341 A1 | 3/2010 | Aldera |
| 2010/0088398 A1 | 4/2010 | Plamondon |
| 2010/0097494 A1 | 4/2010 | Gum et al. |
| 2010/0100591 A1 | 4/2010 | Burgess et al. |
| 2010/0100939 A1 | 4/2010 | Mahaffey et al. |
| 2010/0100959 A1 | 4/2010 | Mahaffey |
| 2010/0100963 A1 | 4/2010 | Mahaffey |
| 2010/0100964 A1 | 4/2010 | Burgess et al. |
| 2010/0154032 A1 | 6/2010 | Ollmann |
| 2010/0210240 A1 | 8/2010 | Mahaffey et al. |
| 2010/0240419 A1 | 9/2010 | Horino |
| 2010/0041946 A1 | 12/2010 | Anderson et al. |
| 2010/0313270 A1 | 12/2010 | Kim et al. |
| 2010/0317324 A1 | 12/2010 | Brown et al. |
| 2010/0332593 A1 | 12/2010 | Barash et al. |
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Burgess et al. |
| 2011/0145920 A1 | 6/2011 | Burgess et al. |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2012/0042382 A1 | 2/2012 | Mahaffey |
| 2012/0060222 A1 | 3/2012 | Burgess et al. |
| 2012/0072569 A1 | 3/2012 | Xu |
| 2012/0084836 A1 | 4/2012 | Mahaffey et al. |
| 2012/0084864 A1 | 4/2012 | Burgess et al. |
| 2012/0096555 A1 | 4/2012 | Mahaffey |
| 2012/0124239 A1 | 5/2012 | Shribman et al. |
| 2012/0159636 A1 | 6/2012 | Pandya et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0215938 A1 | 8/2012 | Fletcher et al. |
| 2012/0233695 A1 | 9/2012 | Mahaffey et al. |
| 2012/0259954 A1 | 10/2012 | McCarthy et al. |
| 2012/0278467 A1 | 11/2012 | Schneider |
| 2012/0303735 A1 | 11/2012 | Raciborski et al. |
| 2012/0317153 A1 | 12/2012 | Parthasarathy et al. |
| 2012/0317233 A1 | 12/2012 | Redpath |
| 2012/0317370 A1 | 12/2012 | Luna |
| 2012/0324076 A1 | 12/2012 | Zerr et al. |
| 2012/0324094 A1 | 12/2012 | Wyatt et al. |
| 2012/0324259 A1 | 12/2012 | Aasheim et al. |
| 2012/0324568 A1 | 12/2012 | Wyatt et al. |
| 2013/0013775 A1 | 1/2013 | Baumback et al. |
| 2013/0019311 A1 | 1/2013 | Swildens et al. |
| 2013/0023209 A1 | 1/2013 | Fisher et al. |
| 2013/0041946 A1 | 2/2013 | Joel et al. |
| 2013/0041974 A1 | 2/2013 | Luna et al. |
| 2013/0047034 A1 | 2/2013 | Salomon et al. |

(56) References Cited

U.S. PATENT DOCUMENTS

| | | | |
|---|---|---|---|
| 2013/0054796 | A1 | 2/2013 | Baumback et al. |
| 2013/0067054 | A1 | 3/2013 | Pulleyn et al. |
| 2013/0086682 | A1 | 4/2013 | Mahaffey et al. |

FOREIGN PATENT DOCUMENTS

| | | |
|---|---|---|
| WO | 2006110181 | 10/2006 |
| WO | 2007081356 | 7/2007 |
| WO | WO2008007111 A1 | 1/2008 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

U.S. Appl. No. 12/255,635. Prosecution history (including Office Action dated Mar. 24, 2011.).
U.S. Appl. No. 12/255,626. Prosecution history (including Office Action dated Feb. 1, 2011.).
U.S. Appl. No. 12/255,621. Prosecution history (including Office Action dated Apr. 13, 2011.).
U.S. Appl. No. 12/255,614. Prosecution history (including Office Action dated Apr. 14, 2011.).
McAfee, Internet Archive, Way Back Machine, available at <http://web.archive.org/web/20080517102505/www.mcafeesecure.com/us/technology-intro.jsp>, retrieved Feb. 23, 2011,2 pages.
Qualys, "Executive Dashbard," Internet Archive, Way Back Machine, available at <http://web.archive.org/web/200805071614171www.qualys.com/products/screens/?screen=Executive + Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerabilitLmanagement> retrieved Feb. 24, 2011, 1 page.
Teh, Joe, "Norton 360 Version 3.0 Review," Mar. 9, 2009, available at <http://techielobang.com/blog/2009/03/09/norton-360-version-30-review/> retrieved Feb. 23, 2011, 12 pages.
Windows Update, Internet Archive, Way Back Machine, available at <http://web.archive.org/web/20071022193017/http://en.wikipedia.org/wikilWindows_Update> retrieved Feb. 23, 2011, 3 pages.
Notification of Transmittal of the International Search Report and the Written Opinion of the International Searching Authority, of the Declaration for PCTUS2009/061370 mailed on Dec. 14, 2009.
Notification of Transmittal of the International Search Report and the Written Opinion of the International Searching Authority, of the Declaration for PCTUS2009/061372 mailed on Mar. 24, 2010.
Dashwire: Manage Your Cell Phone on the Web, News Blog, Jessica Dolcourt, Oct. 29, 2007 5:00 AM PCT pp. 1-3.
"Real world Computing" Jun. 16, 2008 (PC Pro) pp. 1.
"PhoneBak PDA Phone Anti-theft software for your PDA phone", 2007 Bak2u Pte (Singapore), pp. 1-4.
"PhoneBak PDA: Mobile Phone Theft Recovery Software", 2007 Westin Tech.
"F-Secure Mobile Security for S60 User's Guide," F-Secure Corporation 2009, 34 pages.
"Kaspersky Mobile Security," Kaspersky Lab 1997-2007, 1 page.
"Berry Locator," 2007, Mobireport LLC, 1 page.
"Java Virtual Machine," Wikipedia, Aug. 7, 2011, available at <http://en.wikipedia.org/wiki/Java_Virtual_Machine> retrieved Aug. 10, 2011, 7 pages.
"Firefox," Wikipedia, Jul. 20, 2011, available at <http://en.wikipedia.org/wiki/firefox> retrieved Aug. 10, 2011, 37 pages.
Grafio "Stay Secure," Opera Software, Sep. 29, 2008, available at <http://widgets.opera.com/widget/4495> retrieved Oct. 21, 2008, 4 pages.
"Symantec Endpoint Protection," Symantec, 2008, available at <http://www.symantec.com/business/products/family.jsp?familyid=endpointsecurity>, 6 pages.
"Symantec Mobile Security Suite for Windows Mobile," Symantec, 2008, available at <http://www.symantec.com/business/products/sysreq.jsp?pcid=2241&pvid=mobile_security_suite_1>, 5 pages.
"Norton Smartphone Security," Symantec, 2007, available at <http://www.symantec.com/norton/smartphone-security> retrieved Oct. 21, 2008, 2 pages.
U.S. Appl. No. 12/255,632. Prosecution history (including Notice of Allowance dated Nov. 3, 2011).
"Kaspersky Mobile Security," Kaspersky Lab 2008, available at <http://www.kaspersky.com/kaspersky_mobile_security> retrieved Sep. 11, 2008, 2 pages.
U.S. Appl. No. 12/255,614; Prosecution history (including OA dated Apr. 14, 2011).
Virus Total, VT Community, www.virustotal.com/index.html (dated Dec. 16, 2011) 44 pages.
Richardson, Alexis; "Introduction to RabbitMQ," Google UK, Sep. 25, 2008, available at <http://www.rabbitmq.com/resources/google-tech-talk-final/alexis-google-rabbitmq-talk.pdf>, retrieved Mar. 30, 2012, 33 pages.
Fisher, Oliver; "Malware? We Don't Need No Stinking Malware!," Google, Oct. 24, 2008, available at <http://googlewebmastercentral.blogspot.com/2008/10/malware-we-dont-need-no-stinking.html>, retrieved Mar. 30, 2012, 11 pages.
Reardon, Marguerite; "Mobile Phones That Track Your Buddies," Cnet, Nov. 14, 2006, available at <http://news.cnet.com/Mobile-phones-that-track-your-buddies/2100-1039_3-6135209.html>, retrieved Mar. 30, 2012, 4 pages.
Fette, Ian "Understanding Phishing and Malware Protection in Google Chrome," The Chromium Blog, Nov. 14, 2008, available at <http://blog.chromium.org/2008/11/understanding-phishing-and-malware.htm>, retrieved May 17, 2011, 6 pages.
Kincaid, Jason "Urban Airship Brings Easy Push Notifications to Android," TechCrunch, Aug. 10, 2010, available at <http://techcrunch.com/2010/08/10/urban-airship-brings-easy-push-notifications-to-android/>, retrieved Jun. 16, 2011, 5 pages.
Keane, Justin K.; "Using the Google Safe Browsing API from PHP," Mad Irish, Aug. 7, 2009, available at <http://www.madirish.net/node/245>, retrieved Mar. 30, 2012, 5 pages.
Jefferies, Charles P. "Webroot AntiVirus 2010 With Spy Sweeper Review," Notebook Review, Jun. 22, 2010, available at <http:// http://www.notebookreview.com/default.asp?newsID=5700&review=Webroot+AntiVirus+2010+With+Spy+Sweeper+Review>, retrieved May 18, 2011, 3 pages.
"F-Secure Mobile Security for S60 Users Guide", F-Secure Corporation 2009, pp. 1-34.
"PhoneBak: Mobile Phone Theft Recovery Software", 2007, Westin Tech.
Summerson, Cameron "5 Android Antivirus Apps Compared, Find Out Which Ones Are Worth Having!," Android Headlines, Mar. 8, 2011, available at <http://androidheadlines.com/2011/03/5-android-antivirus-apps-comapred-find-out-which-ones-are-worth-having.html>, retrieved Mar. 30, 2012, 9 pages.
"Android Cloud to Device Messaging Framework," Google Code Labs, available at <http://code.google.com/android/c2dm/>, retrieved Sep. 14, 2011, 9 pages.
"BlackBerry Push Service Overview," Dec. 16, 2009, available at <http://us.blackberry.com/developers/platform/pushapi.jsp#tab_tab_resources>, retrieved Sep. 14, 2011, 21 pages.
"eSoft unveils SiteFilter 3.0 for OEMs," Infosecurity, Mar. 23, 2010, available at <http://www.infosecurity-magazine.com/view/8273/esoft-unveils-sitefilter-30-for-oems/>, retrieved Mar. 30, 2012, 2 pages.
"Get the Physical Location of Wireless Router From its MAC Address (BSSID)," Coderrr, Sep. 10, 2008, available at <http://coderrr.wordpress.com/2008/09/10/get-the-physical-location-of-wireless-router-from-its-mac-address-bssid/>, retrieved Mar. 30, 2012, 13 pages.
"Hooking—Wikipedia, the Free Encyclopedia," Internet Archive Wayback Machine, Apr. 13, 2010, available at <http://web.archive.org/web/20100415154752/http://en.wikipedia.org/wiki/Hooking>, retrieved Mar. 30, 2012, 6 pages.

(56) References Cited

OTHER PUBLICATIONS

Mytton, David "How to Build an Apple Push Notification Provider Server (Tutorial)," Server Density, Jul. 10, 2009, available at <http://blog.serverdensity.com/2009/07/10/how-to-build-an-apple-push-notification-provider-server-tutorial/>, retrieved Apr. 2, 2012, 33 pages.
"Pidgin The Universal Chat Client," Pidign, available at <http://www.pidgin.im/>, retrieved Sep. 14, 2011, 14 pages.
Pogue, David "Simplifying the Lives of Web Users," The New York Times, Aug. 18, 2010, available at <http://www.nytimes.com/2010/08/19/technology/personaltech/19pogue.html>, retrieved May 17, 2011, 5 pages.
"Twilio Cloud Communications Web Service API for Building Voice and SMS Applications," Twilio available at <http://www.twilio.com>, retrieved Sep. 14, 2011, 12 pages.
"Understanding Direct Push," Microsoft, Feb. 18, 2009, available at <http://technet.microsoft.com/en-us/library/aa997252(v=exchg.80).aspx>, retrieved Mar. 30, 2012, 3 pages.
"Urban Airship: Powering Modern Mobile," available at <http://urbanairship.com/products/>, retrieved Sep. 16, 2011, 14 pages.
"zVeloDB URL Database," zVelo, available at <https://zvelo.com/technology/zvelodb-url-database>, retrieved Mar. 30, 2012, 2 pages.
Amazon.com: Mining the Web Discovering Knowledge from Hypertext Data (9781558607545): Soumen Chakrabarti: Books, Amazon available at <http://www.amazon.com/exec/obidos/ASIN/1558607544/>, retrieved Jun. 7, 2012, pp. 1-7.
Clickatell, available at <http://www.clickatell.com>, retrieved Sep. 14, 2011, 11 pages.
Diligenti, M., et al., Focused Crawling Using Context Graphs:, Proceedings of the 26th VLDB Conference, Cairo, Egypt, 2000, pp. 1-8.
PagerDuty, available at <http://www.pagerduty.com>, retrieved Sep. 14, 2011, 23 pages.
Prey, available at <http://preyproject.com/>, retrieved Jan. 10, 2012, 4 pages.
Real world Computing, Jun. 16, 2008 (PC Pro), pp. 1-2.
Simone, "Playing with ActiveMQ," Mostly Useless, Dec. 27, 2007, available at <http://www.mostly-useless.com/blog/2007/12/27/playing-with-activemq/>, retrieved Mar. 30, 2012, 6 pages.
Trillian, available at <http://www.trillian.im/>, retrieved Sep. 14, 2011, 24 pages.
U.S. Appl. No. 12/255,632. Prosecution history (including office action dated Apr. 13, 2011).
Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.
Sprint Nextel, Mobile Locator, Internet Archive, Way Back Machine, available at http://web.archive.org/web/20080901070835/http://www.nextel.com/en/solutions/gps/mobile_locator.html, 2 pages, Retrieved Jan. 16, 2013.
PCT International Preliminary Report on Patentability for PCT/US2011/049182; Mailed on Mar. 7, 2013; pp. 1-9.
"Virgin Media—Phone Lost or Stolen?", web page downloaded Apr. 11, 2013 from http://www.virginmobile.com/vm/ukCoverage.do?contentId=insurance.howdoi.sm283.
Jung, Jaeyeon et al. "DNS Performance and the Effectiveness of Caching," IEEE/ACM Transactions on Networking, vol. 10, Issue 5, Oct. 2002, pp. 589-603.
Wu, Yi et al. "Performance Analysis of DNS with TTL Value 0 as Location Repository in Mobile Internet," IEEE Wireless Communications and Networking Conference (WCNC), Mar. 11-15, 2007, pp. 3250-3255.
Liljeberg, M. et al. "Optimizing World-Wide Web for Weakly Connected Mobile Workstations: An Indirect Approach," Second International Workshop on Services Distributed and Networked Environments, Jun. 5-6, 1995, pp. 132-139.
Song, Hui and Cao, Guohong. "Cache-Miss-Initiated Prefetch in Mobile Environments," Dept. of Computer Science and Engineering, The Pennsylvania State University, Computer Communications, vol. 28, Issue 7, May 2, 2005, pp. 741-753.
"Sprint—Report that your device is lost or stolen", web page downloaded Apr. 11, 2013 from http://support.sprint.com/support/article/Report_that_your_device_is_lost_or_stolen/case-ba416758-20090629-143222.
Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.
PCT "International Search Report and Written Opinion of the International Searching Authority for PCT/US2013/027166", mailed on Jun. 19, 2013.

* cited by examiner

Fig 12. Combined KG/KB components.

//SYSTEM AND METHOD FOR A SCANNING API

CROSS-REFERENCE TO RELATED APPLICATIONS

This application is a continuation-in-part of U.S. patent application Ser. No. 12/868,676, entitled "SYSTEM AND METHOD FOR MOBILE COMMUNICATION DEVICE APPLICATION ADVISEMENT," filed on Aug. 25, 2010, which is a continuation-in-part of U.S. patent application Ser. No. 12/255,621, entitled "SYSTEM AND METHOD FOR ATTACK AND MALWARE PREVENTION," filed on Oct. 21, 2008, and are incorporated by reference herein. This application is related to the following co-pending U.S. patent applications: U.S. patent application Ser. No. 12/868,669, entitled "SYSTEM AND METHOD FOR SERVER-COUPLED MALWARE PREVENTION," and U.S. patent application Ser. No. 12/868,672, entitled "SYSTEM AND METHOD FOR SECURITY DATA COLLECTION AND ANALYSIS," all of which are incorporated by reference herein.

BACKGROUND

This disclosure relates generally to application programs for mobile communication devices, and specifically, to analyzing and providing information about the application programs.

Mobile app stores are experiencing astronomical growth. Analysts estimate that the total global mobile applications market is expected to be worth upwards of $25 billion in the next several years. Factors contributing to the growth include advancements in network technologies, the lowering of mobile data usage cost, and the growing adoption of smartphones. Application marketplaces such as the Android Market and Apple Apps Store have provided a new business model for developers, brands, device manufactures, advertisers, and many others.

With so many different applications coming to the market, it is becoming very difficult for marketplace owners to categorize the applications, identify which applications they would like to distribute, identify which applications they would like to not distribute, and generally, keep abreast of changes. While there are a great number of good applications, there is also a great number of bad or undesirable applications. It can be difficult to tell which is which.

Therefore, there is a need for systems and techniques to provide timely and up-to-date information on mobile application programs.

BRIEF DESCRIPTION OF THE FIGURES

This disclosure is illustrated by way of example and not limitation in the figures of the accompanying drawings, in which like references indicate similar elements, and in which.

DETAILED DESCRIPTION

Figure 1:
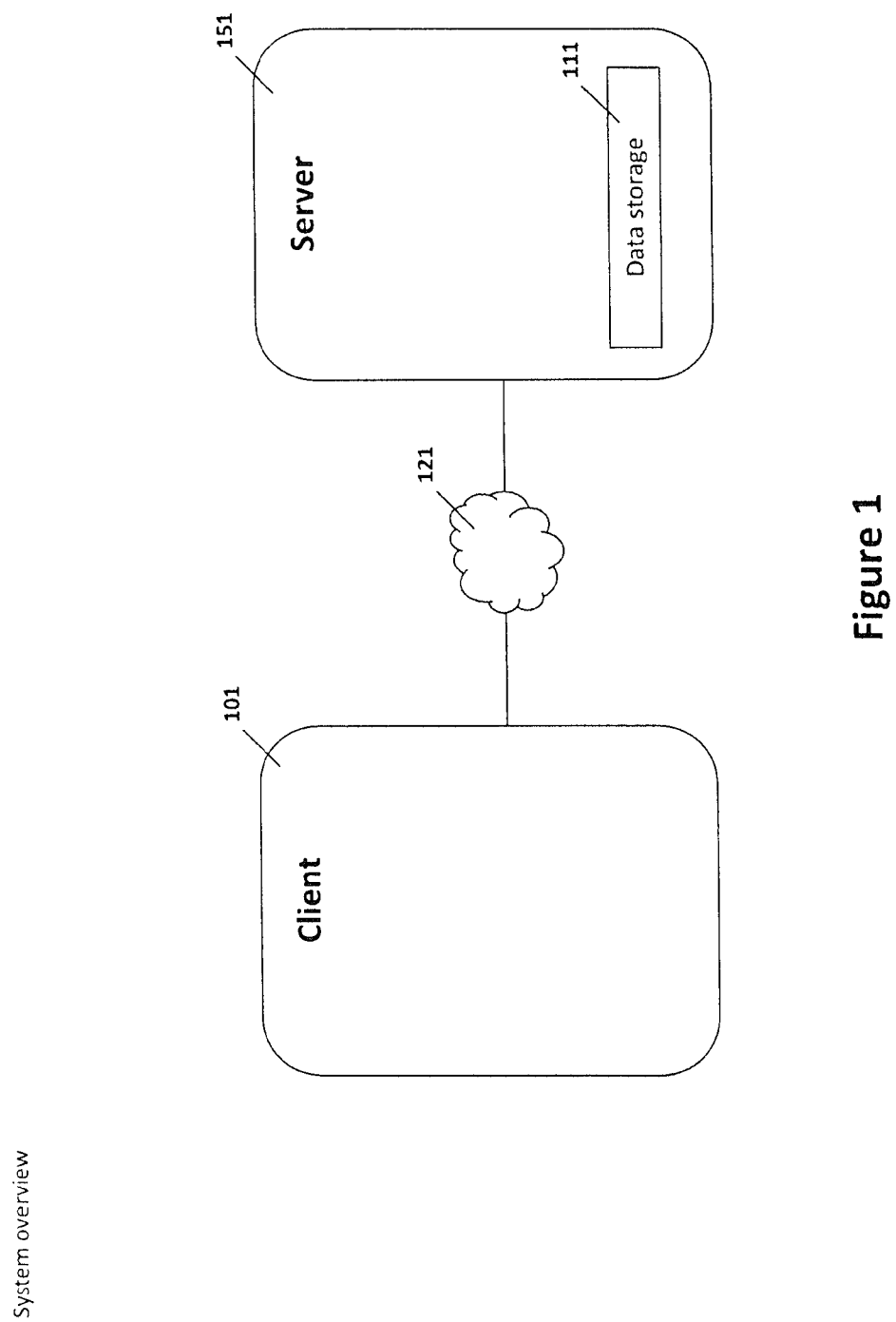
FIG. 1 is an exemplary block diagram depicting an embodiment of the disclosure.

This disclosure is directed to a system and methods for using a server to provide protection from and removal of undesired applications or other data objects that may affect a mobile communication device or plurality of mobile communication devices, regardless of the make or model of the mobile communication device(s), the mobile communication network, or the software applications present on the mobile communication device(s). As used herein, all of the services associated with the identification, analysis, and removal of potentially undesired applications or other data objects, as well as mobile communication device protection are described under the non-limiting term, "security." Thus, an embodiment of this disclosure is directed to providing security to a plurality of mobile communication devices, such as a plurality of mobile communication devices for a group of employees, or a plurality of mobile communication devices that access a particular network. An embodiment of this disclosure is directed to safely and securely gathering information about applications on mobile communication devices without taxing individual mobile communication devices or the mobile network and utilizing the information about applications to secure mobile communication devices. An embodiment of this disclosure is directed to using information gathered from mobile communication devices to generate user or device information that can be used to develop future products or services for mobile communication devices.

It should be appreciated that an embodiment of this disclosure can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein. One will appreciate that the mobile communication device described herein may include any computer or computing device running an operating system for use on handheld or mobile devices, such as smartphones, PDAs, tablets, mobile phones and the like. For example, a mobile communication device may include devices such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™. As used herein, the mobile communication device may also be referred to as a mobile device, a mobile client, or simply, as a device or as a client.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules or data objects or data items. Applications may be hardwired or hard coded in hardware or take the form of software executing on a general purpose computer such that when the software is loaded into and/or executed by the computer, the computer becomes an apparatus for practicing the disclosure. Applications may also be downloaded in whole or in part through the use of a software development kit or toolkit that enables the creation and implementation of an embodiment of the disclosure. In this specification, these implementations, or any other form that an embodiment of the disclosure may take, may be referred to as techniques. In general, the order of the steps of disclosed processes may be altered within the scope of the disclosure.

As previously mentioned, security services may be provided to one or more mobile communication devices by a server or group of servers that operate together. There are many possible ways in which multiple servers may operate together to provide security services without departing from the scope of this disclosure. An embodiment of this system is shown in FIG. 1, in which one or more servers 151 communicate with one or more mobile communication devices 101 over a cellular, wireless Internet or other network 121. As mentioned above, mobile communication device 101 may also be referred to as a "mobile client device," "client device," "device," or "client," and may be referred to in the singular or plural form. The one or more servers 151 may have access to a data storage 111 that stores security information for the one or more mobile communication devices 101. Data, assessment information, information about the mobile communication devices 101, or other objects for storage may be stored on servers 151 and/or data storage 111. Servers 151 or data storage 111 may be singular or plural, or may be physical or virtualized. Data storage 111 may be a database, data table, data structure, file system or other memory store. Data storage 111 may be hosted on any of the one or more servers 151, or may exist externally from the one or more servers 151, so long as the one or more servers 151 have access to data storage 111. In an embodiment, data storage 111 is an external service provided by a third-party, such as the Simple Storage Service (S3) or other products provided by Amazon Web Services, LLC. One will appreciate that the configuration of the system illustrated in FIG. 1 is non-limiting and merely exemplary, and that other configurations are possible without departing from this disclosure.

One will appreciate that communication between mobile communication device 101 and server 151 may utilize a variety of networking protocols and security measures. In an embodiment, server 151 operates as an HTTP server and the device 101 operates as an HTTP client. To secure the data in transit, mobile communication device 101 and server 151 may use Transaction Layer Security ("TLS"). Additionally, to ensure that mobile communication device 101 has authority to access server 151, and/or to verify the identity of mobile communication device 101, device 101 may send one or more identifiers or authentication credentials to server 151. For example, authentication credentials may include a user name and password, device-specific credentials, or any other data that identifies mobile communication device 101 to server 151. Authentication may allow server 151 to store information specific to mobile communication device 101 or an account associated with mobile communication device 101, to provide customized services to device 101, and to maintain a persistent view of the security status of mobile communication device 101.

In order to provide security services for mobile communication device 101, one having ordinary skill in the art will appreciate that mobile communication device 101 will transmit certain data to server 151. As will be discussed in more detail below, server 151 will analyze this data and provide a security related assessment, response and/or other action. The following describes the type(s) of data transmitted from mobile communication device 101 to server 151, the analysis performed by server 151, and the action taken with or by mobile communication device 101.

One will appreciate that an embodiment of this disclosure may exist independently on mobile communications device 101, or may be incorporated into an existing security system resident in the mobile communications device such as the one described in U.S. patent application Ser. No. 12/255,614, entitled "SYSTEM AND METHOD FOR MONITORING AND ANALYZING MULTIPLE INTERFACES AND MULTIPLE PROTOCOLS," filed on Oct. 21, 2008, and incorporated in full herein. One having ordinary skill in the art will also appreciate that in order to implement an embodiment of this disclosure on a variety of mobile communications device platforms, it may be necessary to incorporate a cross-platform system such as the one disclosed in U.S. patent application Ser. No. 12/255,626, entitled "SYSTEM AND METHOD FOR A MOBILE CROSS PLATFORM SOFTWARE SYSTEM," filed on Oct. 21, 2008, and incorporated in full herein. In addition, as discussed further below, aspects of this disclosure may be used to determine a security state for a mobile communications device 101, as described in U.S. patent application Ser. No. 12/255,632, entitled "SECURE MOBILE PLATFORM SYSTEM," filed on Oct. 21, 2008, and incorporated in full herein.

One having ordinary skill in the art will appreciate that mobile communication devices are exposed to different types of data. This data includes network data, files, executable and non-executable applications, emails, and other types of objects that can be transmitted to, received by, or installed on a mobile communications device. Mobile communication devices also typically transmit and receive data through one or more network interfaces, including Bluetooth, WiFi, infrared, radio receivers, and the like. Similarly, data may be encapsulated in a layered communications protocol or set of protocols, such as TCP/IP, HTTP, Bluetooth, etc. Current server-client security models, such as those currently available for desktop and laptop computers, cannot extend their capabilities to provide adequate assessment and security to a plurality of mobile communication devices.

This disclosure contemplates at least two types of data that can be used to evaluate and protect mobile communication devices. The first type of data includes data about a mobile communication device, i.e., "device data." Device data pertains to the state, capabilities, operating system, firmware version, memory capacity, available communication ports, battery limitations, hardware characteristics and other "baseline" information that may be common to all similar devices absent user customization. Device data may include the default specifications for a device as it is received from a manufacturer, service provider, or IT service. Device data may include state information common to all similar mobile communications after they have all been upgraded in some fashion. As will be discussed further below, device data may be used to evaluate whether vulnerabilities exist due to unguarded communication ports, operating system exploits, device-specific attacks, and the like.

A second type of data that can be used to evaluate mobile communication devices is data that pertains to a particular application, file, or object that may be installed or run on a mobile communication device. As used herein, this data is referred to as "application data." Application data includes both data objects and information about data objects, such as behavioral data or metadata. Data objects include application packages that may be particular to certain mobile communication devices. For example, iPhone OS devices typically use IPA files or APP packages, Android OS devices typically use APK files, Windows Mobile devices typically use CAB, EXE or DLL files, and Symbian OS devices typically use SIS files. Devices may also support cross-platform application formats such as the SWF format underlying Adobe's Flash runtime or JAR files that can be run on Java virtual machines.

Application data includes data objects that are malware or spyware, and thereby can negatively affect a mobile communication device. Malware and spyware include applications, files, and other data objects that are purposefully designed to adversely affect or steal information from a mobile communication device. Application data also includes data objects that are not designed for nefarious reasons, but may have coding flaws or other issues that can negatively affect a device. Application data also includes data objects that may be undesirable for various reasons. For example, a data object may be undesirable because it compromises privacy, overtaxes a device's battery or network connection, and/or has objectionable content. As used herein, "data objects" may also be referred to as "data items." Use of either term is not intended to limit the data to any one form.

Application data includes metadata about data objects. For example, metadata is information about a specific data object, rather than the data object itself. Metadata includes the location on a mobile communication device's filesystem where a data object is stored, a hash of the data object, the name of the data object, a unique identifier present in or associated with the data object such as a GUID or UUID, security information related to the data object such as its cryptographic signer information or level of permissions granted, and characteristics of how the data object is installed on or integrates with the mobile communication device's operating system. Metadata for a data object may also include from where the data object came (e.g., a URL from where it was downloaded, an application marketplace from which it was downloaded, a memory card from where it was installed or stored. Metadata may also be retrieved from an application marketplace. Such metadata, called marketplace metadata, includes information about a data object such as the number of downloads, user comments about the data object, the description of the data object, permissions requested by the data object, hardware or software requirements for the data object, information about the data object's author, the price of the data object, the language or languages supported by the data object, and other information that a marketplace may provide.

In an embodiment, application data also includes behavioral data. Behavioral data includes information about how an application interacts with or uses a mobile communication device's resources, such as memory usage, battery usage, network usage, storage usage, CPU usages, API usage, errors and crashes, network services connected to (e.g., remote host address and port), and runtime library linkage. Behavioral data also includes information about how an application, file or data object, when it is run, utilizes the functionalities of the mobile communication device's operating system, such as notifications and messaging between processes or installed applications.

As will be explained further below, both device data and application data are useful for providing an assessment of the security of a device based upon the data stored (e.g., installed applications) or passing through the device. One having ordinary skill in the art will appreciate that device data and application data are merely examples of the types of data that may used in order to safeguard a mobile communication device or provide other functions related to a mobile communication device. Other types of data may also be evaluated by the disclosed system without departing from the scope of this disclosure. As used herein, the term assessment refers to information relating to a data object that may be used to evaluate or otherwise further understand a data object's operation or effect of operation. For example, an assessment may include a determination that an application is malicious or non-malicious, bad or good, unsafe or safe, or that an application may appear on a blacklist or whitelist. An assessment may include categorization or characterization data for a data object, ratings such as security ratings, privacy ratings, performance ratings, quality ratings, and battery impact ratings for a data object, trust ratings for a data object, distribution data for a data object. Assessments may result from collecting and/or processing data by server 151 and may be exposed by server 151 to users or other systems via an API, user interfaces, data feeds, or other methods. One will appreciate that the previous description for an "assessment" is not meant to be limiting in any fashion.

A. Device Data Collection

What follows is a discussion about how device data and application data are collected and stored, according to an embodiment of this disclosure. In general, the following discussion includes communications between server 151 and mobile communication devices 101 over network 121. Any data transmitted or received during these communications may be stored on server 151 or on data storage 111. In an embodiment, data stored on data storage 111 or server 151 is associated with a particular account or device known to the system. The association between data and a device or account may allow server 151 to provide tailored functionality for the account or device based on previously received data. In an embodiment, some or all of the data is stored on server 151 or data storage 111 with an anonymous association to a particular account or device. For example, data may be stored with an anonymous association for privacy purposes so that examination of the data on server 151 or data store 111 cannot tie the anonymously-associated data to a particular account or device; however, a device can populate and update this anonymously-associated data. Anonymous associations are described in further detail below. In an embodiment, server 151 will request information from mobile communication devices 101, which will respond with the requested information. In an embodiment, a mobile communication device 101 will transmit device data and/or application data to server 151 for analysis and assessment. For example, a user of mobile communication device 101 may wish to download a file to his device, but prior to installing the file, may wish to send the file or identifying data associated with the file to the server 151 in order to check if the file is malicious or otherwise undesirable. Server 151 will then analyze this received information in order to provide a security assessment that is available to any of the mobile communication devices 101. In another example, it may be useful to know how an assessed data object will affect the performance or behavior of a mobile communication device, the assessment containing information such as average battery impact or average network usage of the data object. In an embodiment, server 151 stores assessments of data objects after analysis and can provide access to these assessments in a number of ways. The analysis performed by server 151 will be discussed further below. The process by which server 151 provides access to assessment information will be also be discussed further below.

To prevent taxing network 121 and server 151 with network traffic, various methods may be used to reduce the amount of data requested by and transmitted to server 151. For example, rather than transmitting whole data objects, such as application files or application packages, for analysis, hashing functions or hashing algorithms may be applied to data and the resulting hash of the data may be sent to the server 151. The server 151 may use the hash to uniquely identify the data object. If the server has previously performed an assessment of the data object identified by the hash, the server 151 may return that previous assessment if it is still valid. If the server 151 has not yet performed an assessment for the data object, the server 151 may return a response indicating that the assessment is unknown and/or request additional data from the mobile communication device 101. One having ordinary skill in the art will appreciate that a hashing algorithm will transform an arbitrary amount of data into a fixed length identifier. For example, the SHA-1 hashing algorithm can digest an arbitrary amount of input data into a 160-bit hash. In another example, metadata besides a hash of the data object may be sent in lieu of a data object itself, e.g., metadata for an application may be sent for an assessment rather than the whole application. In many cases, metadata, such as a package name, application name, file name, file size, permissions requested, cryptographic signer, download source, a unique identifier such as a UUID, and other information may be sufficient as identifying information for a data object; thus, if server 151 receives appropriate identifying information, it can determine if the data object is undesirable. One skilled in the art will appreciate that there are a variety of methods by which a data object can be identified in such a way that can allow server 151 to determine if a data object installed on device 101 is malicious without having to transmit the entire data object to server 151.

In an embodiment of this disclosure, server 151 may request portions of a data object, rather than a complete data object. A whole data object may be transmitted incrementally such that network 121 is not burdened by network traffic. Alternatively or additionally, server 151 may request information about a particular application, but may query a group of mobile communication devices that each has this application. In this manner, server 151 may receive a portion, or "chunk" of data from one mobile communication device, and another portion of data from a second mobile communication device, and so forth, as necessary. Server 151 may then aggregate this information as it is being received, thereby pooling from a number of mobile communication device having the application/file data without taxing any specific mobile communication device. An example of this method is discussed further below.

Figure 2:
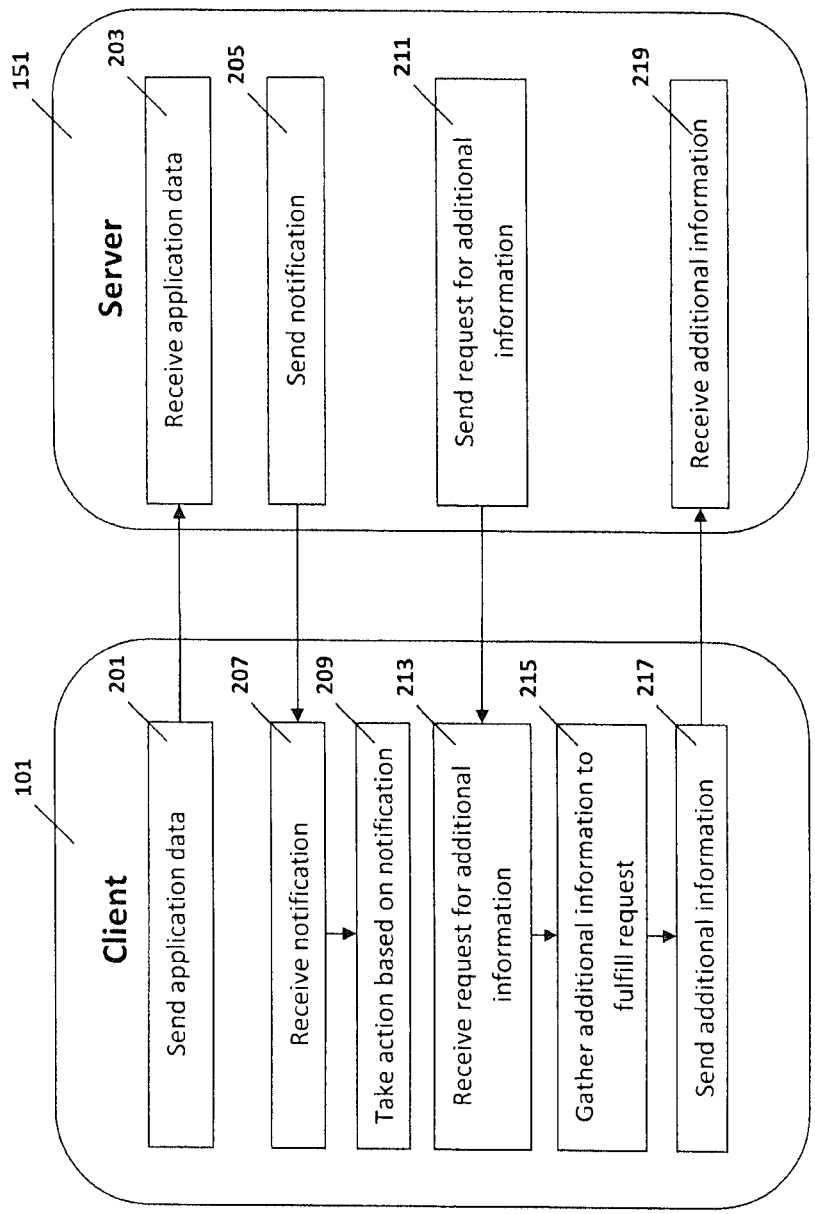
FIG. 2 is an exemplary flow diagram illustrating the steps of an embodiment of the disclosure.

FIG. 2 is a general overview of the transmission of different types of data between a mobile communication device 101 and server 151. As FIG. 2 shows, in block 201, mobile communication device 101 sends application data to server 151, which receives this data (block 203). In this embodiment, mobile communication device sends identifying or authentication information to server 151 so that server 151 can reference previously stored identifying or authentication information about mobile communication device 101, store and retrieve data associated with the mobile communication device 101, and specifically identify or authenticate mobile communication device 101 amongst other mobile communication devices.

In an embodiment, server 151 sends a notification to mobile communication device 101 (block 205). This notification can be an alert, a message, an instruction or other information related to application data or device data specific to mobile communication device 101. In an embodiment, the notification is due to the device previously having sent application data corresponding to a data object that was not initially assessed by the server 151 to be undesirable but was subsequently determined by the server 151 to be undesirable. In block 207, mobile communication device 101 receives the notification, and in block 209, the mobile communication device 101 takes action based upon the notification. As will be discussed in more detail below, such actions may include deactivating one or more features or applications on the mobile communication device 101.

One having skill in the art will appreciate that the interaction between mobile communication device 101 and server 151 can include communication from the mobile communication device to the server, as well as from the server to the mobile communication device. For example, in an embodiment, server 151 may receive application data from mobile communication device 101, but server 151 may require additional information before providing an assessment or transmitting a notification. In block 211, server 151 may request the additional information from mobile communication device 101. Mobile communication device receives the request (block 213), gathers additional information as requested by server 151 (block 215), then in block 217, transmits the additional information to server 151. In block 219, server 151 receives the requested additional information. One will appreciate that this process may repeat as necessary.

Figure 3:
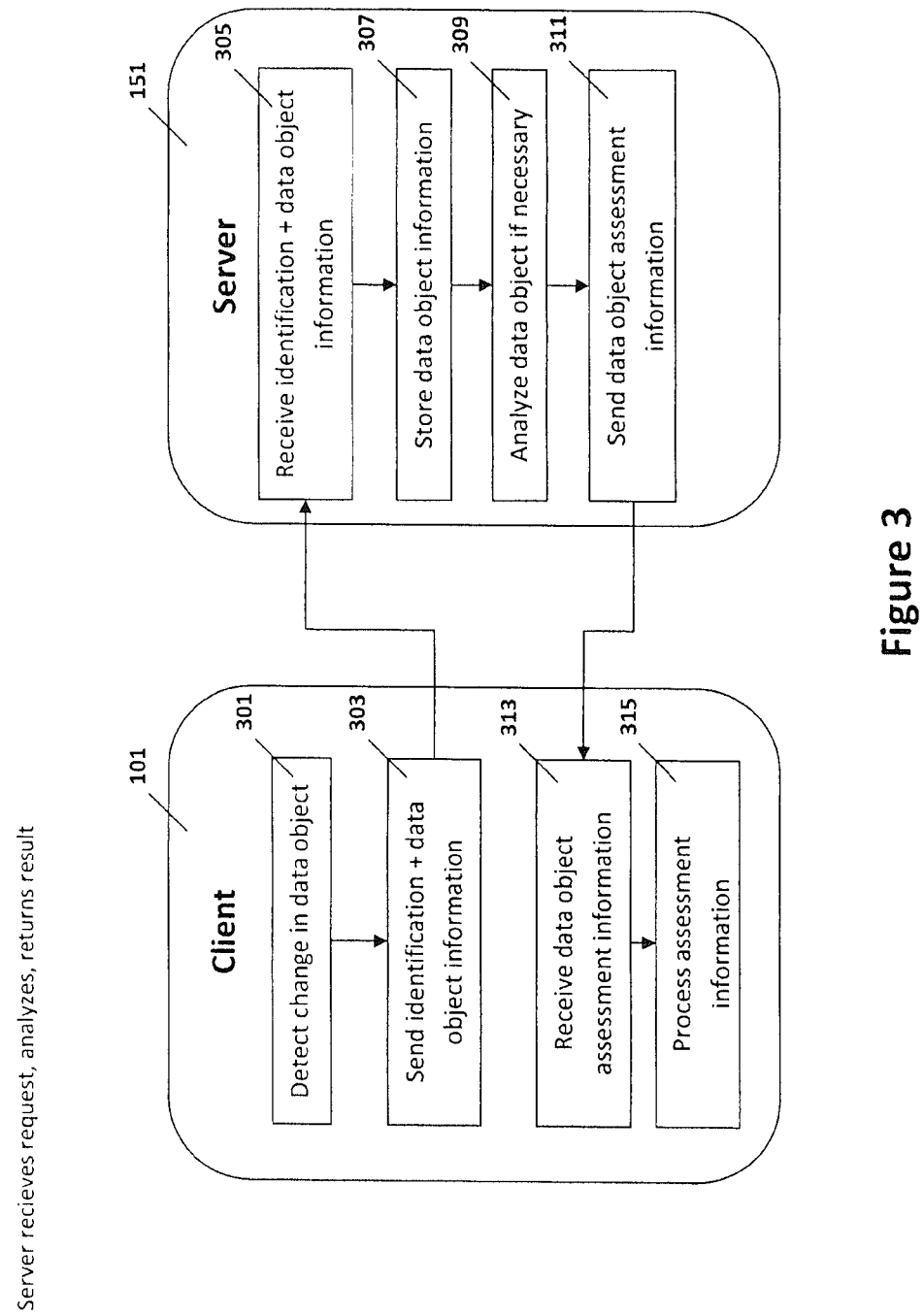
FIG. 3 is an exemplary flow diagram illustrating the steps of an embodiment of the disclosure.

FIGS. 3-7 illustrate the transmission and collection of application data and device data in more detail. FIG. 3 illustrates an embodiment in which server 151 evaluates a change in a data object stored on mobile communication device 101. In FIG. 3, mobile communication device 101 detects a change in a specific data object (block 301). One having skill in the art will appreciate that detecting changes in a data object may involve mechanisms such as intercepting system calls or file system operations, a file system or other data object change listener, receiving an event from a package management system (e.g., PACKAGE_UPDATED and/or PACKAGE_RE-PLACED intents in the Android™ operating system), and polling for data objects in a file system or other system capable of enumerating data objects. Other techniques for detecting changes may also be used. Alternatively or additionally, the following methods may occur when a change to a data object is detected, upon request by the user of the mobile communication device, or upon a pre-configured schedule for analyzing and assessing data objects on the mobile communication device.

In an embodiment, a change in a data object includes any time a data object is added, removed, or modified. After transmitting application data for a data object, mobile communication device 101 waits for confirmation from the server before recording that it has successfully transmitted application data for the data object. After receiving application data for a data object from a mobile communication device 101, server 151 transmits a confirmation. If there was an error in transmission or with the data itself, server 151 returns an error. If mobile communication device 101 receives an error from server 151, or no response after transmitting application data for a data object, mobile communication device 101 will not record the application data for the data object as having been sent, and the mobile communication device 101 may retry sending the data at some point in the future. One skilled in the art will recognize that mobile communication devices are sometimes unable to connect to a network or may have their network connection interrupted in the middle of a transmission. As such, a mobile communication device 101 recording whether or not server 151 has successfully received application data for a data object is important to the functioning of a reliable data collection system. In an embodiment, any time application data for a data object has not been transmitted from mobile communication device 101 and received by server 151, it is considered to be changed and needs to be transmitted.

In an embodiment, mobile communication device 101 stores whether it has transmitted and server 151 has successfully received application data for one or more data objects present on the device. In order to identify which data objects have had appropriate application data reported to server 151, mobile communication device 101 may store a database containing identification information for data objects that have been successfully reported to server 151 to determine whether the device needs to transmit application data for those data objects. For example, a data object that is a file on a filesystem may be identified by a hash of its contents. When the data object is first installed on a mobile communication device 101, the database may contain no data for the data object. Because there is no identifying information for the data object, the mobile communication device 101 recognizes the data object as new and transmits application data for the data object to server 151 indicating that the object is new. After transmitting application data for the data object to server 151 and receiving confirmation that the server successfully received the application data, the device stores the hash of the file contents and the location on the filesystem where the file resides in the database. If the data object were to be deleted, the mobile communication device 101 can detect that there is no file at the previously stored filesystem location and can report the deletion of the data object to server 151 by reporting the filesystem location and/or hash identification information for the data object. If the file were to be modified, such as in the case of an application being updated, the mobile communication device can detect that there is a file in the previously stored location on the filesystem, but the content hash of the file does not match the stored content hash. In this case, the mobile communication device 101 can report to the server that the data object identified by the file location and/or previous content hash has been updated and report the new content hash of the file.

In an example, a security system installed on mobile communication device 101 may report application data for a data object to server 151 for purposes of receiving an assessment of the data object. If a mobile communication device downloads a new application that is malicious, it is important that the security system detect this new item as soon as possible. Server 151 can analyze the new application and provide a security assessment whereby actions can be taken based on the results. In another example, a first version of an application may be safe, but a second version of the application may be malicious. It is important that a security system recognize this update as different from the first version of the application so that it will produce a new assessment of the second version and not just report the first assessment. Server 151 can analyze the updated application and provide a security assessment whereby actions can be taken based on the results.

In block 303 of FIG. 3, mobile communication device 101 transmits identification information for the mobile communication device to server 151. In an embodiment, the identification information is authentication information. In an embodiment, the identification information is a non-authoritative identifier for the device such as a device ID that is not considered to be secret. In an embodiment, identification information includes device information for the mobile communication device (e.g., make, model, hardware characteristics). In addition, mobile communication device 101 transmits information for the changed data object. Such information may include identifying information for the data object, such as metadata (e.g., hash, package name, file name, file path, cryptographic signer, unique identifier such as a UUID) and the like. In block 305, server 151 receives the identifier for mobile communication device 101 and information for the changed data object. The received data is stored by server 151 on the server or on data storage 111 (block 307). In an embodiment, only some of the data received by server 151 is stored. In block 309, server 151 provides an assessment for the changed data object using any of the techniques disclosed herein or from U.S. patent application Ser. No. 12/255,621, which is incorporated in full herein. The assessment may include instructions and/or a categorization labeling the changed data object as safe, malicious, or unknown. In an embodiment, some or all of the received data is stored on server 151 or data storage 111 and is associated with the device that transmitted the data. For example, this may later allow server 151 to determine which applications a device has encountered. In another embodiment, some or all of the received data is stored on server 151 or data storage 111 in a way that server cannot directly tie the information to a particular device. For example, server 151 may store received data without any link to a particular device or account. In another example, data may be anonymously associated with a device by the server associating the data with an identifier when stored. To ensure that server 151 cannot associate the stored data with a particular device, the identifier is only known to the device transmitting the data and is provided to the server whenever the device transmits data. The server does not store this identifier so that the identifier is never directly linked with a particular device or account on server 151 or data store 111. In an embodiment, server 151 stores the results of the assessment on the server or on data storage 111.

If, when an assessment for a data object is required 309 and a previous assessment for the data object exists and is considered valid, server 151 retrieves the previous assessment from data storage 111 instead of performing a new assessment. Assessments may be considered to be for the same data object if the metadata relating to each object matches in a variety of ways, including if the assessments relate to data objects with the same hash, same package name, same cryptographic signer, or same file path. In block 311, the assessment is transmitted to mobile communication device 101, which receives this assessment from server 151 (block 313), then processes the assessment or takes appropriate action (block 315).

Figure 4:
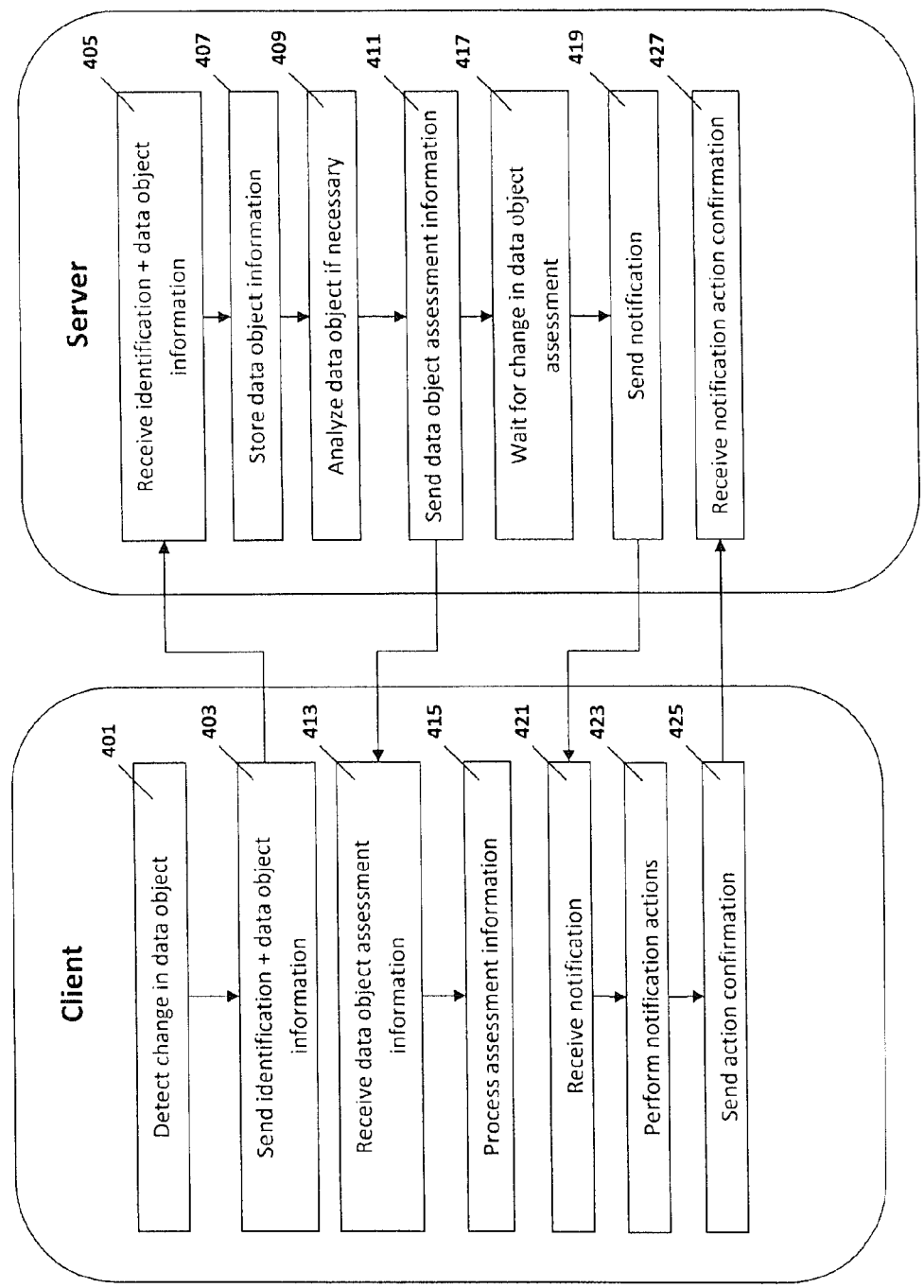
FIG. 4 is an exemplary flow diagram illustrating the steps of an embodiment of the disclosure.

One having ordinary skill in the art will appreciate that the interaction between mobile communication device 101 and server 151 is dynamic, in that server 151 can proactively transmit notifications or instructions to remediate data objects whose assessment has changed, thereby requiring action by mobile communication device 101. FIG. 4 illustrates such an embodiment. In block 401 of FIG. 4, mobile communication device 101 detects a change in a specific data object. In block 403, mobile communication device 101 sends identification information for the device and information about the changed data object to server 151. Server 151 receives the identification information for mobile communication device 101 and information about the changed data object (block 405). In block 407, server 151 stores the changed data information on the server or on data storage 111. In block 409, server 151 may analyze and assess the changed data object, and may report the assessment to mobile communication device 101 (block 411). As discussed previously, if an assessment has already been performed for the data object, that previously performed assessment may be retrieved and used instead of re-performing the assessment. If server 151 reports an assessment, mobile communication device 101 receives the assessment or other notification in block 413, and processes the assessment (block 415).

In an embodiment, the assessment for the data object may change. For example, a data object that may previously have been assessed as safe or unknown may later be identified as malicious, causing some previously unknown vulnerability, or causing an undesirable behavior such as network overuse or battery drainage. In block 417, if server 151 detects a change in assessment for a previously analyzed data object, then in block 419, server 151 may transmit a notification, remediation instructions or the like to mobile communication device 101. Mobile communication device 101 receives the notification from server 151 (block 421), then performs the recommended actions or remediation instructions (block 423). In block 425, mobile communication device 101 transmits a confirmation that it performed the required actions, which server 151 receives (block 427). In an embodiment, the notification is only sent to mobile communication device 151 if the data object is determined to be present on mobile communication device. In an embodiment, the server 151 stores information on the server 151 or on data storage 111 allowing the server 151 to determine whether the mobile communication device 101 currently has the data object or has previously requested an assessment for the data object.

One having skill in the art will appreciate that FIG. 4 provides only one example of how server 151 may report changes in assessment to a mobile communication device, and some steps may be skipped without departing from this disclosure. For example, mobile communication device may perform remediation instructions or other required actions without sending confirmation to server 151.

Figure 5:
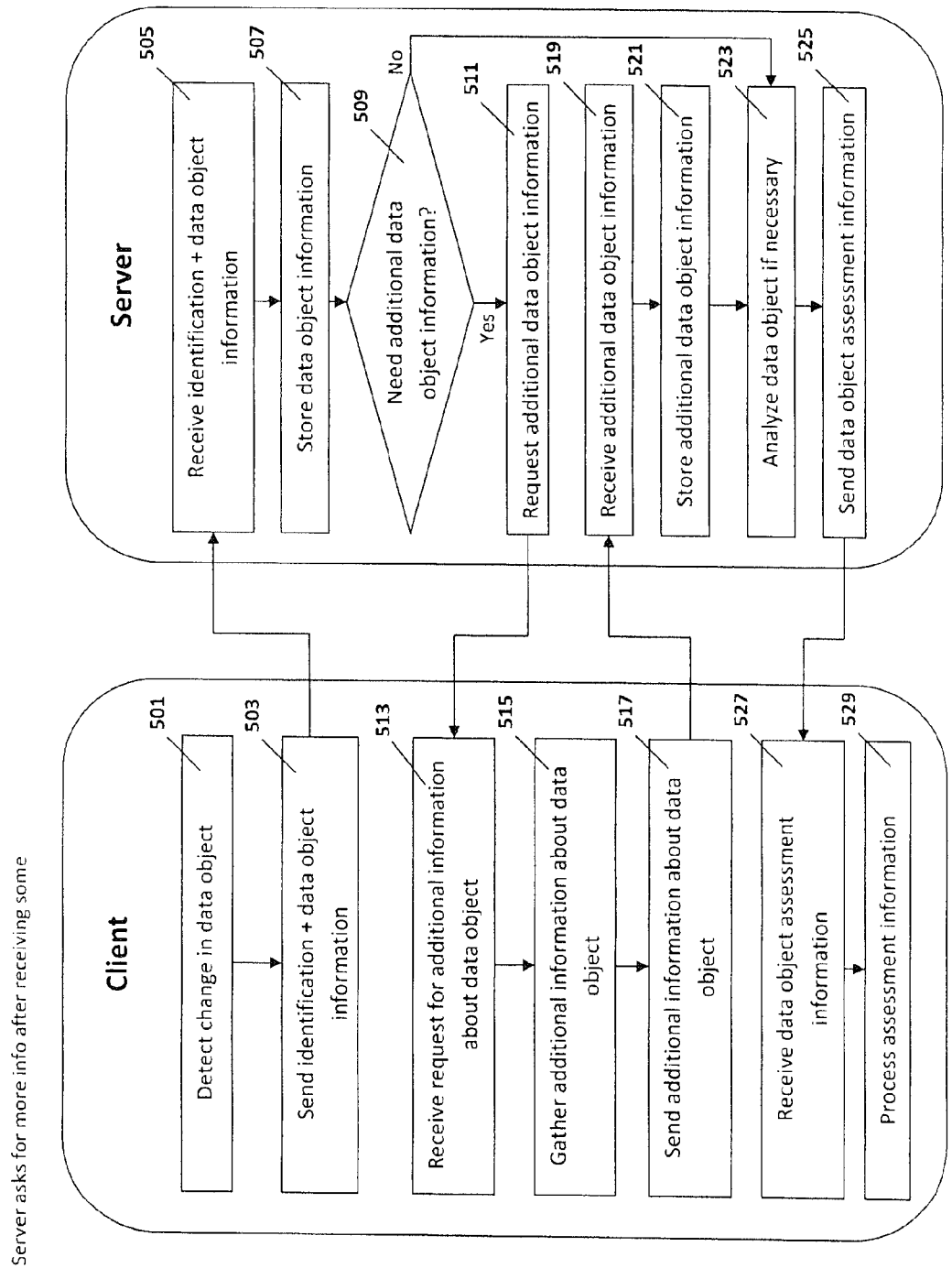
FIG. 5 is an exemplary flow diagram illustrating the steps of an embodiment of the disclosure.

In an embodiment, server 151 may request additional information about a particular data object from mobile communication device 101. For example, mobile communication device 101 may send information about a changed data object to server 151; however, the information sent may be insufficient for server 151 to perform a conclusive analysis. FIG. 5 illustrates this embodiment. In block 501 of FIG. 5, mobile communication device 101 detects that a data object has changed, and transmits identification information for mobile communication device 101 with information for the changed data object to server 151 (block 503). Server 151 receives the identification information for mobile communication device 101 and information for the changed data object (block 505), and stores the information for the changed data object on the server or on data storage 111 (block 507). In block 509, server 151 determines whether it requires additional information about the changed data object. For example, server 151 may attempt to assess whether the changed data object is safe or malicious, but is unable to provide a conclusive assessment (i.e., the assessment results in "unknown"). The determination of whether more information is needed can be performed either before the server 151 performs an assessment if there is not enough data to even begin an assessment or after an assessment returns wholly or in part to a lack of data. If additional information is required, then server 151 may request the additional information from mobile communication device 101 (block 511).

In block 513 of FIG. 5, mobile communication device 101 receives the request for additional information, gathers the requested information (block 515), then transmits the additional information to server 151 (block 517). In an embodiment, additional information includes behavioral data for a data object and application data for the data object, such as the content for the data object. In block 519, server 151 receives the additional information from mobile communication device 101, and stores the additional information (block 521). Server 151 may then analyze the changed data object information with the additional information to provide an assessment (block 523), which may be sent to the mobile communication device 101 (block 525). In block 527, mobile communication device 101 receives the assessment of the changed data object from server 151 then processes the assessment (block 529).

Figure 6:
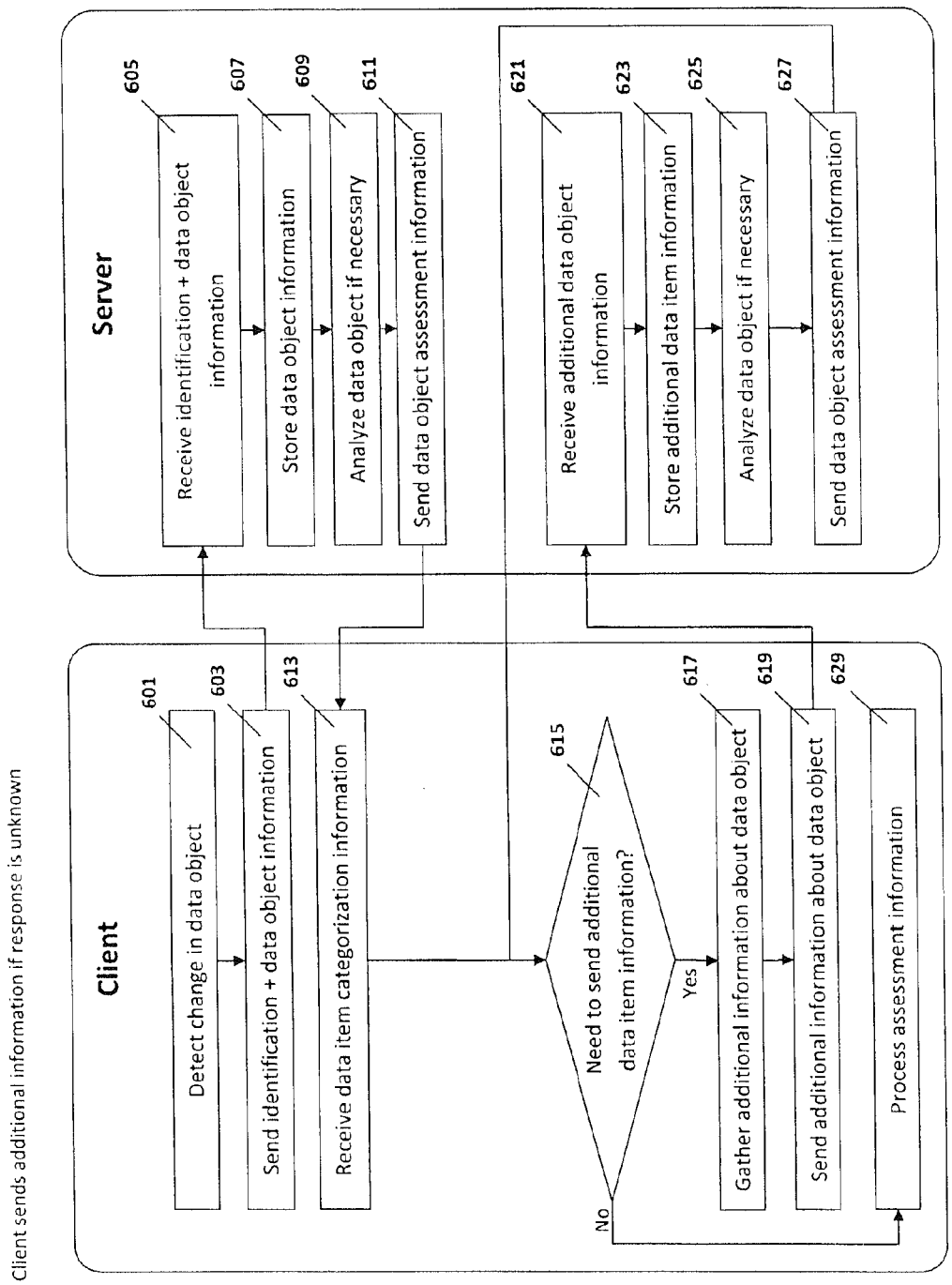
FIG. 6 is an exemplary flow diagram illustrating the steps of an embodiment of the disclosure.

In an embodiment, mobile communication device 101 may elect to transmit additional information to server 151. For example, server 151 may analyze a data object, but not provide a conclusive assessment. Rather than requesting additional information from mobile communication device 101, the device may request an additional assessment by providing additional information for the data object to server 151. FIG. 6 illustrates this embodiment.

In block 601 of FIG. 6, mobile communication device 101 detects a change in a data object, then in block 603, mobile communication device 101 sends its identification information and information for the changed data object to server 151. In block 605, server 151 receives the identification information for mobile communication device 101 and the information for the changed data object. This information is stored by server 151 on the server or on data storage 111 (block 607), then analyzed by server 151 to result in an assessment (block 609). In block 611, server 151 transmits the assessment or an appropriate notification to mobile communication device 101. Mobile communication device 101 receives the assessment from server 151 (block 613 of FIG. 6). In block 615, mobile communication device 101 determines whether to send additional information about the data object. For example, server 151 may be unable to produce an assessment for the data object given the data it has available, and thus needs more information to be able to produce an assessment. In block 617, if mobile communication device 101 determines that it should send additional information about the data object, then this information is gathered. In block 619, mobile communication device 101 transmits the additional information to server 151, which receives this information (block 621), and stores the received additional information (block 623). One will appreciate that server 151 will know that the additional information will pertain to the information previously received by server 151 (block 605), since mobile communication device 101 will transmit identification information with the additional information.

In block 625 of FIG. 6, server 151 analyzes the additional information received from the mobile communication device 101. In an embodiment, the additional information may be analyzed with the previously received information (block 605). In block 627, server 151 transmits the assessment to mobile communication device 101, which processes the assessment (block 629). If mobile communication device 101 still needs to send additional information, it may repeat the process as necessary.

Figure 7:
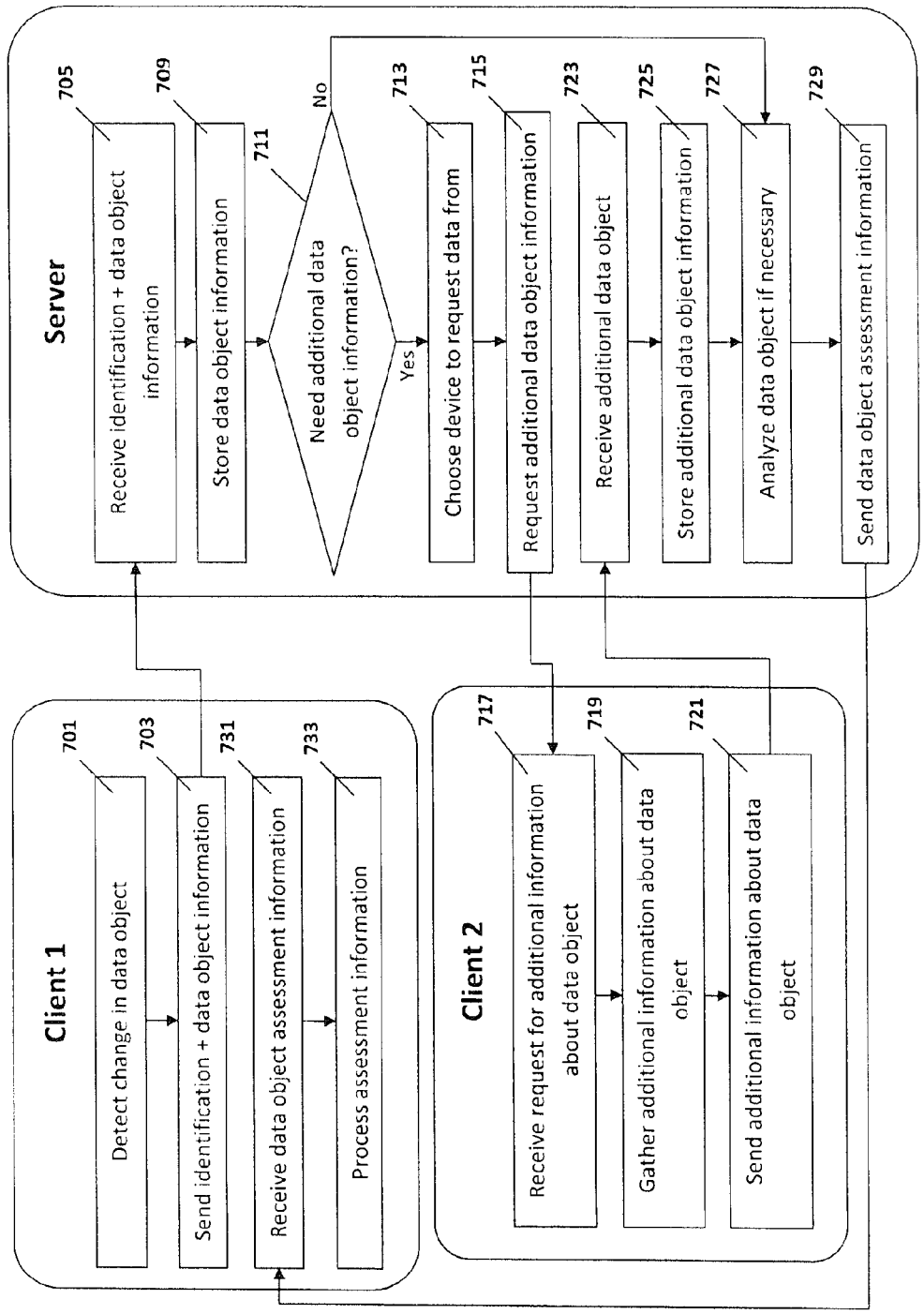
FIG. 7 is an exemplary flow diagram illustrating the steps of an embodiment of the disclosure.

As noted previously, server 151 may have access to a plurality of mobile communication devices, some of which may run or store the same application programs or data objects. Requesting data object information from a single mobile communication device can cause network traffic, affecting not only the single mobile communication device, but other devices on the network. In an embodiment, if server 151 requires information about a data object that is stored on more than one mobile communication device, server 151 can gather portions of the required information from each of the mobile communication devices, rather than relying on a single device. FIG. 7 illustrates an embodiment using a first and a second mobile communication device, thereby optimizing data collection from two or more mobile communication devices.

In block 701 of FIG. 7, the first mobile communication device detects a change in a data object. The data object is also found on the second mobile communication device, but may or may not realize the same change. The first mobile communication device transmits its identification information and information for its changed data object to server 151 (block 703). In block 705, server 151 receives the identification information for the first mobile communication device with the information for the changed data object. This information is stored by server 151 (block 709). In block 711, server 151 determines that it requires additional information about the data object. In block 713, server 151 identifies the second mobile communication device that server 151 knows also stores the data object as well as additional information for the data object.

In block 715 of FIG. 7, server 151 requests the additional information for the data object from the second mobile communication device. This request is received by the second mobile communication device (block 717). In response, the second mobile communication device will gather the additional information (block 719), then transmit the additional information to server 151 (block 721). Server 151 receives (block 723) and stores the additional information about the data object from the second mobile communication device on server 151 or on data storage 111 (block 725), then analyzes this additional information with the previously received information from the first mobile communication device to render an assessment (block 727). This assessment is transmitted to the first mobile communication device (block 729), which receives the assessment (block 731) and process the assessment (block 733). One will appreciate that if relevant, server 151 may also transmit the assessment to the second mobile communication device.

In an embodiment, server 151 can gather additional information from multiple devices. In an embodiment, server 151 chooses which devices to request additional from by analyzing device information and application data previously stored by server. For example, to characterize an application's usage of SMS messaging to determine whether or not it is abusing SMS for spam purposes, server 151 may request the count of SMS messages sent by an application from many mobile communication devices that have previously reported that they have installed the application. In an embodiment, server attempts to analyze a data object to produce an assessment without first waiting to receive information about the data object from a device. Instead, server may receive data from other sources and proactively request information from one or more devices to create an assessment for the data object.

In an embodiment, application data for a data object that is gathered and transmitted by mobile communication device 101 to server 151 may include behavioral data about the data object. Usage of such data by server 151, such as during analysis, is discussed more in depth below. Behavioral data may include information about what the data object did when it ran on the device. Examples of behavioral data include information about network connections caused by the data object (e.g., server names, source/destination addresses and ports, duration of connection, connection protocols, amount of data transmitted and received, total number of connections, frequency of connections, and network interface information for the connection, DNS requests made), behavior of the data object when run (e.g., system calls, API calls, libraries used, inter-process communication calls, number of SMS messages transmitted, number of email messages sent, information about user interfaces displayed, URLs accessed), overhead caused by the data object (e.g., battery used, CPU time used, network data transmitted, storage used, memory used). Other behavioral data includes the context when a particular behavior occurred (e.g., whether the phone's screen was off when the data object sent an SMS message, whether the user was using the data object when it connected to a remote server, etc.).

Because a large amount behavioral data is generated by data objects every time they run, it is important for a mobile communication device not to gather or transmit all of the possible behavioral data; otherwise, the gathering and transmission of behavioral data may over-utilize resources on the device 101, server 151, and the network 121. In an embodiment, mobile communication device 101 limits what type of behavioral data for a data object it gathers and transmits, and how frequently to gather and transmit behavioral data based on the period of time since the data object has last changed. For example, when a data object is first installed on a mobile communication device, the device may gather and transmit the full amount of behavioral data available every day. After one week following installation of the data object, the device may only send a limited subset of behavioral data in weekly intervals. A month after installation, the device may only send a minimal amount of behavioral data in monthly intervals. In an embodiment, if the data object were to be updated (e.g., updating an application to a different version), the device may transmit the full scope of behavioral data daily and reduce the scope and frequency of data gathered and transmitted after one week and/or after one month. In an embodiment, server 151 sends configuration to mobile communication device 101 requesting that the device send specific types of behavioral data at a specific frequency. The device stores the configuration so that it may determine whether to gather and/or transmit behavioral data for data objects. In an embodiment, the configuration information is specific to a particular data object. In an embodiment, the configuration information is for all data objects encountered by the device. In an embodiment, server 151 requests behavioral data for a particular data object from the device so that the server can minimize unnecessarily gathered and transmitted behavioral data.

In an embodiment server 151 can influence the gathering and transmission of behavioral data from device 101 to server 151. For example, server 151 may transmit instructions to mobile communication device 101, requesting behavioral data for a data object only if the server has information indicating that the device currently has the data object, and if the server needs more behavioral data to better assess the data object. In an embodiment, the server 151 determines that it needs more behavioral data for an object based on the number of devices that have already reported behavioral data. For example, the server may require at least one hundred (100) devices to report behavioral data for each data object in order to have a confident assessment. In an embodiment, the difference of the behavioral data reported by different devices is used to determine how much behavioral data is needed for an assessment to be confident. For example, if thirty (30) devices all reported battery usage by a data object within a small variance, the server may not request any more behavioral data for that object; however, if those thirty (30) devices showed a wide variation of battery usage, the server may request behavioral data from two hundred (200) devices.

In an embodiment, a mobile communication device may only transmit behavioral data if the data is outside of normal bounds. In an embodiment, the bounds are universal to all data objects. For example, a bound on network usage may be set so that mobile communication device transmits behavioral data for a data object's network connections only if the data object maintains at least one open connection for more than 50% of the time it is running or if the data object transmits more than one megabyte of data in a 24 hour period. In an embodiment, server 151 can update bounds on a mobile communication device 101 by transmitting updated bound information to the device. In an embodiment, bounds may be particular to one or more data objects. For example, a device may have a set of default bounds by which it will send behavioral data, but the server may transmit bounds for a particular data object, identifying that data object through identifying information such as a hash, cryptographic signer, package name, or filesystem location. The updated bounds may instruct the device to send more or less behavioral data than the default set of bounds. For example, a mobile communication device may default to never send behavioral data. When a new data object is installed on the device, the device reports the installation event and metadata associated with the data object to the server. If the server has already characterized the data object through behavioral data from other devices, the server may send bounds to the device specifying the typical behavior of the data object on other devices (e.g., uses less than 100 kilobytes of data per day, never sends SMS messages, never sends email) so that if the data object deviates from these bounds, the mobile communication device will send the deviated behavioral data to the server. Such deviations may be useful in the case of a legitimate application that becomes exploited and begins exhibiting uncharacteristic behavior or in the case of a "time-bomb" application that only starts becoming malicious after a certain time.

In an embodiment, data transmitted from mobile communication device 101 to server 151 is configurable in order to protect user privacy; prevent overuse of device, network, or server resources; or for other reasons. Some example configurations include choosing what application data is sent from device 101 to server 151, how often application data is sent, and how application data is re-transmitted should initial transmissions fail. Example configurations may further include transmitting only identifying information (e.g., no additional metadata or behavioral data), never transmitting any application data, never transmitting data object content, only transmitting application data for data objects based on the source of the data objects, only transmitting certain type of behavioral data, only transmitting a certain amount of application data per day, only transmitting one data object's content per day, transmitting behavioral data a maximum of once per day per data object, and the like. One skilled in the art will recognize that additional configurations are possible without departing from the scope of the disclosure. In an embodiment, the configuration may be enforced by a mobile device 101 and/or server 151 by the device only making certain transmissions and/or the server only making certain requests from the device. In an embodiment, the configuration is controlled by one or more parties. For example, the configuration may be automatically set by server 151 or software residing on mobile communication device 101, or controlled by an administrator via server 151, and/or controlled by a user via mobile device 101. In an embodiment, portions of the configuration are controlled by different parties. For example, a user may be able to control whether or not data objects are reported to server 151 but an administrator on server 151 may control the behavioral data reporting frequency for all devices to optimize battery usage of the security system.

In an embodiment, software on a mobile communication device 101 displays a user interface dialog when it receives a request to transmit application data for a data object, such as its content or behavioral data. As discussed above, a request for the data object's content may be for the whole content or for a portion of the content, the request identifying which portion of the content if a portion is requested. The user interface dialog displayed may identify the data object for which application data is to be transmitted, and give the device's user a chance to allow or reject the transmission. In an embodiment, the dialog allows the user to have the device remember his or her decision for future data objects. In an embodiment, the dialog allows the user to view more in-depth information about the application data to be sent, and provides a way for the user to understand the privacy implications of sending the data such as linking to a privacy policy, privacy description, or other content that describes how the data is transmitted, stored, and used. In an embodiment, a mobile communication device attempts to transmit a data object when it receives an indication that server 151 needs more information to produce an assessment. In this instance, the device may display a user interface dialog prompting the device's user to choose whether or not to transmit the data object's content when the device attempts to transmit a data object. In an embodiment, some attempted transmission of certain types of application data, such as a data object's content, results in user interface dialog for confirmation while other types of application data, such as metadata or behavioral data, are transmitted without requiring a user confirmation.

Because a particular application may utilize multiple data objects, it may be desirable for mobile communication device 101 and/or server 151 to group multiple data objects together so that the application can be analyzed as a whole. In an embodiment, mobile communication device 101 or server 151 may perform grouping by comparing application data between multiple data objects. For example, application data that may be used to group data objects includes how data objects were installed (e.g., data objects from the same installer may be grouped), if data objects are linked together at runtime or dynamically, whether multiple data objects are in the same filesystem directory, and if data objects share a cryptographic signer. For example, an application installer may extract an executable and multiple libraries to the filesystem on a mobile communication device. The mobile communication device 101 may use the common installer to consider the data objects grouped and may store the grouping information for use in gathering behavioral data (discussed below). In order for server 151 to recognize the group, each data object's application data may include identification information for the common installer. The server 151 may explicitly store the grouped relationship on server 151 or in data storage 111 to efficiently access the grouping information during analysis.

Because behavioral data cannot always be attributed to a single data object when multiple objects execute together such as in the context of single process, if the device operating system does not support granular behavioral data, or through other mechanisms, it may be desirable for mobile communication device 101 to group multiple data objects together and report behavioral data for the group together. In an embodiment, mobile communication device 101 transmits information indicating that grouped data objects are associated and transmits application data for grouped data objects to server 151 together. For example, if a process on a mobile communication loads multiple components from different vendors and network data can only be gathered on a per-process level, and/or if the process is detected to be connecting to a known malicious server, then it may be desirable for all components loaded in the process to be identifiable by the server to determine the offending component. When the mobile communication device 101 gathers behavioral data (such as the IP addresses the process has connected to) for the process, the device reports identification information for all of the data objects that are associated with the process to the server. When the server receives behavioral data for a group of data objects it may analyze behavioral data from multiple devices and determine that only groups containing a particular data object will connect to the malicious server. Thus, only the data object that results in connecting to the malicious server will be considered malicious. In an embodiment, if a mobile communication device does not provide granular information about the behavior of particular data objects, behavioral data for the device as a whole may be transmitted to the server as representing the group of all data objects installed on the device. For example, if an operating system does not provide per-process battery usage information, devices running that operating system may transmit a list of applications installed on each device and the overall battery life for each device to server 151. The server can then perform analysis on this data to determine which applications are correlated to better or worse battery life and estimate each application's contribution to battery life when installed on a device. In an embodiment where multiple data objects in a group have different behavioral data gathering configurations, the mobile communication device will join the configurations together. For example, if mobile communication device 101 is configured to report a large amount of behavioral data every day for one data object, but is configured to only report anomalous behavioral data for another data object, and the data objects are grouped, the device may join the two configurations and report a large amount of behavioral data for the group. Alternatively, if the second data object is configured to never report behavioral data for privacy reasons, no behavioral data may be reported for the group to satisfy the privacy constraint.

One having skill in the art will appreciate that data transmitted by server 151 or mobile communication device 101, such as metadata, behavioral data, configuration information, behavioral data bounds, grouping data, requests for additional data, notifications, and other forms of data may be formatted using binary formats or non-binary formats. Examples include formatting data in XML, JSON, or as part of a URI. The data may be transmitted using a variety of protocols, including TCP, UDP, DNS, and HTTP. Other formats and/or protocols may be used without departing from this disclosure.

The above are various non-limiting examples of how data is gathered and collected from one or more mobile communication devices. Techniques for optimizing data collection are also disclosed above. As discussed, mobile communication devices 101 will transmit some or all of the above-described data to server 151 for analysis so that server 151 can provide an assessment of the analyzed data. The following section describes non-limiting examples of analysis techniques. One having skill in the art will appreciate that while the examples and disclosure below uses the data gathered using the methods described herein, other types of data may be transmitted and that this disclosure is not limited to the data described herein.

B. Data Collection System

Figure 10:
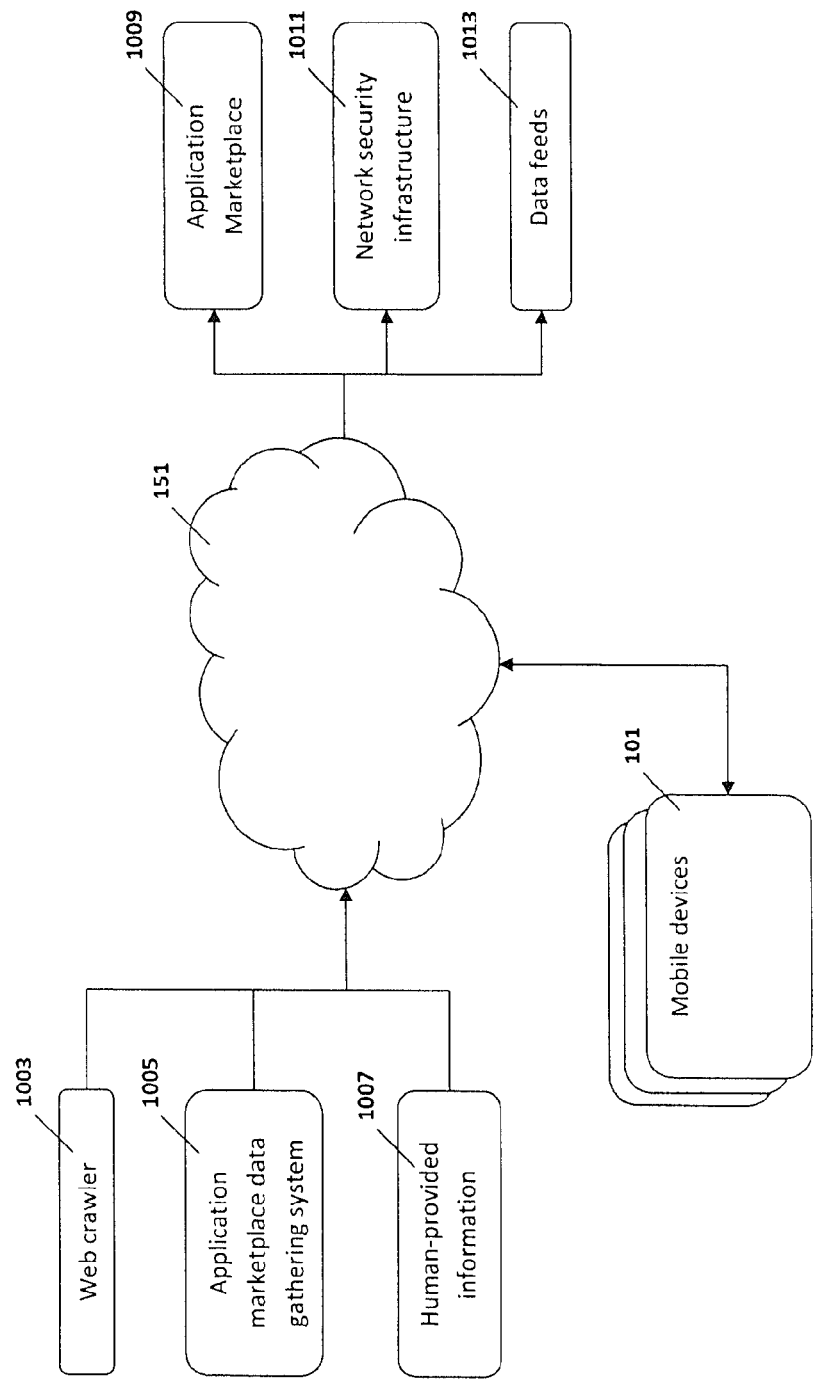
FIG. 10 is an exemplary flow diagram illustrating the steps of an embodiment of the disclosure.

One skilled in the art will appreciate that server 151 may receive data from sources other than mobile communication devices for use in analyzing a data object and producing assessments. FIG. 10 illustrates an embodiment in which server 151 may receive data from multiple sources and transmit assessment information for multiple uses. One or more servers 151 are illustrated as a "cloud" to emphasize that multiple servers may operate in coordination to provide the functionality disclosed herein. One or more mobile communication devices 101 are illustrated as a group to emphasize that multiple devices 101 may transmit and receive information to and from server 151. As disclosed above, one or more mobile communication devices 101 may transmit application data for data objects to server 151 and devices 101 may receive assessment data, requests for more information, notifications, and the like from server 151.

In addition to gathering data from mobile communication devices, server 151 can receive information pertaining to data objects from a variety of data gathering systems. Such systems may be separate from server 151 or may be part of server 151. In an embodiment, a data gathering system directly updates a database or other storage on server 151 or data storage 111 with information for one or more data objects. In an embodiment, a data gathering system communicates with server 151 to provide information to server 151. There are many types of systems that may be used as data feeds to server 151. Some examples include web crawlers 1003, application marketplace data gathering systems 1005, honeypots, and other systems that may feed information related to mobile device applications to server 151.

In an embodiment, a web crawler 1003 downloads data objects that can run on mobile communication devices and retrieves information about data objects, feeding both to server 151. For example, the web crawler 1003 may utilize a search engine to look for web sites that host mobile applications. Once the crawler 1003 identifies sites hosting mobile downloads, the crawler may retrieve web pages available on those sites, examining the content of each page to determine additional pages to retrieve. For example, a page on a mobile download site may contain links to other pages as well as links to download data objects. It may be desirable for data gathering systems to only transmit information to server 151 that is relevant to mobile devices, as there is much content available on the internet that does not affect mobile communication devices (e.g., PC software). In an embodiment, the crawler 1003 can identify if a data object available for download or that has already been downloaded is able to run on a mobile communication device. For example, the crawler 1003 may examine a download URL for a specific string indicating that the URL corresponds to mobile application package (e.g., SIS, APK, CAB, IPA). In another example, the crawler 1003 may examine a data object after it has been downloaded to determine if it affects mobile communication devices and if so, whether it affects a specific mobile platform. In this case, the crawler 1003 may examine the data object downloaded for characteristics such as its name, whether it contains executable code compatible with any mobile platforms, or if it contains data that is typical for a particular mobile device platform. In an embodiment, the web crawler 1003 gathers marketplace metadata about data items and transmits the marketplace metadata to server 151. Some example marketplace metadata includes from which web sites a data object is available for download, user ratings and comments for a data object, the price of the data object if it is available for purchase, the number of times the data object has been downloaded, information about the author of the data object, and other information pertaining to a data object that is available on web sites. As will be discussed below, where a given data object is available can be used to determine how trustworthy a data object is. For example, a data object available from a reputable company's web site may be considered more trustworthy than a data object uploaded on a mobile device forum by one of the forum's users.

Because many mobile applications are only available via mobile application marketplaces, it may be important for server 151 to receive information about data objects that are available in application marketplaces. In an embodiment, an application marketplace data gathering system 1005 retrieves information about a data object, such as the data object's content and marketplace metadata for the data object, from mobile application marketplaces and reports the information to server 151. In an embodiment, the application marketplace data gathering system 1005 is part of server 151. In alternative embodiment, the application marketplace data gathering system is separate from server 151. Application marketplaces are often provided by mobile platform vendors (e.g., Android Marketplace, Blackberry App World, Apple App Store, Nokia Ovi Store) or third parties (e.g., GetJar, Handango) and may use a proprietary API. In an embodiment, application marketplace data gathering system 1005 is configured to communicate with application marketplace servers via a proprietary protocol. In order to transmit the data received from application marketplace servers to server 151 in a manner that is usable by server 151, the marketplace data gathering system 1005 may transform application data for data objects from a proprietary format into a format that server 151 can utilize for analysis. For example, an application marketplace may provide an API to access users' comments and ratings for an application; however, the data returned by that API may be different from another application marketplace's comment data. In another example, an application market may proactively transmit data to marketplace data gathering system 1005 so that the data gathering system does not have to repeatedly query it. To allow server 151 to be able to analyze comment data from multiple application marketplaces, application marketplace data gathering system 1005 may transform differently formatted comment data into a standard format for transmission to server 151. In an embodiment, an application marketplace data gathering system 1005 can search for certain terms in user reviews, such as "battery drain," "crash," "privacy settings," "does not work," "phone number," "contacts," and the like, which can be used to characterize an application as "known bad," or used to establish the trustworthiness of an application using the system components described herein. In an alternative embodiment, application marketplace data gathering system 1005 can gather all comment data and analysis of the comment data can be performed by server 151. Similarly, server 151 or application marketplace data gathering system 1005 can be capable of recognizing positive reviews or scores for a data object, thereby improving the assessment and/or trustworthiness for the data object.

In addition to automated gathering of data object information, it may be important for server 151 to accept human information 1007. Such information may include subjective trust scores for mobile application vendors, specific keywords or other characteristics, such as heuristics, that may classify a mobile application as suspicious. One skilled in the art will recognize that other types of information related to the analysis of data objects for mobile devices may be provided by a human is possible without departing from the scope of this disclosure. In an embodiment, server 151 provides a user interface by which someone may provide information to server 151 about a specific data object, a group of data objects (e.g., data objects from a particular developer, all data objects on a specific platform), or for the analysis system as a whole (e.g., updated analysis heuristics). In an embodiment, a server separate from server 151 provides a user interface by which someone may provide information about a specific data object, a group of data objects, or for the analysis system as a whole. This separate server may transmit the user-provided information to server 151 where server 151 stores it on server 151 or in data storage 111. In an embodiment, the separate server directly updates data storage 111 with the user-provided information.

FIG. 10 illustrates how server 151 may provide information about data objects to external systems. In an embodiment, information provided by server 151 may be transmitted via an API; provided as a list, a data feed, a report, or formatted data such as firewall or virus definitions; or in other forms. In an embodiment, server 151 provides information about data objects to an application marketplace 1009. For example, server 151 may provide marketplace 1009 with a list of malicious data objects that are present in marketplace 1009. In another example, server 151 may expose an API by which application marketplace 1009 can transmit identification information (e.g., a hash of a data object's content) to server 151 to determine if the data object is considered malicious or otherwise undesirable. In an embodiment, server 151 provides data to network security infrastructure 1011 so that the network security infrastructure 1011 may protect against malicious or undesired applications at the network level. For example, by protecting at the network level, even mobile communication devices that do not have security software installed may benefit from protection. In an embodiment, server 151 transmits threat signatures to network security infrastructure 1011. Such threat signatures may take a variety of forms, for example, hashes of undesired applications, binary sequences for undesired applications, package names of undesired applications, firewall rules to block malicious servers or attackers, and rules for a network security system such as Snort. In an embodiment, server 151 provides data in the form of data feeds 1013. The data feeds 1013 may contain a variety of data available to server 151 or data storage 11 either from server's data gathering or from further analysis (described below), for example, a list of any data objects that use more network traffic than a given threshold to identify misbehaving or abusive applications, a list of the most prevalent malicious data objects, and a list of applications that match criteria such as a set of heuristics for identifying potentially malicious applications.

C. Server-Side Analysis Systems

Figure 11:
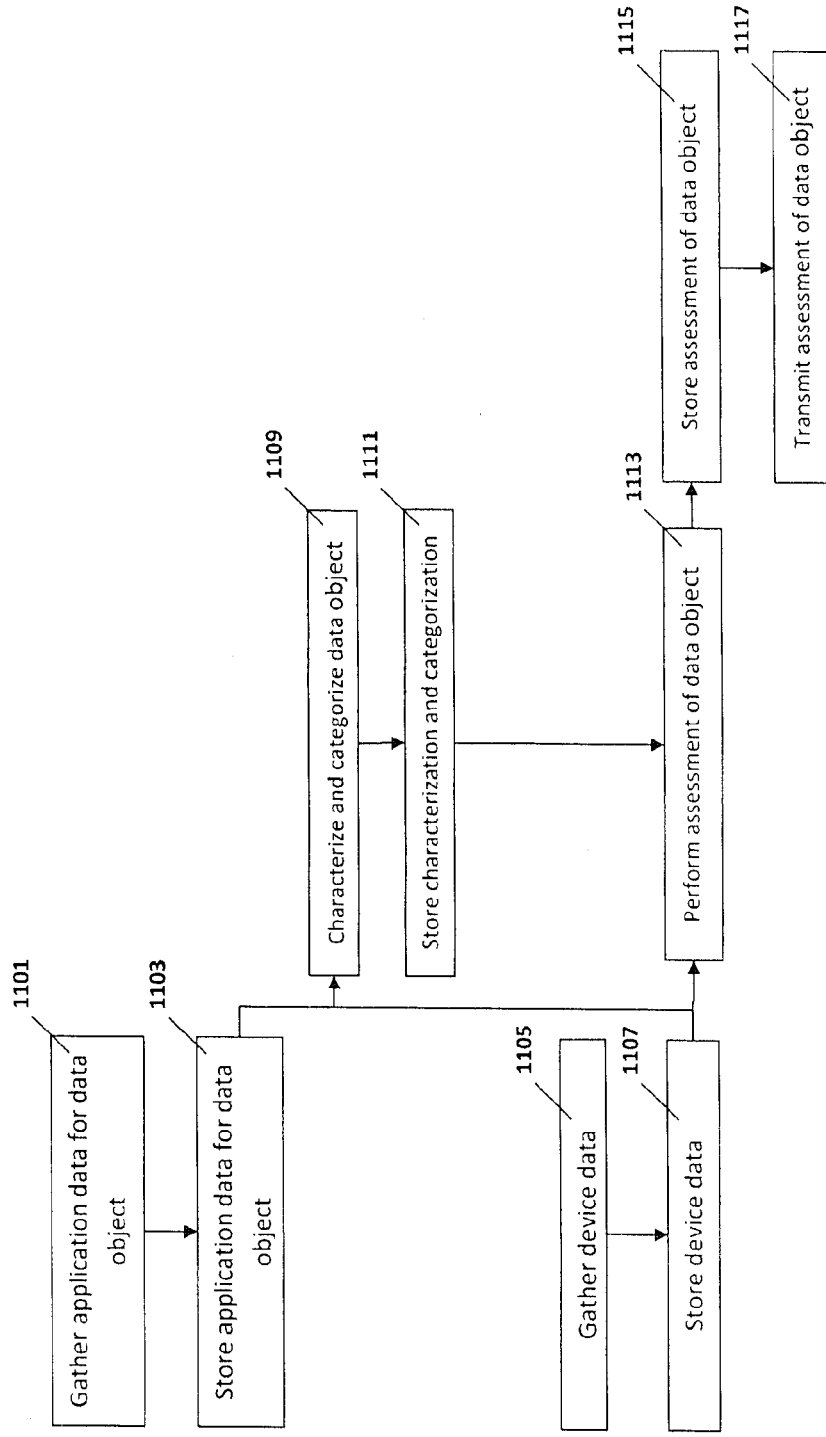
FIG. 11 is an exemplary flow diagram illustrating the steps of an embodiment of the disclosure.

In order to produce assessments for data objects or other forms of useful output, server may use a variety of methods of analysis. In an embodiment, because server has access to information collected about data objects from one or more sources, server can process the information to produce an assessment for a data object. FIG. 11 illustrates an embodiment in which server 151 aggregates application data for a data object, stores the information, generates characterizations and categorizations for the data object, assesses the data object to produce assessment information, and transmits the assessment information. In block 1101 of FIG. 11, application data (e.g., data object content, metadata, behavioral data, marketplace metadata) is gathered for a data object. Some of the possible methods for gathering and types of data gathered have been discussed above. Such methods may include gathering data from devices, from web sites, from application marketplaces, from people, and from other sources. In block 1103, application data for the data object is stored on server 151 or data storage 111 so that the data may be used at a different time than when it is gathered.

In block 1105, device data is gathered and stored (block 1107) on server 151 or data storage 111. It may be desirable for device data to be linked to the application data for the device that reported so that assessments, categorization, and characterization can take into account the source of the data. For example, if an application only malfunctions when installed on a particular device type, it is important for server 151 to be able analyze application data provided by devices in the context of what particular device type provided the data. In an embodiment, when application data is stored 1103 it is associated with device data for the device that provided it. For example, when a device 101 transmits application data to server 151, the device may transmit authentication information that allows server 151 to retrieve previously stored data for the device 101. If the device 101 has already transmitted device data to server 151, the previously stored device data can then be associated with the new application data. In such a data gathering system, it may be important to protect privacy and minimize individually identifiable information stored by server 151 or data storage 111. In an embodiment, application data for multiple devices having the same device data is aggregated so that the stored data is not linked to a particular device, but rather a set of device data shared by one or more devices. In the design of such a system, it may be important to take into account the balance between granularity of device data and the level to which the aggregated data can be ascribed to a particular device.

As part of analyzing a data object, it may be desirable for server 151 to characterize it and/or categorize it (block 1109). In an embodiment, server 151 stores characterization and categorization data for data objects (block 1111). It may be desirable for characterization and categorization data to be updated as more data becomes available or analysis of the data changes. In an embodiment, server 151 performs additional analysis (block 1109) and updates stored categorization and characterization data (block 1111) for a data object when new or updated data for the data object used by analysis systems is available.

Characterization data includes information that describes a data object's functionality, behavior, and reputation such as its capabilities, metrics for the data object, analyses of other data relating to the data object, and the like. In an embodiment, server 151 produces characterization data about a data object using application data, device data, marketplace data, distribution data, and other data available to server 151. While some methods are described below, one skilled in the art will appreciate that there are other of methods for generating characterization information that can be employed without departing from the scope of this disclosure. In an embodiment, server 151 transmits characterization information as an assessment. One will appreciate that characterization information may be useful for a user to understand when deciding whether to install an application. For example, if a user is considering downloading a game but the user receives an assessment indicating that the game has the capability to send the user's location to the internet, the user may decide not to install the game. In another example, if a user is considering downloading an instant messaging application and is concerned that the application may use a disproportionate amount of battery power, the user may receive an assessment to see the application's average battery usage metric and decide that, based on the metric, the application is acceptable to install. In an embodiment, characterization information is consumed as an input to one or more other analysis systems. For example, an analysis system producing an assessment of the privacy risk of an application may use characterization information to determine if an application has risky capabilities such as sending location or contact list information to an internet server.

Capabilities are one form of characterization data that server 151 may produce. In an embodiment, server 151 extracts capabilities from a data object. In certain mobile operating systems or application environments, applications may request granular permissions to access privileged functionality on a device, such as sending or receiving network data, accessing the phone's location, reading or writing contact entries, and SMS messaging. In an embodiment, server 151 uses data about permissions requested by a data object to determine the capabilities of the data object. Server may determine permission data by a variety of means, including metadata and behavioral data reported by devices, marketplace data, static analysis of data objects, and dynamic analysis of data objects. For example, applications on the Android operating system have to declare permissions at install time, so server 151 may analyze these declared permissions in an application package directly via metadata about an application package reported by one or more devices or via marketplace data to determine permission data.

In an embodiment, server 151 performs analysis of a data object's content to determine what APIs on a device the data object utilizes. In an embodiment, the API analysis may include a search of the data object for data sequences indicating API calls; an analysis of specific library, function, class, or other import data structures in the data object; an analysis of dynamic linker calls; an analysis of calls to local or remote services; static analysis of the data object; dynamic analysis of the data object; and analysis of behavioral data reported by one or more devices. In an embodiment, server 151 utilizes extracted API call information to determine that the application has a particular capability. For example, if an application calls an API to interact with a GPS radio on a device, server 151 determines that the application has the capability to determine the device's location. Although such analysis may detect the vast majority of APIs used by a data object, it is possible that advanced self-modifying code may prevent thorough analysis of a data object. In an embodiment, server 151 detects if the code is, or may possibly be, self-modifying. The capability of a data object to modify itself may signify that the data object is of higher risk than data objects that are more straightforward. While many instances of malware on PCs use self-modifying code to hide from anti-malware systems, copy-protection systems also often encrypt code to prevent unauthorized access; thus, self-modification alone may not be sufficient to classify a data object as malicious, it may be used by an analysis system, in addition to other characteristics, such as behavioral data, to produce an assessment for the data object.

In an embodiment, server 151 analyzes behavioral data to determine capabilities for a data object. For example, server 151 may look for a data object making phone calls, sending SMS messages, accessing the internet, or performing other actions that indicate a particular application capability. In some cases, it is important not only to understand what single functions are utilized by a data object, but also whether an application exchanges data between APIs. For example, an application that uses the internet and can read a device's contact list may have multiple capabilities that have significantly different risks. For example, an address book application that simply uses the internet to check for updates has less of a privacy risk than an address book application that reads contacts and sends those contacts to the Internet. In an embodiment, server 151 analyzes data object to determine if there are code paths by which data returned or produced by one API or service are sent to another API or service. For example, server 151 may perform taint tracking between two APIs to determine if whether an application transfers data between APIs. For example, server 151 may determine if there is a code path in a data object by which data returned by any call to the contact API on a mobile device can be provided to any network API on the device. If there is such a code path, server 151 determines that the data object has the capability of sending contacts to the internet. Having such a capability may be more valuable during further analysis by server 151 or by a user than simply knowing that an application accesses contacts and that it accesses the internet. Many applications may use both permissions; however, fewer may actually send contact data to the internet. A user or an automated analysis system will be able to use the capability of knowing that there is a code path between two APIs as a much stronger indicator of capabilities than less granular capability measurements.

In an embodiment, server 151 runs a data object in a virtual (e.g., simulated or emulated) or physical device and analyzes the behavior of the data object when run. In an embodiment, the virtual or physical device is instrumented so that it reports behavioral data for the data object. In an embodiment, the virtual or physical device's network traffic, calls, and SMS messages are analyzed by server 151. For example, a virtual device may be configured to always report a specific location via its location APIs that are unlikely to occur in any real world circumstance. By analyzing the device's network traffic for various encodings of that location, such as a binary double encoding, base 64 encoding, and text encoding, server 151 is able to determine whether the data object attempts to report the device's location to a server. In an embodiment, server 151 examines the difference in state of the virtual or physical device before the data object is run on the device and after the data object has run. For example, a data object may exploit the kernel on a device upon which it is installed in order to install a stealth rootkit. In this case, a virtual device may show a substantial difference in certain sections of memory, such as in a system call dispatch table, that should not change under ordinary circumstances. In an embodiment, the physical or virtual device has a custom root certificate authority in its list of trusted certificates and server 151 intercepts all TLS traffic, using a server certificate that is signed by the custom certificate authority, and proxies the traffic to its original destination. Because the device has a custom certificate authority, the data object is able to establish a valid TLS connection through server 151 and all encrypted traffic is able to be analyzed by server 151.

Aside from capabilities of a data object, it may be important for server 151 to gather metrics relating to a data object's effect of running on a device or its usage of capabilities on a device. For example, overuse of network data, email, or SMS messaging may be considered abusive or indicative of a malicious or exploited application. In an embodiment, server 151 analyzes application data from many mobile communication devices, such as metadata and behavioral data, device data, and other data it has available to it to produce metric data that characterizes a data object. For example, server 151 may determine how much battery usage an application requires on average for all devices or for a particular device type, how much data a data object sends over any network interface or over cellular vs. Wi-Fi network interfaces, how many email messages or SMS messages a data object sends, how many telephone calls an object makes, and other metrics.

Server 151 may produce other characterization information from what has been described above that may aid in further analysis by server 151 to produce an assessment or that may be exposed directly by server 151. In an embodiment, server 151 analyzes network traffic information associated with a data object to produce network characterization data, such as a list of the servers the data object has connected to, the ports and protocols on those servers data object communicates with, how much data is transmitted to and received from each server, In an embodiment, network characterization information includes what proportion of devices running a particular data object connect to each server. For example, an application that connects to an IM server or a known malicious bot command and control server may connect to only one or a small number of servers on all devices that it is installed on; however, a web browser or application that allows user-specified connections may connect to a very large number of different servers on different devices. In an embodiment, if a data object connects to many different servers, server 151 informs one or more devices to not collect network behavioral data for that data object to minimize unnecessary data reporting. In an embodiment, the network traffic information is gathered as behavioral data from mobile communication devices or gathered by server 151 running the data object on a virtual or physical device.

In an embodiment, server 151 determines whether a data object causes a mobile communication device 101 to access malicious Internet or other public or private networks. For example, a data object that causes a mobile communication device to access a malicious website may subject the device to exploitation. An embodiment of this disclosure allows for resolution of transmitted Inter- or Intranet addresses (e.g., URLs) to determine whether the address will direct the mobile communication device to a safe website, rather than a nefarious website or phishing scam. This information can be stored as it relates to a particular data object.

In order for a user to apply application policy to a mobile device without having to make a separate decision for every single application, it may be helpful to categorize applications so that the user may simply decide which categories of applications to allow or deny. In an embodiment, server 151 categorizes a data object using data it has available such as application data, device data, marketplace data, and characterization data. For example, if a data object is characterized as calling location APIs on a mobile communication device, then server 151 may categorize the data object as a mapping or other location-based application. In an embodiment, categories may directly map to capabilities, such as applications that read your contact list or applications that can send your location to the internet. Other example categories include whether a data object transmits any information from a mobile communication device's contact list, whether a data object causes other data such as a device's phone number to be transmitted by a mobile communication device, and other behaviors that may affect the privacy security of a mobile communication device. In an embodiment, server 151 uses metric data for a data object to categorize it. For example, server may have a category of heavy battery users that includes data objects that typically use more than 10% of a device's battery. Because the categorization may be dependent on device data in addition to characterization data, the category of battery wasters may depend on what type of device an assessment is for. For example, a data object that uses more than 10% of one device's battery may use only 5% of another device's battery.

In an embodiment, if a data object does not directly provide categorization information, server 151 can deduce such information. For example, if a data object communicates with a known instant messaging server, server 151 may determine that the data object is an IM application. For example, applications that connect to servers belonging to a popular social network may be classified during analysis as social networking applications, applications that connect to a known malicious IRC server may be classified as a malicious bot, and applications that drain one or more devices' batteries may be flagged as battery drainers.

Because the categorization of an application may be subjective and difficult to determine automatically, it may be desirable to have one or more persons, internal to an organization or as part of a collaborative community effort, determine categories for an application. In an embodiment, server 151 exposes an interface by which users can suggest categories for a data object. For example, server 151 may define a category of applications that are inappropriate for children, the applications having content that includes pornography or violence. In this example, one or more users can sign in to a community voting system provided as a web application where they can search and browse all applications known to server 151. The list of applications may be populated by marketplace crawling and application data reported by devices. Each application may have a page whereby users can select their recommended category for that application. In an embodiment, the user interface shows information about the data object, such as aggregated application data, characteristics for the data object, and other information available to server 151 so that users can make a decision based on the output of analysis. In an embodiment, the user interface allows a user to select from a list of categories, add new categories, and add tags for a data object. In an embodiment, the user interface has a discussion component so that that people may discuss the appropriate categorization for a data object. In an embodiment, the category for an application is determined by a voting system by which users may select their preferred category for the application, the category selected by the most users being the authoritative category for the application. In an embodiment, the user interface is displayed on a mobile communication device, displays a list of data objects installed on the device, and allows a user to suggest categories for those data objects.

In an embodiment, server 151 processes application data and device data to determine distribution data for a data object. Distribution data may include how widely a given application is currently distributed, what the growth of the application's distribution has been over the period of time that the application has been available, what customer demographics, such as geography, have installed the application, and other functions of the prevalence of an application amongst groups of mobile communication devices. For example, server 151 may examine how many mobile communication devices report having installed a data object at the current time to determine how prevalent that application is. In an embodiment, server 151 uses distribution data to determine trustworthiness of a data object or to analyze a data object for risk, as is discussed below. For example, an application that has been installed on many devices for a long period of time without being uninstalled is likely to be less risky than an application that is brand new and only installed on a few devices.

Because server 151 may encounter legitimate applications that are in development and therefore are not distributed widely, an embodiment of this disclosure is directed to server 151 identifying which applications may be in development, thereby preventing them from being classified as undesirable in an anti-malware or other system. Server 151 may receive application data for a data object indicating that the data object has characteristics inherent to applications in development, such as debugging symbols, debuggable permissions or flags, linkage to debugging libraries, and other characteristics. Applications in development may also be likely to have low distribution or isolated distribution. If server 151 identifies that an application is in development, it may store an indication of the application being considered in development and use the indication to prevent server 151 from assessing the application as suspicious or undesirable or to decrease the likelihood that the server reaches such assessments. In an embodiment, when determining whether a data object should be treated as "in development," server 151 considers previous data objects encountered by devices that encountered the data object in question. If the devices frequently encounter data objects that are in development, server 151 is more likely to classify the data object as in development. If the devices infrequently encounter data objects in development, server 151 is less likely to classify the data object as under development.

In an embodiment, server 151 establishes the reputation or level of trust for the data object. In an embodiment, the level of trust is determined manually or automatically and assigned to a single data object, multiple data objects that are part of an application, multiple versions of an application, or for all applications from a given developer on one platform or multiple platforms. In an embodiment, trust data is stored by server 151 on the server or in data storage 111 so it may be subsequently used directly or as part of producing an assessment.

In an embodiment, trust is granted via a manual review process for an application. For example, if server 151 deems application to be risky based only on its capabilities (e.g., has access to private data and/or utilizes sensitive APIs), a user viewing the assessment may choose not to download it, even if the application is well regarded. To solve this problem, the application may be assigned a trust rating by manual review. If the review deems the application to be trustworthy, the assessment reports the application as not risky; however, if upon review, the application is determined to be suspicious, the assessment may continue to report the application as risky. Because a reputable application may consist of multiple data objects, may be updated with new data objects, or may have versions for multiple platforms, it may be important to allow a trust rating to span multiple data objects, applications, and even platforms so that a manual review does not need to be completed for every version or file that is part of an application. Similarly, because many reputable software vendors may produce multiple applications that can be assumed to be trustworthy, it may be desirable to automatically grant a high level of trust to data objects identified to originate from those vendors. In an embodiment, server 151 grants a data object a high level of trust if the data object can be attributed to a trusted vendor or trusted applications through data available to server 151 such as the data object's cryptographic signer, package name, or marketplace metadata.

In an embodiment, server 151 uses distribution data and application data to establish trust for an application. For example, if a popular application, such as Google® Maps, is installed on millions of mobile communication devices and there are multiple previous versions of the application all having the same cryptographic signer and similar distribution characteristics, subsequent versions of the application with that cryptographic signer would be deemed to have a high level of trust. If server 151 encounters another application that has the same name as a popular application, such as Google® Maps, is installed on only a few devices, and uses a different cryptographic signer, server 151 may grant the low-distribution application a low level of trust. An anti-malware system may use such data indicating that a data object has low trust to automatically assess a data object as undesirable or to flag it for manual review. In an embodiment, trust data for an application may take into account associated applications such as applications determined to be created by the same developer on the same platform or on different platforms. For example if a company produces an application for one mobile platform that has a large number of users and good ratings, and the company releases a new application on a different platform, the new application may be given a high trust rating based on its association to the first application.

In an embodiment, server 151 analyzes application data to determine if a data object is part of a mobile communication device operating system or preloaded by a manufacturer or operator. In an embodiment, if server 151 determines that a data object is part of a mobile operating system or is preloaded, it is be granted a high level of trust automatically.

In an embodiment, server 151 analyzes user-generated ratings and comments for an application, such as those gathered by application marketplace data gathering system 1005. For example, server 151 may use ratings and reviews to determine a trust rating for the application. If an application has low ratings and negative comments indicating that the application "crashes" or is otherwise "bad", server 151 assigns the application a low trust rating based on the reputation indicated in its comments; however, if an application has consistently high ratings and many reviews, server 151 assigns the application a high trust rating. In another example, server 151 uses ratings and reviews to as a subjective indicator of application quality for use in producing assessments for the application. If an application has a significant number of reviews with text indicating that the application "drains battery" or "sucks battery", server 151 determines that the application has the reputation of having adverse battery effects and produces an assessment of the application indicating that.

In an embodiment, server exposes trust data to third-parties via an API. For example, trusted applications may be considered certified by lookout. In an embodiment, the trust level exposed by the API is binary (e.g., trusted, not trusted), fuzzy (e.g., 86% trusted, 11% trusted), or categorical (e.g., fully trusted, malicious, suspicious, semi-trusted). Mobile application marketplaces may wish to display an indicator of this certification on an application download user interface as a signal that the application has a good reputation. In this case, server 151 may expose an API by which third-parties can supply a data object or identification information for a data object such as a hash identifier, package name, or cryptographic signer. After receiving a data object or enough information to identify one, server 151 responds with an indication of whether the data object is considered certified or not. In an embodiment, the response is an image indicating whether server 151 considers the data object to be certified or not. In an embodiment, the response contains a hyperlink to server 151 whereby a user can verify that the certification for the application is genuine. In an embodiment, the web page referenced by the hyperlink shows additional information about the application, such as why it was considered trusted or not (e.g., through manual review, comments, distribution data), what permissions are requested by the application, characteristics and capabilities the application has, and commentary about the application during manual review.

Using data gathered by server 151 or from an analysis system described herein, server may produce an assessment (block 1113 of FIG. 11). After producing the assessment, server 151 may store the assessment of the data object so that it may be retrieved at a later time (block 1115). Server may then transmit the assessment for the data object (block 1117). For example, server may publish the assessment on an application provider website, provide the assessment in the form of searchable reports, transmit a notification to a mobile communication device, transmit virus signatures containing the assessment that a given data object is known good or known bad, and transmit a response to an API call querying for the assessment of the data object. Such information can be in the form of readable text, a machine readable format, or may include a "score," a badge, an icon or other symbolic rating. One skilled in the art will appreciate that other situations in which server 151 transmits an assessment for the data object are possible without departing from the scope of this disclosure.

In an embodiment, assessment data includes the output from an analysis system, such as characterization data, categorization data, trust data, and distribution data. For example, an assessment for a data object may include (solely or in addition to other information) detected capabilities for the data object, average battery usage for the data object, average number of SMS or email messages sent by the data object, the most common servers the data object connects to, the average amount of network data for the data object, and trust ratings for the data object. One will appreciate that the above assessment data may be provided as an input into to server 151. For example, a network operator or enterprise may operate a server that produces assessment data and feeds it data back to a master server. In another example, users may determine assessment data and provide it to server 151 via an interface such as a web application. In this case, users may provide subjective trust data, risk ratings, a categorization, or other assessment data that may be used by the server. In an embodiment, server 151 combines assessment data received from multiple sources to produce an aggregated assessment. For example, if a malware author attempts to transmit an assessment to server 151 indicating that a malicious application is safe in the hopes of causing server 151 to produce a false assessment, the server may utilize the number of unique sources providing assessments and the trustworthiness of those sources to produce the aggregated assessment. If one hundred assessments are received from different, reliable sources such as network operators and enterprises that indicate the application to be malicious, but ten thousand assessments from a particular unverified source indicate the application to be safe, the server produces an aggregated assessment indicating the application to be malicious.

In an embodiment, assessment data produced by server 151 includes one or more ratings for a data object. For example, an assessment for a data object may include a rating for the data object's privacy by server 151 taking into account whether the application has the capability to send location data, contact data, SMS messages, or files from a device to a server. In another example, an assessment for a data object may include a rating for the data object's security by server 151 taking into account whether there are any known vulnerabilities for the application, whether the application listens for network connections on any ports, whether it meets secure coding guidelines, what the trust level of the application is, and whether there are any anomalies in the application (e.g., stealth code, decrypted code, structural anomalies). In another example, an assessment for a data object may include a rating for the data object's battery impact, such as estimated number of minutes of phone battery life reduction, by server 151 taking into account by taking into account the battery usage data reported by devices. In another example, an assessment for a data object may include a rating for the data object's performance that is produced by server 151 taking into account the average CPU usage of the application and the frequency which the application does not respond to user input events. In another example, an assessment for a data object includes a quality rating that is produced by server 151 taking into account the frequency of application crashes, user comments, user ratings, and the average time the application is kept on devices. In an embodiment, server 151 provides multiple ratings as part of one assessment so as to provide information about a data object along multiple dimensions. In an embodiment, assessments may be binary (e.g., good, bad) or fuzzy (e.g., 100%, 90%, 10%). In an embodiment, multiple ratings are combined into an overall rating.

In an embodiment, server 151 processes multiple data sources available to server 151 to produce a rating for the data object. For example, server 151 may utilize application data, device data, characterization data, trust data, distribution data, and user-supplied data to determine if an application is malicious. The server may utilize a variety of systems or models applied to the data available at the server to produce the assessment. For example, producing an assessment of whether a data object is malicious may involve a malware detection system that includes a heuristic engine that analyzes characteristic data to identify behavior of data objects that are likely to be malicious. Some example heuristics include detecting whether a data object utilizes any capabilities to evade detection by hiding from application enumeration systems on an the OS it is installed on, whether an application attempts to modify itself, whether an application has capabilities associated with known spyware, and whether an application connects to known malicious servers.

One skilled in the art may appreciate that part of the analysis performed at server 151 to produce an assessment may be seen as extracting features for a data object, and another portion of analysis may be seen as applying a model to those features to produce a useful assessment; thus, one may apply a variety of systems, such as artificial intelligence systems or algorithms, to process the features for a data object to reach a desired form of rating or assessment.

In an embodiment, server 151 produces multiple assessments for a data object that take into account different device data or configuration information. For example, if server 151 is configured to produce assessments of whether a data object will function correctly and if a data object malfunctions when installed on one type of device, but functions correctly when installed on another device type, server may produce two assessments for the data object. If server 151 has an API by which a mobile communication device 101 can request an assessment for a data object given identifying information for the data object and the mobile communication device has sent device data to server 151, then server 151 can provide the assessment for the data object that corresponds to the device requesting the assessment. If a device 101 where the data object would malfunction requests an assessment, then server 151 will return the assessment indicating the malfunctioning behavior of the data object on that device 101. If a device 101 where the data object would function correctly requests an assessment, then server 151 will return the assessment indicating the correctly functioning behavior on that device 101.

In an embodiment, an assessment indicates whether a data object is allowed to run on a device given policy set by an administrator. If multiple policies are configured on server 151 and data storage 111 stores which policy is to be applied to a device 101, then a given data object may have multiple assessments that depend on the policy of the device querying for an assessment. For example, if a device with a strict privacy policy requests an assessment for an application that can share a user's location, server 151 transmits an assessment indicating that the application is disallowed. If a device with a lenient privacy policy requests an assessment for the same application, server 151 transmits an assessment indicating that the application is allowed. In an embodiment, assessment data is not stored and only information used to produce the assessment such as application data, device data, distribution information, characterization information, trust data, and categorization information is stored and the assessment is performed upon request by applying policy to the stored information.

Although automated analysis systems may produce acceptable results most of the time, there may be situations in which manual analysis overrides the result of automatic analysis. In an embodiment, server 151 stores manual analysis results for a data object and transmits the manual analysis results as an assessment. For example, server 151 may categorize an application as a social networking application based on its behavioral data; however, the application may actually be a word processing application that allows the user to publish notes to a social network. In this case, a user or administrator may override the categorization for the data object, server 151 storing the categorization and transmitting it in response to a request for an assessment for the data object. In another example, an anti-malware system identifies data objects having certain characteristics as undesirable. It may also be desirable for a user to manually configure server 151 to treat particular data objects as undesirable. Server 151 stores a list of data objects that are considered undesirable and, when asked for an assessment for one of these data objects returns an assessment indicating that the data object is undesirable.

Because it may be desirable for assessments about a data object to reflect the most up-to-date information available, in an embodiment, server 151 first produces an assessment and then updates it if additional application data or device data becomes available or if the analysis system itself is updated. In an embodiment, if a data object is re-assessed (e.g., because of new application data, device data, or updated analysis systems), server 151 stores the new assessment 1111 and transmits it 1113. For example, after gathering device data and application data for a data object from ten devices, server 151 may generate an assessment for that data object. Then, if server 151 receives device data and application data from one thousand more devices, it may re-analyze the data object in light of the new data, producing a new assessment for the data object. If the updated assessment is materially different from the first, actions such as notifying devices or users may be performed by server 151.

D. Anti-Malware System

In an embodiment, server 151 and mobile communication device 101 are configured to function together to prevent malware or spyware from adversely affecting mobile communication devices. Because mobile communication devices are limited in memory, processing ability, and battery capacity, it may be desirable for server 151 to perform analysis, such as the analysis described herein, to determine if an application is considered to be malware or spyware rather than each device performing the analysis. Furthermore, it may be desirable for server to store the results of the analysis so that if multiple devices encounter the same application, the analysis does not need to be repeated. Additionally, it may be desirable for server 151 to collect data about potentially malicious applications, using data collection systems described herein, in order to provide data from a variety of sources for use by analysis systems.

In an embodiment, when mobile communication device 101 assesses a data object, such as an application package or executable, to determine whether the data object is malicious or otherwise undesirable, the device sends a request to server 151 for an assessment of the data object, the request containing identifying information for the data object. In an embodiment, the request transmitted by mobile communication device 101 contains application data for the data object for use by the server in performing the assessment. For example, in addition to transmitting identifying information such as an application's package name and hash, mobile communication device may additionally transmit the permissions requested by the data object and information, such as a list of APIs utilized, determined by the device by performing static analysis.

In an embodiment, mobile communication device 101 gathers metadata for a data object by using operating system provided facilities and potentially additional processing. For example, both the Blackberry and Android platforms provide mechanisms by which an anti-malware application can query the list of packages installed on a device. Each also provides methods to query additional information about the packages such as cryptographic signature information and information about how the packages choose to integrate or expose themselves to the operating system.

In another example, mobile communication device 101 may extract features from a data object to assist in server 151 producing an assessment. In an embodiment mobile communication device 101 performs static analysis on the data object to extract application data to transmit to server 151. For example, on Android, the device may analyze the executable portion of an application packages, typically called "classes-.dex". The device may extract a list of inter-process communication calls directly or indirectly performed by the executable file that utilize the "binder" mechanism and transmit information about the calls to server 151 for use in analyzing the application package.

In an embodiment, server 151 may analyze the data object immediately, or may need to gather additional information using a process such as one disclosed herein. After producing an assessment for the data object, the server transmits the assessment to mobile communication device 101. In an embodiment, the assessment contains an indication of whether the data object is considered undesirable or not. For example, server 151 may transmit one of three assessments, known good, known bad, and unknown. If the server determines that the data object is known to be good (e.g. because it has a high trust level), it will return an assessment that the data object is known good. If the server determines that the data object is known to be bad (e.g., because it is determined to be a piece of malware), it will return an assessment that the data object is known bad. If the server does not have enough information to make a determination, it will return an assessment that the data object is unknown. In an embodiment, the assessment contains a risk level of the data object or a confidence level of the known good or known bad assessment so that mobile communication device or its user can use the risk or confidence level to determine how to classify the data object.

In an embodiment, the assessment transmitted by server 151 to mobile communication device 101 contains information as to why server 151 determined that the data object was undesirable. For example, server 151 may transmit the name of a malware family the data object was determined to belong to or server may transmit an HTTP URL referencing server 151 that mobile communication device 101 can use to display additional information about the data object, the URL containing an identifier that is decoded by server 151 to allow it to retrieve stored information about the data object. The web page may display additional information such as the output from different analysis systems used to produce the assessment. For example, the web page may display distribution information for the data object, information about common servers connected to by the data object, information provided by human analysis of the data object, trust data associated with the data object, information about the geographic distribution of the data object, information about similar data objects, and information about the author of the data object.

It may be desirable to minimize requests mobile communication device 101 needs to send to server 151 for assessments of data objects so that the device minimizes the amount of data it transmits and receives, reduces time required to assess a data object, optimizes battery consumption, and minimizes load on server 151. In an embodiment, a mobile communication device 101 maintains a local cache of assessment information received from server 151. The local cache may be stored using a lightweight database such as SQLite or in a proprietary binary file format that is optimized for assessment storage. For example, the cache may contain an indication as to whether a data object was undesirable or not, a risk level associated with a data object, and definition information such as identifying information for a data object. When a device scans a data object, it can look up the data object's identifying information in the local cache. If an assessment for the data object is cached, that assessment is used. If an assessment is not cached, the device retrieves an assessment from server 151. In an embodiment, when a mobile communication device inserts an assessment into its cache for a data object encountered on the device, it generates definition information for the data object. For example, a device may use the hash of a data object's content to ensure that it caches assessment results from a server. In an embodiment, server 151 transmits definition information with an assessment so that mobile communication device can apply the assessment to the appropriate set of applications. For example, in some cases server 151 may indicate that an assessment only applies to a specific data object identified by a hash of its contents while in other cases the server may indicate that an assessment applies to all data objects signed with the same cryptographic key.

In an embodiment, a mobile communication device 101 stores a local cache of definitions for known good data objects and known bad data objects for use by a recognition component (described below) operating on the mobile communication device. Using the recognition component, the mobile communication device can determine an assessment for a suspect data object if the local cache contains a definition and corresponding assessment that corresponds to the suspect data object. For example, the definitions may use criteria such as hash identifiers, package names, and cryptographic signers to match a data object. Each definition may have a corresponding assessment (e.g., "good", "bad"). If a definition matches a suspect data object, the definition's assessment is used for the suspect data object. If no definitions correspond to the data object, such as the data being recognized as safe or not safe, then the mobile communication device 101 may transmit application data for the suspect data object to server 151 for more comprehensive analysis.

In an embodiment, the cache is used as the primary storage of anti-malware definitions that determine whether anti-malware software on mobile communication device 101 will recognize a data object as malicious or not without having to consult server 151. In an embodiment, the cache stores definition information used by a recognition component on the device. For example, the cache may contain definition information such as package names, cryptographic signers, byte sequences, patterns, or logic that is used to match data objects on a device with cached assessments. If the cache contains an entry linking a particular byte sequence to an assessment of being a malicious application and a data object on a device contains that byte sequence, then the device will determine that data object to be malicious without having to contact server 151. In an embodiment, the cache only contains definition information, all definitions corresponding to a single assessment of a data object being malicious. In an embodiment, the cache may contain assessment information, the assessment information possibly containing an identifier, as discussed above, which can be transmitted to server 151 in order for the device to retrieve information for display to a user. Such an identifier being used to retrieve data from server 151 allows the cache to minimize the information it stores about potential malware. In an embodiment, a device cache serves as both a whitelist and a blacklist. The cache contains definition information for known good and known bad data objects so that if a data object is determined to be known good or known bad, the device does not need to request an assessment from server 151. In an embodiment, the cache that serves as both a blacklist and a whitelist is used by a recognition component on the mobile communication device to determine if data objects are recognizably bad or recognizably good. If a data object encountered by a device is neither recognizably good nor recognizably bad based on definition data stored in the cache, then the device may transmit application data for the data object to server 151 so the device can receive an assessment for the data object from the server. In an embodiment, anti-malware software on a mobile communication device is installed with a pre-populated cache of definitions that are modified by the device as it receives new assessments or stored assessments are deemed to be invalid.

In an embodiment, assessments and definitions cached on a device are only considered valid for a period of time so that the mobile communication device does not rely on data that is potentially out of date. In an embodiment, cached assessments and definitions are stored indefinitely and considered to be valid without time constraint. In an embodiment, a device only stores certain types of assessments and definitions. For example, a device may only cache known good assessments or may only cache known bad assessments. In this case, definitions are only stored if they have a corresponding assessment. In an embodiment, part of the cache is stored in volatile storage, such as RAM, and part of the cache is stored on non-volatile memory, such as flash. Because volatile memory is typically more limited yet much faster than non-volatile memory, a device may store frequently accessed assessments and definitions in volatile memory while less frequently accessed assessments and definitions in non-volatile memory. For example, if an anti-malware system analyzes data objects every time they are opened, it may be desirable to very quickly determine an assessment for a data object if it has been recently scanned and not changed. By storing a recently used definition and assessment in volatile memory, the device can recall the previous assessment very quickly.

In an embodiment, server 151 transmits cache control information with an assessment, indicating whether the device should cache it and, if so, for how long. For example, server 151 may transmit an assessment for a popular application from a reputable company, including cache control information indicating that a device should cache the assessment. If server 151 transmits an assessment for a lesser-known application, it may include cache control information indicating that a device should not cache the assessment, as the application may turn out to be considered undesirable in the future after more is known about it. In an embodiment, server 151 determines cache control information based on the confidence of an assessment. For example, known good assessments for applications that have a high trust level may be considered to be highly confident while assessments indicating that an application is unknown due to lack of data available to the server may not be considered confident. In an embodiment, when an assessment expires, cached definition information associated with the assessment is also expired.

Because retrieving cached assessments is faster than retrieving assessments from server 151 (thereby minimizing the delay and overhead with determining whether a data object is malicious or not), it may be desirable to maximize the number of assessments that can be determined locally from cached data. In an embodiment, server transmits assessments to a mobile communication device without the device requesting the assessments and the mobile communication stores these assessments in its cache. Because all of the assessments available to server 151 may require more storage than is desirable on mobile communication device 101, server may only transmit a subset of its available assessments. In an embodiment, server 151 determines which assessments to transmit to mobile communication device 101 by analyzing device data and application data. For example, server 151 may store the operating system a data object is compatible with associated with assessments for data objects in such a way that the server can query for all of the assessments related to a given operating system. Server 151 may then only transmit assessments to a mobile communication device that are for data objects that are compatible with the operating system the device is running. The other assessments would not be transmitted to the device because the data objects referenced by the other assessments are not able to run on the device's operating system. In another example, server may use a device's country, language, or area code to determine what assessments to transmit to the device. Users in the United States are unlikely to download Russian-language applications, just as users in Russia are unlikely to download Spanish-language applications.

In an embodiment, server 151 stores which assessments it has already transmitted to a device and the device has successfully received so that assessments are not unnecessarily re-transmitted. If a device has not received assessments that are desired, the server transmits the assessments the next time the device connects. In order to efficiently track which assessments have already been received by a device, server 151 may group assessments, such that a given device receives all assessments in one or more groups. For example, a given group of assessments may have changes (e.g., new data objects being assessed, changes to existing assessments) multiple times per day; however, a device may be configured to receive updated assessments only once per day. To determine what assessments to transmit to a device, server may record the time when a device has last received up to date assessments for a group and only examine changes to the group since the device has last received assessments. For example, if a device receives all of the assessments for a given group on Monday and two new assessments are added to the group on Tuesday, then, if the device connects on Wednesday, the server only needs to query what assessments have changed in the group since Monday and will determine that it needs to transmit just the two added assessments. In an embodiment, server utilizes a push service such as one described herein to alert a device that there are additional assessments that server is ready to transmit to the device. When using such a push service, when server updates assessments that are part of a group, all devices that receive assessments from that group can be updated with the latest assessments nearly immediately.

There are a variety of ways in which assessments can be grouped by server 151 in order to selectively transmit assessments to a device. For example, there may be more assessments for data objects compatible with a given operating system than it is desirable to store on a device. In this case, the server may produce a group of assessments that correspond to the most prevalent data objects, based on distribution data or market data available to server 151. In this case, devices will cache assessments for the data objects they are most likely to encounter. It is also possible to further improve the likelihood that a device has assessments cached for data objects it encounters by server 151 analyzing the application data available at the server corresponding to the data objects previously encountered by the device and predicting, based on those previous encounters, what data objects the device is likely to encounter in the future. Assessments for these likely data objects can then be transmitted to the device.

Because the optimal amount of assessment data to cache on a device may be different depending on a device's hardware, user behavior, or user preferences, it may be desirable for that amount of data to be tunable. In an embodiment, the amount of assessment data to cache on a mobile communication device 101 is determined by server 151. For example, server 151 may examine the amount of storage available on a device, the frequency by which a user downloads applications, and how likely additional cached assessment data will be to reduce the number of required assessment requests transmitted by the device. If a device has a lot of available storage and its user downloads a lot of applications, then the server may determine to cache a large amount of assessment data; however, if a device has little available storage and its user rarely downloads applications, then the server may determine to cache only a small amount of data or no data. The server may also examine previous assessment requests made by the device to determine if those requests could have been avoided by the device caching additional assessment information. For example, if a device currently receives assessments belonging to a particular group of applications and the server is evaluating whether device should receive assessments for an additional group of applications, the server examines previously assessment requests to determine how many of those assessments were in the second group. If server 151 determines that enough of the assessments requests would have been avoided, then it will start transmitting assessments from both groups to the device. In an embodiment, a user can control the amount of storage to allocate to cached assessments on a mobile communication device 101.

Instead of always producing an absolute assessment (e.g., known good or known bad), it may be desirable for server 151 to report that it does not yet have an assessment. In an embodiment, server 151 transmits an assessment for a data object indicating that the object's undesirability is unknown. When mobile communication device 101 encounters a data object, it transmits a request to server 151 for an assessment, and receives an unknown assessment, the device temporarily trusts the data object and retries the request for assessment at a later time. In order to avoid unnecessary requests, the device increases the time delay between retries if it continues to receive unknown assessments. During such a period of temporary trust, the device does not re-transmit an assessment request every time a data object is scanned. For example, in an anti-malware system on a mobile device designed to scan files on a file system when they are accessed, the first access to a data object may result in the device transmitting an assessment request to server 151. If the server returns an unknown assessment, then the device stores a temporary entry in its assessment database indicating identifying information for the data object, a temporary assessment indicating that the data object is allowed, and the time period the assessment is valid for.

In an embodiment, server 151 transmits information about a data object in an unknown assessment and mobile communication device 101 uses the data assessment from server 151 as an input into a local analysis system. For example, mobile communication device 101 may have a heuristic system that analyzes the content of a data object to determine if it is malicious. In the case of a known good or known bad result from server 151, then the device either does not run the heuristic system or discards the result from the heuristic system. If server 151 returns an unknown result including a trust level for the data object, device 101 combines result from the heuristic system with the trust level provided by the server to determine whether to treat the data object as undesirable or not. For example, mobile communication device 101 may scale the result from local analysis based on the trust level reported by server 151. If a heuristic system on the device determines that a data object is 66% risky and an unknown assessment from server 151 indicates that the data object has a suspicious 1% trust level, the device determines that the data object is undesirable; however, if the unknown assessment from server 151 indicates that the data object has a 70% trust level, then device 101 determines that the data object is desirable.

In order to respond to undesirable applications, such as malware and spyware, as soon as they are identified as such, it may be desirable for server 151 to transmit notifications to mobile communication device 101 about data objects that are determined to be undesirable after previously being classified as good or unknown. In an embodiment, server 151 stores information about data objects encountered by mobile communication device 101 so that if a data object encountered by the device was assessed to be good or unknown but was subsequently determined to be undesirable, server 151 may determine all of the devices that have encountered the data object and transmits a notification indicating that the data object is undesirable. In an embodiment, server 151 only transmits a notification to device 101 if the data object that is the subject of the notification can operate on the device's operating system. For example, if a device runs Blackberry and has encountered an Android spyware application, server 151 would not transmit a notification to the device; however, if the device encountered a Blackberry spyware application, server 151 would transmit a notification. As disclosed herein, the determination of whether a data object can operate on a given device may be determined by analyzing device data for the device and application data for the data object.

In an embodiment, the notification transmitted from server 151 to device 101 is designed to be consumed by the device and includes both identification information and remediation information for the data object. For example the notification may utilize a push service provided by a platform vendor and include the package name and content hash for a data object. The notification may also specify a remediation action such as "killing" any processes containing the data object, requesting for a user to uninstall the data object, and deleting the data object without user intervention. In an embodiment, the notification includes information for display to a user about the data object such as remediation instructions, an explanation for why the data object is considered undesirable, or a request to take a particular action. In an embodiment, the notification is in the form of a human readable message, such as a text message, email, or telephone call. It may be desirable for server to perform both human readable and machine readable notification to ensure that a user responds to a dangerous data object. For example, server may transmit an email message to a user and transmit a notification for the device to remove the data object without user intervention.

In an embodiment, mobile communication device 101 contains a database of all data objects that are present on the device and server 151 transmits updated signature data to the device when a data object encountered by the device is determined to be undesirable. When the device receives the updated signature data, it compares the updated signature data to data objects present on the device. If any objects that are present on the device are considered by the updated signature data to be undesirable, then the device immediately initiates remediation actions, not waiting for the next time the data object is scanned.

If an anti-malware system performs an assessment for a data object, it may be desirable to trust the data object as long as it hasn't changed to avoid having to re-assess the data object. In an embodiment, mobile communication device 101 maintains a list of data objects identified that have been analyzed and are considered to be desirable. When a data object is desired to be scanned, the device may first check this list to see if the data object is present. If the object is present, the device does not re-scan the object. After scanning a file and determining it to be desirable, the device places an identifier for the data object in the list. Example identifiers include a file name, filesystem node identifier, or operating system specific data object handle. In an embodiment, the mobile communication saves this list of data objects to non-volatile storage so that the list can be preserved even if the device is rebooted or runs out of battery. When storing assessments and later accessing them, it's important that any stored assessments are valid only for a particular set of data object content. If the data object's content changes, a different assessment may be necessary, as the data object may have been modified to include malicious code that was not present in the original data object. In an embodiment, the list contains a cryptographic hash of the content of the data object. When the device determines whether the data object is considered to be on the list, it compares the hash of the data object as stored on the device with the hash stored in the list. If the hash matches, the data object is considered to be on the list. In an embodiment, the anti-malware software can determine when files are opened and closed. If a file on the list is opened with write access, then it is removed from the list. While there are open writers to the file, the file cannot be added to the list.

One will appreciate that an embodiment of this disclosure contemplate other ways for reducing network traffic while providing sufficient options for securing mobile communication devices. In an example, a mobile communication device can request an analysis of all of the data resident on the device (a "scan") when the mobile communication device first starts up or powers on, or when the application responsible for monitoring the mobile communication is first launched. This provides a baseline analysis of the security of the mobile communication device. Future scans may be performed when new applications are accessed by the mobile communication device, or at pre-set time intervals, or upon user request. Scans may be adjusted depending upon the access to network 121. If connectivity is an issue, then only newer data may be assessed, or suspect data. Scans may be queued and performed when connectivity improves.

In an embodiment, an anti-malware system on mobile communication device 101 has the capability to perform both an on-demand and a scheduled scan of all data objects present on a device. If the anti-malware system utilizes server 151 to perform assessments for the data objects, it may be desirable to optimize the time required to perform the scan. Because network latency causes a delay between the time a request for an assessment is transmitted by a device and the time the device receives a response from server 151, it may be desirable to pipeline requests in such a way that the device does not simply idle while waiting for a response. In an embodiment, mobile communication device transmits a request to server 151 to provide assessments for multiple data objects and server 151 transmits assessments for those multiple data objects to the device. For example, during an on-demand scan, a device may be configured to first enumerate all of the data objects on the device and then send a request to server 151 to assess all of the enumerated data objects. In another example, a device may enumerate ten data objects at a time, then send a request to the server and receive a response for those ten data objects before scanning additional data objects. In another example, a device may enumerate data objects and transmit assessment request, continuing the enumeration process without waiting for assessment responses from the server. The device may only wait for responses when the enumeration is complete.

In an anti-malware system that blocks the loading or executing of a data object until the system has reached a disposition, it may be desirable to assess a data object before it needs to be loaded or executed. In an embodiment, mobile communication device 101 proactively scans data objects and stores the results so that when the data object is loaded, the device can reference the previous scan result. For example, when a device loads a program that depends on multiple other files (e.g., an executable that is linked to shared libraries), an anti-malware system on the device may analyze the program to determine all of the libraries it depends on, send a request to server 151 for assessments for the program and its dependent libraries, and then allow the program's execution to proceed once the device receives positive assessment results. When the device's operating system loads the libraries the application depends on, no request to server 151 is needed because the system already has up-to-date assessments for the libraries. If the libraries were not proactively analyzed, the total load time for the program could be greater as the device may have to wait for multiple requests to server 151 to occur in serial. In an embodiment, software on a mobile communication device analyzes data objects after they are downloaded but before they are executed. For example, anti-malware software on a device may watch the download directory for new files or may simply wait for files to be created, written to, and then closed. After the download completes, the software may initiate a scan of the new file so that once the file is opened, the system already has assessed it and can recall the previous assessment.

If an anti-malware system blocks user-requested or system operations while it is assessing a data object, it may be desirable to give the user an indication that an assessment is in progress, especially if the assessment depends on a network connection that may have significant latency. In an embodiment, an anti-malware system on mobile communication device 101 displays a user interface indicating that a data object is being scanned when the system is scanning the data object and blocking user-requested operations. For example, if an anti-malware system prevents the execution of applications until the application and all of its dependent libraries have been assessed by interposing itself in the application launch process, there can be a significant delay perceivable to the device's user. The annoyance associated with the delay may be mitigated by informing the user what is happening instead of the device simply seeming unresponsive. When a user launches an application, the device displays a user interface view indicating that the anti-malware system is assessing the application that the user launched. In an embodiment, the user interface allows the device's user to skip waiting for the scan to finish. For example, if the device's scanning of a data object needs to connect to server 151 and the user doesn't want to wait, the user may proceed without waiting for the assessment to return. If the assessment subsequently returns that the data object is malicious, the device may initiate remediation actions, such as killing any processes containing the data object and deleting the data object, even though the data object was allowed to run.

A user may be interested in having an application assessed, but does not wish to wait for a response from server 151. The user may choose to forego complete analysis and use the application while waiting for analysis results. In such a situation, it would be helpful if server 151 or the user's mobile communication device 101 could provide a temporary trustworthiness evaluation prior to formal analysis. Reporting can be in the form of an interface element, a notification, a warning, a risk rating, or the like. In an embodiment, the mobile communication device 101 can run a local analysis to determine whether an application is temporarily trustworthy. It may also be desirable to show information about a data object on a user interface that indicates when an anti-malware system is waiting for an assessment from a server so that users do not accidentally skip items that are high risk. In an embodiment, the waiting user interface shows the result of local analysis while waiting for an assessment from server 151. For example, the user interface may show the capabilities of the data object or a risk score for the data object. In an embodiment, the device only allows a user to skip waiting for an assessment from server 151 if local analysis determines that the data object is low risk. For example, a risk score may be calculated by analyzing what sensitive functionality a data object accesses. A data object that accesses a user's contact list and browser history may be deemed more risky than a data object that doesn't access any sensitive functionality.

In an embodiment, an anti-malware system on device 101 determines whether it should wait for a response from server 151 before reaching a conclusion based on the context of the scan. For example, scans that occur during system startup or when there is no active network connection should not block waiting for a response from the server. In order to determine if there is a network connection, the anti-malware system may rely on a variety of methods such as querying network interface state information provided by the operating system and analyzing whether requests to server 151 time out. If the anti-malware system intercepts system calls, scans that occur as a result of the system trying to execute a data object should block while waiting for a response from server 151 while scans that result from an application getting information about a data object (e.g., file manager extracting an icon for the data object) should not block while waiting for a response. In an embodiment, if a request for a data object assessment is unable to be completed, it is retried at a later time.

In an embodiment, the anti-malware system skips portions of server or local analysis if an accurate assessment can be produced without the additional analysis. For example, if local analysis determines that a data object is not risky, then the device may not request an assessment from server 151—the device may only request an assessment from server 151 if the data object being scanned has a minimum riskiness as determined by a local analysis component on the device. In an example, the determination of whether to skip waiting for additional results is determined by both the results and which system returned each result. A "bad" result from local analysis before receiving a result from server 151 may be enough to treat a data object as malicious; however, a "good" result from local analysis may still require the system to wait for an assessment from server 151 to confirm that the data object is good before determining a final disposition.

In an embodiment, if multiple analysis systems produce different results, the anti-malware system on a device analyzes the results of the systems to make a determination as to the final disposition of a data object, the determination taking into account both what results were produced and which system produced each result. For example, the anti-malware system may determine that a single undesirable result is enough to flag a data object as undesirable. In another example, server 151 may be treated as authoritative or server 151 may transmit a confidence level of its assessment so that device 101 can determine whether to treat the assessment as authoritative or not. In another example, known bad results from server 151 may be authoritative but known good results from server can be overridden by a known bad result from a local analysis system on device 101.

In an embodiment, server 151 stores a list of malware or other undesirable applications that have been detected on the device and which are still active on the device. In order for this list to be populated, mobile communication device 101 sends events to server 151, including whenever it encounters an undesirable application, whenever an undesirable application is removed, and whenever an undesirable application is ignored. The events include identifying information for data objects so that server 151 can correlate the events with known data objects. For example, because a user may choose to ignore malware, it's important for the user to be able to see his or her list of ignored malware to avoid a situation where a malicious user installs malware on someone else's phone and configures anti-malware software on the phone to ignore the malware, preventing the system from automatically removing it. In this circumstance, the legitimate user of the phone is able to tell that a piece of malware is active on his or her device, but is ignored. In an embodiment, because server 151 has data indicating whether device 101 currently has active malware, network access can be allowed or denied to the device depending on its malware state by a network access control system querying server 151 for the state of a given device.

Figure 9:
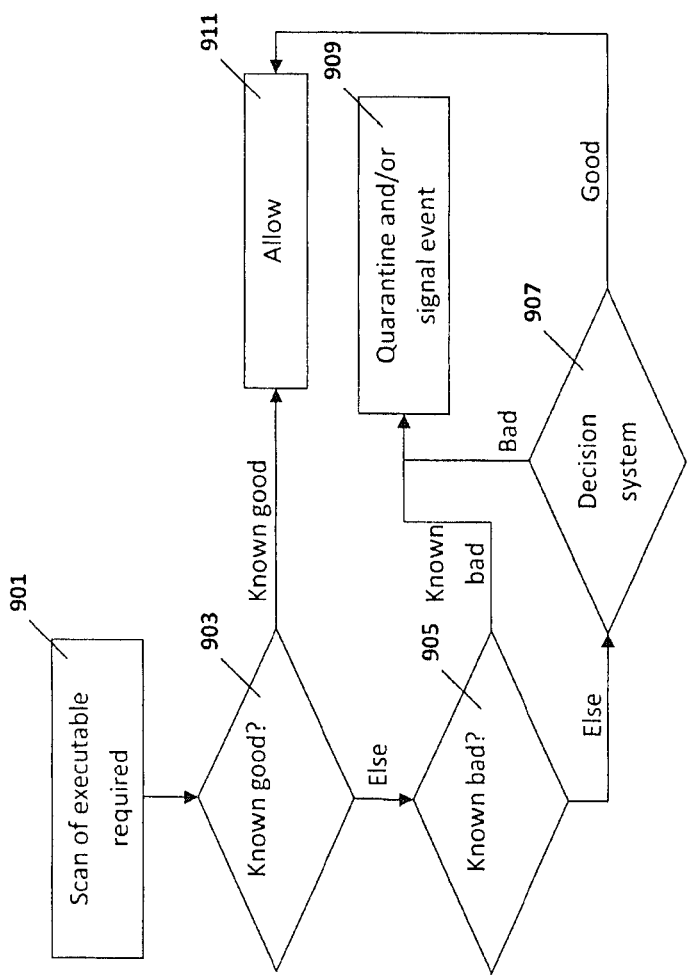
FIG. 9 is an exemplary flow diagram illustrating the steps of an embodiment of the disclosure.

In an embodiment of this disclosure, server-side or "cloud" analysis may be performed using a version of the three-component system described in U.S. patent application Ser. No. 12/255,621, which is incorporated in full herein. An example of a three-component system is illustrated in FIG. 9 and includes a first component 903 that may be used to recognize data that is safe, or "known good" (also referred to herein as forming part of or being included on a "whitelist"). A second component 905 may be used to recognize data that is malicious, wastes device resources, or is "known bad" (also referred to herein as forming part of or being included on a "blacklist"). A third component 907 is a decision component that may be used to evaluate data that is neither known good nor known bad, i.e., "unknown." In an embodiment, known good component 903 and known bad component 905 may reside on mobile communication device 101, and decision component 907 may reside on server 151. In an embodiment, known good component 903, known bad component 905 and decision component 907 may all reside on server 151. In an embodiment, portions of known good component 903, known bad component 905 and/or decision component 907 may reside on mobile communication device 101, and portions of known good component 903, known bad component 905 and/or decision component 907 may reside on server 151. In an embodiment, known good component 903 and known bad component 905 reside on server 151 while decision component 907 resides on mobile communication device 101.

For example, data store 111 may contain malware definitions that are continuously updated and accessible by server 151. The mobile communications device 101 may be configured to send application data, such as a hash identifier, for a suspect data object to server 151 for analysis. Server 151 may contain known good component 903, known bad component 905 and decision component 907, or the components may be distributed across two or more servers. The one or more servers may thereby use application data to determine if the suspect data object is a recognizably safe data object. If the suspect data object is recognizably safe, then the one or more servers may notify the mobile communications device or instruct the device that it may accept and process the data object. The one or more servers may then use application data to determine if the suspect data object is recognizably malicious. If the suspect data object is recognizably malicious, then the one or more servers may notify the mobile communications device or instruct the device to reject the data object and not process it further. The known good and known bad components may have a variety of methods for recognizing known good and known bad data objects. The data, logic, and any other information used by known good and/or known bad components to identify recognizably good or recognizably bad data objects, respectively, may be called "signatures" or "definitions" (explained further below).

If the known good and know bad components are inconclusive, one or more servers may perform additional analysis to reach a decision as to the disposition of the data object. In an embodiment, server 151 contains a decision component that uses one or more analysis systems to analyze application data for the data object and make a determination as to whether the data object is considered undesirable or not. In an embodiment, if there is not enough information to perform the additional analysis, then the one or more servers may request that a mobile communications device send additional application data to the server for analysis. For example, a device may initially send a hash identifier, package name, and cryptographic signer information for a data object to a server for analysis. If the known good or known bad component fails to identify the data object as known good or known bad, the server may request that the device send the whole data object to the server so that the data object itself may be analyzed. Upon receiving additional application data, further analysis to reach a disposition for whether a device should accept or reject the data object may be performed by a decision component 907 or manually. In an embodiment, the server stores whether or not a given data object needs manual analysis so that an analysis team may easily determine what data objects need to be analyzed.

Because an assessment for a data object may rely on human analysis to be produces, server 151 may use analysis systems to produce store a list of suspicious data objects that need further study. In an embodiment, some results from analysis systems on server 151 produce assessments that are transmitted to mobile communication device 101 and others identify data objects as needing human analysis. For example, if server 151 utilizes a set of heuristics to identify malicious applications, some set of the heuristics may be well tested and provide acceptable accuracy in correctly identifying malicious behavior while another set of heuristics may be experimental, requiring human analysis to determine if the results are acceptable.

The following describes each of the components identified above in more detail. A person skilled in the art will appreciate that since the total number of known good applications for mobile communication devices can be identified, use of the known good component 903 coupled to a database, logic, or other data store containing definitions for known good data objects (e.g., application data such as hash identifiers) may significantly reduce false-positive undesirable application detection and reduce the need to perform computationally expensive analysis or to contact a server for analysis. One will also appreciate that use of a known good component 903 may be particularly effective for data that contains executable software code. Executable software code for a given application rarely changes between different mobile communications devices, so creating a database of known good application data or logic for evaluating application data may be an effective method for recognizing safe or trustworthy data. This database may vary in size depending upon the resources available on the mobile communications device. Alternatively, aspects of this disclosure, such as the known good component and known bad component, may have access to a remote server with a larger library of application data for known good or bad data objects, such as server 151 coupled to a data store 111 in FIG. 1.

In an embodiment of this disclosure, known bad component 905 may have access to a database, logic, or other data store containing definitions for known bad data objects that can be stored on the mobile communications device without occupying a significant amount of memory. For example, virus and other malware or spyware definitions can include application data such as hash identifiers, package names, cryptographic signers, byte sequences, and byte patterns stored in a database or other memory cache. In other words, there may be a known bad database that complements the known good database stored on mobile communications device 101. Additionally or alternatively, known bad component 905 may be capable of identifying malware using characteristics common to other malicious software code. When applied to network data or data files, known bad component 905 may have access to a database containing patterns or other characteristics of a protocol data unit or file format which presents a security threat. Known bad component 905 may also identify data that undesirably affects a mobile communication device, such as exposing vulnerabilities, draining battery life, transmitting private or unauthorized information to third parties, or using up unnecessary device resources. Similar to the known good component 903 and database, any data identified as "bad" may be deleted, quarantined, or rejected from further processing by the mobile communications device. If a known bad data object is detected, an embodiment of this disclosure may also display a notification or other message similar to that described in co-pending U.S. patent application Ser. No. 12/255,635, entitled "SECURITY STATUS AND INFORMATION DISPLAY SYSTEM," filed on Oct. 21, 2008 and incorporated in full herein.

Decision component 907 may be used to evaluate data that cannot be characterized as either known good or known bad. Since a majority of the data received on the mobile communications device 101 may fall within this category, this component may reside on server 151. This component may utilize a variety of methods to produce an assessment for a data object, including using any of the analysis systems disclosed herein. For example, decision component 907 may apply static analysis, dynamic analysis, distribution analysis or other methods of analysis in order to determine whether received data may be passed to its intended destination or rejected to prevent harm from befalling the device. Examples of this analysis are discussed below.

The following examples illustrate how one or more servers can be used to augment or replace the methods described in U.S. patent application Ser. No. 12/255,621.

Multiple systems containing known good component, known bad component, and decision component are possible. Depending on the specific types of data being analyzed and the types of security threats being prevented, different orders of execution and logic applied to each component's output can be employed. In an embodiment, if data is not determined to be good by known good component 903 (block 805), it will be rejected from processing 813. Data that known good component 903 determines to be good (block 805) is still analyzed by known bad component 905 (block 807). If known bad component 905 determines data to be bad (block 807), it is rejected from processing 813, otherwise data may be analyzed by decision component 907 (block 809). In an embodiment, if data is not determined to be known good by known good component 903, known bad component 905 analyzes it. If known good component determines the data to be good, it is allowed. If known bad component 905 determines the data to be bad, it will be rejected from processing 813. If known bad component 905 does not determine the data to be bad, the data may be analyzed by decision component 907 to reach an assessment for the data.

Figure 8:
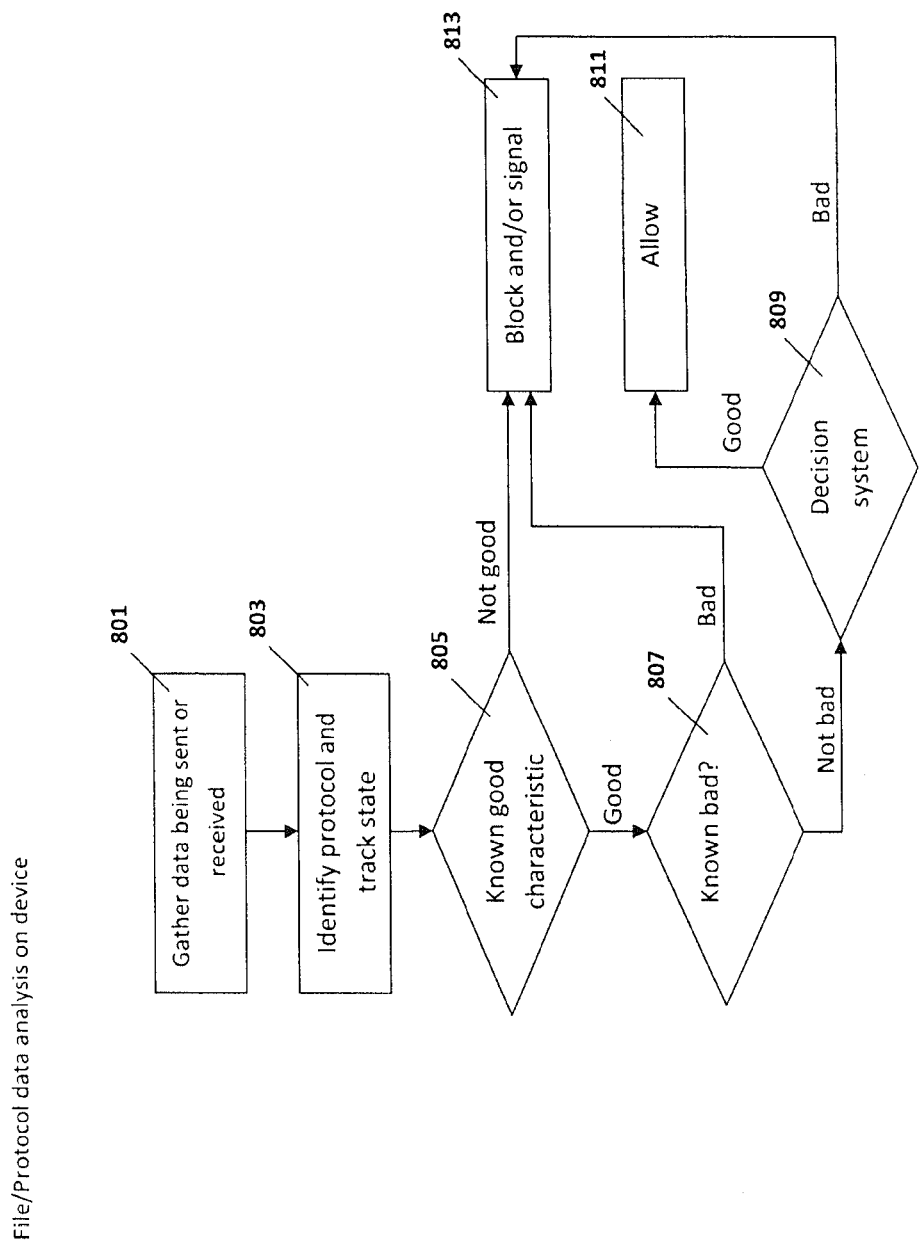
FIG. 8 is an exemplary flow diagram illustrating the steps of an embodiment of the disclosure.

An example analysis of network data or data files present on a mobile communication device is shown in FIG. 8. As shown in FIG. 8, block 801 may involve gathering data sent to or received from the mobile communications device. The data may be analyzed to identify its protocol and track state (block 803). In block 805, known good component 903 resident on the mobile communication device may evaluate the gathered data for known good characteristics. Known good characteristics may include the characteristics previously discussed or described in U.S. patent application Ser. No. 12/255,621. If the data contains sufficient known good characteristics, it may be allowed to proceed to its intended destination (block 811) for processing, execution or other operation. Alternatively, the data may be further analyzed by known bad component 905 resident on the mobile communication device to confirm that the data is truly safe (block 807). If known bad component determines that the data is truly safe, then the data may be allowed to proceed to its intended destination (block 811). Decision component 907 may also be available to provide a final check (block 809) before allowing the data to proceed (block 811).

Analysis of a data object may be performed at any time. For example, the data object may be evaluated prior to access or download, or after download but prior to installation, or after installation, prior to installation of a new version of the data object, or after the installation of a new version of the data object, if the data is an application. In an embodiment, a data object that has not yet been downloaded to a device is evaluated by using identifying information about the data object. For example, if an application market accessible to a mobile communication device makes applications available for download and provides identifying information about the data object such as a hash of the application's content or a package name for the application, software on the mobile communication device can use the identifying information to determine an assessment for the application by evaluating the identifying information locally using any of the systems described herein or by transmitting the identifying information to server 151 and receiving an assessment from the server. In this manner, the software on the mobile communication device can assess whether applications are undesirable or not before a user downloads them.

At any point during the analysis, if either known good component 903, known bad component 905 or decision component 907 (discussed further below) determines that the data is not good, or affirmatively contains security threats, data inconsistencies, etc., then in block 813 the data will be blocked, rejected, deleted or quarantined. In an embodiment of this disclosure, a signal event or security event information log may be updated to record the encounter with the contaminated data.

The analysis of executable data such as applications, programs and/or libraries on the mobile communications device may proceed as illustrated in FIG. 9. In block 901, the executable is determined to need to be classified as either good or bad as a result from an attempt to access the executable, installing the executable, or the executable being downloaded or otherwise transferred to the mobile device. The executable may or may not be pre-processed to extract additional application data such as a hash identifier, cryptographic signer, package name or other characteristics before being evaluated by known good component 903 resident on the mobile communication device (block 903). This evaluation may include comparing the executable's hash identifier or other characteristics against a database of known good characteristics, identifying whether the executable has sufficient known good characteristics, or any of the criteria discussed above or described in U.S. patent application Ser. No. 12/255,621.

If the executable is recognized as known good, then in block 911, it may be allowed to execute its code or proceed to its intended destination for processing or other operation. If known good component 903 fails to allow the executable data, then known bad component 905 resident on the mobile communication device may perform its analysis (block 905). If known bad component 905 confirms that the executable is malicious, then the executable may be quarantined, rejected, or deleted, and the event may be logged (block 909). If known bad component 905 is unable to characterize the executable, then the decision component 907 may perform its analysis as described further below (block 907). If decision component 907 ultimately determines that the executable is safe, then the executable is allowed (block 911). If decision component 907 ultimately determines that the executable is not safe, or remains unsure, then the executable may be quarantined (block 909). One will appreciate that since executables may contain code that can cause significant harm to the mobile communications device, it may require more rigorous analysis before the executable is allowed to proceed.

One will appreciate that known good component 903 and known bad component 905 can be kept lightweight on the resident mobile communication device by only storing definition information about those applications most likely to be accessed by the mobile communication device. As described above, such information may be determined, for example, based upon device data, the applications previously installed on the mobile communication device, and the way the mobile communication device is used (e.g., work versus entertainment, accessing public networks versus private networks, etc.). One will appreciate that each mobile communication device may store different definition information, and that an embodiment of this disclosure contemplates such granularity.

As discussed above and throughout, an embodiment of this disclosure is directed to server-side analysis of data in the event that known good component 903 and known bad component 905 are unable to determine whether the data is safe. In an embodiment, decision component 907 resides on one or more servers 151 in communication with the mobile communication device over network 121, i.e., "in the cloud." The decision component may rely on one or more analysis systems, such as the analysis systems disclosed herein. Because decision component 907 resides on computing resources that are more powerful than the mobile communication device, it can provide a more robust analysis to determine if data should be considered bad or good for device 101. Furthermore, analysis that takes place on server 151 can take advantage of data collected by the server to produce an assessment that would not be possible only relying on data available to mobile communication device 101. For example, decision component 907 on server 151 may determine that a data object is malicious if behavioral data reported by devices indicate that the data object sends premium-rate SMS messages or dials premium-rate phone numbers on devices that it is installed on.

In an embodiment, decision component 907 utilizes one or more types of internal analysis systems to characterize whether a data object is good or bad. The decision component 907 is designed to detect security threats without specific definitions for the threats being protected against. In other words, decision component 907 may operate as an additional security component to compensate for any weaknesses from known good component 903 or known bad component 905 and to identify new threats that have not been previously identified.

One will appreciate that there are a number of analysis systems that may be utilized by decision component 907, including but not limited to systems that use heuristic algorithms, rule-based or non-rule-based expert systems, fuzzy logic systems, neural networks, or other methods by which systems can classify a data object. As described above, such systems may use a variety of data available to decision component 907, including but not limited to distribution data, characterization data, categorization data, trust data, application data, and the like. For example, decision component 907 may analyze applications, libraries, or other executables on a mobile communications device. In an example, the decision component 907 may contain a neural network which analyzes characteristics of an executable and determines a security assessment based on network connection characteristics. Such characteristics may be determined based on information contained in the executable file format or as a result of processing the content of the executable file. In another example, the decision component 907 may contain an expert-system which analyzes the behavior of an executable through function calls, system calls or actions an executable may take on an operating system. If an executable access sensitive system calls in a way that signifies malicious behavior, the system may flag that executable as potential malware and action may be taken.

If decision component 907 is located on mobile communication device 101, it may be desirable to update rules or analysis parameters independently of updating the executable code powering the decision component. In an embodiment, the decision component 907 contains a virtual machine-based decision system by which an executable can be classified by a set of rules that may be updated independently of the decision component itself. Such a system is able to add new logic to detect certain new classes of undesirable applications on the fly without having to update the whole decision component. The system may pre-process the executable so that the virtual machine's logic can symbolically reference the executable rather than having to process the executable itself.

In an example, the decision component 907 may consider third party information to evaluate data. A person having skill in the art will appreciate that a mobile communication device 101 is capable of accessing an application provider, such as Apple's App Store, the Android Market, or other software repository or digital distribution platforms for providing applications available for download and installation on the mobile communication device. In an embodiment, server 151 has access to such application providers and can collect information about specific applications. For example, server 151 can search for and collect user-generated reviews or ratings about applications. An application that has favorable ratings may be deemed safe while an application with significantly negative ratings may be deemed undesirable. Because server 151 may also determine trust data for data objects, the assessment for an application with negative reviews may only indicate that the application is undesirable if the application has a low trust rating while an application with a high trust rating and negative reviews may still be considered desirable by an anti-malware system.

The above examples illustrate how decision component 907 may utilize a number of analytical methods in order to fully evaluate the threat level of data received by or transmitted from the mobile communications device. Other examples may be contemplated without departing from the scope of this disclosure.

One will appreciate that identifying recognizably good data objects and recognizably bad data objects, such as by mobile communication device 101 or server 151, may be performed by a single component rather than by separate "known good" and "known bad" components. In an embodiment, a single recognition component performs the functionality of identifying both recognizably good and recognizably bad data objects.

In an embodiment, a recognition component utilizes definitions to determine an assessment for a data object. The recognition component first examines application data for a data object to determine if any definitions correspond to the data object. For example, if the recognition component has access to definitions that are hashes of data objects' content, a definition that has the same hash as the hash of a given data object's content is determined to correspond to the data object. In another example, if the recognition component accesses definitions that contain byte sequence signatures, a definition with a byte sequence contained in a data object's content is determined to correspond to the data object. Each definition may be associated with an assessment so that the recognition component can examine application data for a data object to determine a corresponding definition, determine a corresponding assessment for the definition, and therefore produce an assessment that corresponds to the data object. For example, the application data for a data object may include identifying information such as the data object's hash, package name, unique identifier, or other application data such as the data object's content. In an embodiment, the definitions used by a recognition component represent known data objects. In this case, when the recognition component determines if an assessment for a known data object corresponds to a data object being analyzed, the data object being analyzed and the known data object do not have to be exactly the same. For example, if a first application from a particular developer is determined to be undesirable through analysis (e.g., manual analysis, automated analysis), a definition may be created for the first application that matches the first application's package name. If the developer creates a modified application that has the same package name as the first application and the recognition component encounters the modified application, the definition is determined to correspond to the modified application because the package name in the definition matches the modified application's package name. The recognition component then determines that the undesirable assessment for the first application applies to the modified application.

For example, a recognition component may access a database of definitions, each definition indicating a hash of a data object's content and an indication of whether a data object to which the definition corresponds is considered to be good or bad. In an embodiment, the definitions used by one or more recognition components operating on server 151 are stored on server 151 or on data storage 111. In an embodiment, known good component 903 and known bad component 905 are each implemented on server 151 using a recognition component. For example, a known good component may include a recognition component where all of the definitions accessed by the recognition component correspond to an assessment that a data object is considered to be good. In an embodiment, known good and known bad components are each implemented as recognition components that match application data for a data object against known good and known bad application data. For example, a known good component may have a list of known good hash identifiers, package names, and cryptographic signers that it tries to match with data objects being analyzed. In an embodiment, if a data object has any characteristic in the known good list, it is considered safe. In an embodiment, server may use a similar known bad system that matches known bad application data to application data for a data object being analyzed. Other known good and known bad analysis systems are possible without departing from the scope of this disclosure. In an embodiment, the recognition component produces a variety of assessments—not simply "good" or "bad." In an embodiment, the recognition component uses a single assessment instead of storing multiple assessments if all definitions only have a single corresponding assessment, such as in the case where the recognition component only identifies whether a data object is "known bad." Other variations are also possible without departing from the scope of this disclosure.

Figure 12:
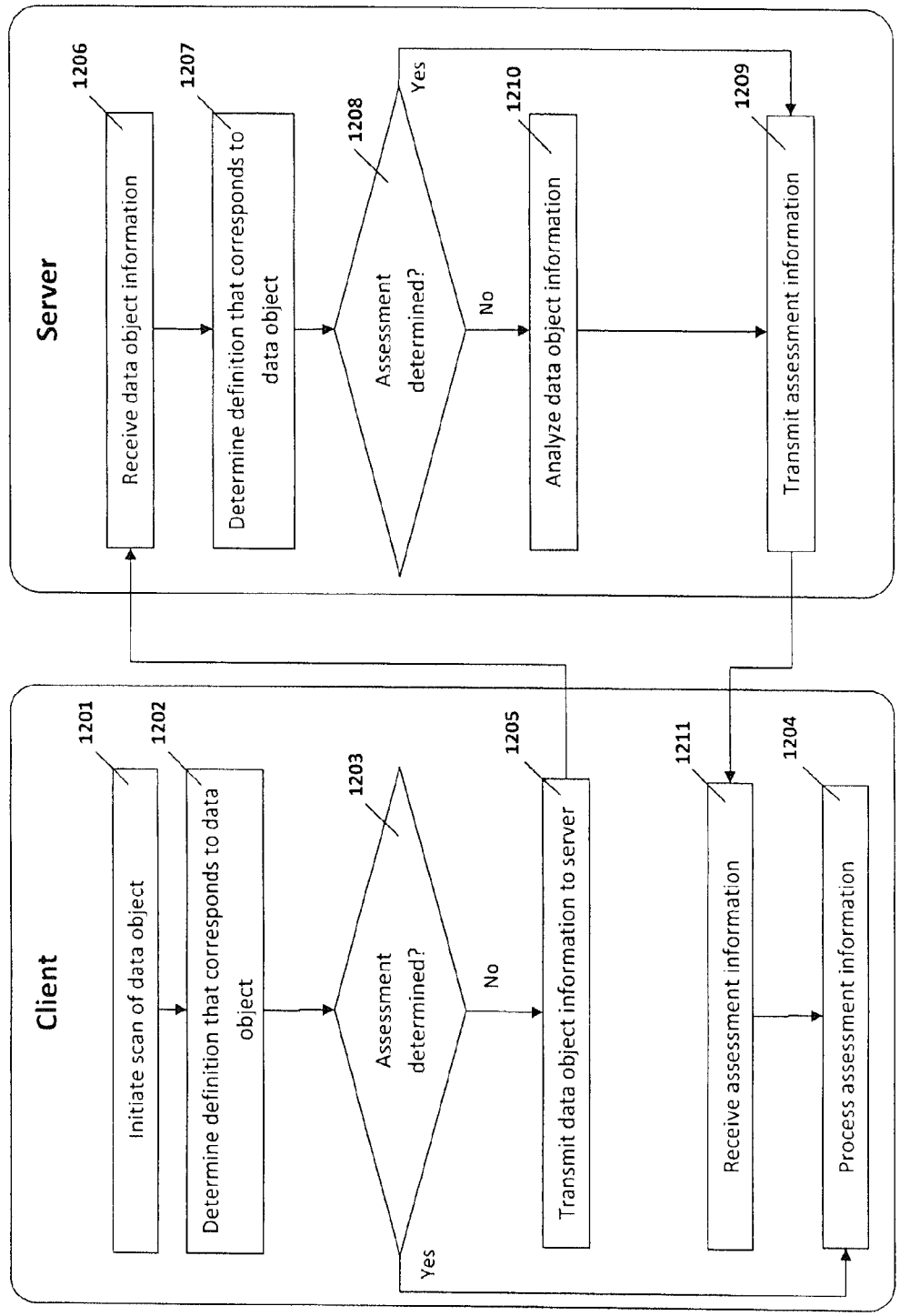
FIG. 12 is an exemplary flow diagram illustrating the steps of an embodiment of the disclosure.

FIG. 12 illustrates an embodiment of this disclosure used to assess data objects on a mobile communication device. A mobile communication device 101 may first initiate a scan of a data object, such as in the case of a full system scan or when the data object is being executed or installed 1201. The recognition component evaluates application data for the data object (e.g., package name, hash of data object's content, unique identifier, content of data object) to determine if a definition accessible to the recognition component corresponds to the data object (block 1202). For example, as discussed above, the correspondence may include matching identifying information for the data object to data contained in a definition or matching the data object's content to sequences, patterns, or logic contained in a definition. If a definition corresponds to the data object, then the recognition component determines the corresponding assessment for the data object. In an embodiment, recognition component in block 1202 utilizes a data store of definition and assessment information. For example, as discussed above, the definitions stored on the mobile communication device may be pre-populated or populated when the mobile communication device receives the definition and assessment information from server 151. In an embodiment, the definitions stored on the mobile communication device may be considered a cache, the cache functioning as described above. If the recognition component on the mobile communication device determines an assessment for the data object (block 1203), that assessment is processed to determine how to treat the data object (block 1204). For example, if the assessment indicates that the data object is malicious, then the mobile communication device may disallow the data object from being executed or prompt the device's user to uninstall the data object. If the recognition component on the mobile communication device does not determine an assessment for the data object (block 1203), then mobile communication device 101 transmits data object information such as application data (e.g., identifying information, content of the data object) to server 151 (block 1205). The server receives the data object information (block 1206), and a recognition component on server evaluates the data object information to determine if a definition accessible to the recognition component corresponds to the data object (block 1207). If a definition corresponds to the data object (block 1208), then server 151 determines an assessment for the data object and transmits it to mobile communication device (block 1209). If the recognition component does not determine a corresponding definition or assessment for the data object (block 1208), a decision component on the server analyzes the data object information (block 1210). If the decision component produces an assessment, then server 151 transmits the assessment to the mobile communication device (block 1209). If no assessment is produced by the decision component, then the server transmits an indication that the data object is unknown to the mobile communication device (block 1209). Mobile communication device 101 receives the assessment from the server (block 1211) and processes the assessment information to determine how to treat the data object (block 1204). In an embodiment, mobile communication device 101 adds information from the assessment received from server 151 to its local definition cache when it processes assessment information (block 1204). For example, the device may store information such as a disposition for the data object (e.g., "known good", "known bad", "malware", "spyware"), an identifier transmitted by server 151, and definition information generated by the device or transmitted by server 151 (e.g., hash of the data object's content, data object's package name).

In an embodiment, mobile communication device performs analysis on a data object being scanned using a local decision component on the mobile communication device before transmitting data object information to server 151 in the case where the recognition component on the mobile communication device does not determine an assessment. In an embodiment, analysis by the local decision component and transmitting data object information to the server occur in parallel to minimize delay to a user. One skilled in the art that a variety of configurations of the components in a combined client-server anti-malware system are possible without departing from the scope of this disclosure.

In an embodiment, mobile communication device 101 transmits authentication information such as authentication credentials or session information to server 151 whenever sending information about a data object so that server can associate information exchanged with a particular account on the server.

E. Application Assessment and Advisement System

Previous portions of this disclosure described various systems and methods for collecting different types of data from one or more mobile communication devices and other sources as well as analyzing the collected data to produce assessments for data objects. The following is a discussion of how server 151 can use assessments for display, exposure via API, and a variety of other purposes. Some examples of assessments that have been disclosed herein include output from one or more analysis systems (e.g., characterization data, categorization data, trust data, and distribution data) and one or more ratings for a data object (e.g., security rating, privacy rating, battery rating, performance rating, quality rating). One having ordinary skill in the art will appreciate that assessment information pertains to a wide variety of information which can be used to understand the effects of installing a given data object on a mobile communication device beyond a typical anti-malware system's assessment of whether the data object is malicious or not. In addition, this assessment information can be used to guide decisions regarding whether to download and install of different types of data objects. Such information can be useful to an individual user trying to decide whether to install a certain application on his mobile communication device. Such information can also be useful to an IT administrator trying to decide whether to deploy a certain application to a plurality of mobile communication devices. In an embodiment, a user or IT administrator can use this assessment information for application policy enforcement.

One having skill in the art will appreciate that the data available to server 151 and assessments produced by the server are useful beyond anti-malware purposes. For example, the assessments can detail whether a data object is known for excessively draining a mobile communication device's battery or if a data object utilizes an undesirable amount of network resources. Because server 151 continues to gather, store, and analyze data to produce assessment information, in an embodiment, server 151 can provide information that details how a data object is estimated to affect a mobile communication device before the data object is installed on the mobile communication device. For example, server 151 can provide estimated battery usage information and/or network usage information for an application.

When users interact with assessments, it may be desirable that the assessments represent an appropriate level of granularity so that users do not feel that the assessments are too broad or too narrow. In an embodiment, server 151 merges assessments for multiple data objects into a single assessment and transmits the merged assessment. For example, if an application contains multiple data objects (e.g., executable and multiple libraries), a user may wish to see an assessment for the application as a whole, not multiple assessments for its constituent data objects. Similarly, if there are multiple versions of an application (on a single platform or multiple platform) that exhibit similar characteristics, an enterprise policy administrator making a decision about the application may only wish to view a single assessment that encompasses all versions of the application.

In order to merge assessments for multiple data objects, server 151 may use application data such as file paths, version numbers, package names, cryptographic signers, installer source, and other information to determine that a group of data objects pertain to a particular version of an application and/or that one or more data objects or group of data objects belong to different versions of an application. For example, if a set of executables are commonly seen in the same directory together, server 151 may determine that those executables are all related to the same application. In another example, if an application package has both a package name and a version identifier embedded in it, server 151 may determine that two data objects with the same package name and human-readable application name but different version identifiers are multiple versions of the same application.

Because it may be desirable for assessments to provide a consistent form of information between platforms, an embodiment of this disclosure is directed to server 151 including some or all of the same fields in assessments for data objects that run on different platforms. For example, even though the location APIs on different smartphone operating systems are very different in their function, server 151 may perform operating system specific analysis on data objects to produce a cross-platform assessment of whether each data object accesses the device's location. If the assessment were in the form of a list of capabilities for the data object, both a mapping application on BlackBerry and a location-based social network on Android would have the "accesses device location" capability. Similarly, battery usage may be calculated differently on each platform, but server 151 may produce a cross-platform assessment of the estimated daily battery use measured as a percentage of total battery capacity. In an embodiment, merged assessments for multiple data objects include information about the range of characteristics and categorization for data objects. For example, an assessment may show a trend in the battery usage of multiple versions of an application. An application that used a lot of battery in an old version but has recently decreased its battery usage may be acceptable while an application that has consistently high battery usage may be unacceptable.

An embodiment of this disclosure is directed toward server 151 making assessments for data objects available via a web interface. For example, users may wish to be able to learn more about the characteristics and capabilities of applications they have on their mobile devices. Server 151 may expose, as a web interface, an index of applications for which assessments are available and an assessment for each of these applications. In order to facilitate easy location of applications, server 151 may organize applications in a variety of ways, such as alphabetically, by their characteristics, by their categorization, and by platform. In addition, server 151 may allow a user to search for applications using terms that match the application's name, description, or fields in the application's assessment (e.g., all applications that run on Android OS and send location to the internet). Furthermore, publicly displaying assessments may assist in the transparency of applications.

For example, application vendors may direct users to the assessment page generated by server 151 as an independent third-party assessment of the capabilities of an application so that users can verify what the application is doing. In an embodiment, server generates a web interface that allows a user to view an application's conditional assessment based on device data (e.g., how much battery does this application use on a Motorola Droid, how much network data does this application use on AT&T Wireless) and compare different conditional assessments (e.g., this application's battery usage on a Motorola Droid vs. a HTC Hero, how much network data does this application use on AT&T Wireless vs. Verizon Wireless). Such conditional assessments may be helpful to identify anomalous behavior in particular circumstances—for example, the assessment page may indicate that a certain set of handsets, operating system versions, or other applications installed on a device cause a higher error rate or anomalous change in certain assessment characteristics for this application. In an embodiment, server 151 identifies data objects having extreme values for particular assessment values. For example, server 151 may generate a web page identifying which applications use more than 1 gigabyte of network data per month or which applications use more than 10% of a device's battery.

Because assessment data generated by server 151 may be utilized to provide a variety of other products and services, an embodiment of this disclosure is directed toward server 151 exposing assessment data via an API. All functionality exposed by a web interface, as described above, may also be exposed as an API so that a variety of products and services may be built. For example, server 151 may provide an HTTP API by which supplying a data object's package name or content hash in the request URL will result in the server returning an assessment for the data object identified by the package name or content hash. In another example, server 151 may generate a JavaScript file that can be included by a remote web page and displays an interactive assessment view for a particular data object.

In an embodiment, server 151 can cause assessment data, such as a rating or disposition as to whether an application is desirable or not, to appear in an application marketplace. One will appreciate that application marketplaces may be implemented in a variety of ways, such as using a web site, using a mobile client application, using a PC-based client application, and using a messaging service such as SMS. As such, rather than subjective user-provided review information, an embodiment of this disclosure will provide objective assessment information for an application or other data object.

For example, server 151 may provide an API by which it may be queried for assessment data, or server 151 may proactively analyze all of the applications available in an application marketplace, transmitting assessment data to the marketplace provider. In an embodiment, a user can search the application marketplace for only those applications that meet certain desirable criteria, such as security, privacy, device efficiency, trustworthiness, and the like. In an embodiment, application providers can use the aggregated information in order to provide quality control measures. The application provider may only feature applications that meet certain battery efficiency criteria, a standard for an acceptable number of crashes or errors, certain network traffic limitations, privacy protections, and the like. In this fashion, an embodiment of this disclosure can improve the offerings on an application marketplace, thereby encouraging developers to create better applications. In an embodiment, the assessment information may be used as a certification system, wherein an application meeting certain criteria may be marked with a symbol, badge or other icon denoting the positive assessment for the application. For example, applications that have a high trust rating or applications that only access a minimal set of private information may be considered certified. In order to verify an application's certification, the certification marker may have a link or other way for a user to retrieve a full assessment from server 151.

In an embodiment, server 151 transmits assessment information to mobile communication device 101 for display. For example, a mobile device may have an interface by which a user can explore assessments for all applications installed on the device. The interface may allow a user to view assessment information for a particular application as well as allow a user to view which applications match a set of assessment criteria (e.g., all applications that send the device's location to the internet, the top 10 battery users, all applications that use more than 50 megabytes of network traffic per month). In an embodiment, mobile communication device 101 displays an interface as a part of an application marketplace, an application download process, or an application installation process on a mobile communication device so that a user browsing an application available for download or downloading/installing an application sees assessment information for the application. When browsing, downloading, or installing an application, the device transmits identification information to server 151 and receives an assessment for the application, displaying some or all of the assessment on a user interface. For example, the interface may display the capabilities of the application or characteristics of the application. The interface may also be interactive, allowing the user to explore aspects of the assessment, requesting additional assessment information from server 151 if necessary. In another example, the device may display an indicator of trust for an application, as determined by server 151 and transmitted to device 101 as part of an assessment, The indicator of trust may be displayed in a variety of ways, including as a certification seal (e.g., "Lookout™ certified") or a rating (e.g., "A+", "B–", "C+").

In some cases, users will not read lengthy security explanations, so it is important to display security information about applications in such a way that is easily understandable. In an embodiment, a mobile communication device 101 displays a graphical assessment indication for an application. For example, notable aspects of assessments may be displayed as icons or badges for the application. Some examples include badges for being "battery efficient", being a "battery hog", "accessing location", having "spy capabilities", being a "social network", and being a "file sharing app". The badge for each notable assessment may include an illustration making the badge easy to understand and coloration indicating whether the assessment is merely informational or something potentially critical. For example an application being efficient with battery use may have a green icon showing a full battery while an application that typically uses a lot of battery may have a red icon showing an empty battery.

Because server 151 continually gathers information and improves assessments, assessment information can be updated on application marketplaces and/or mobile communication devices that have cached the assessment information. For example, server 151 may send a notification to the application marketplace or mobile communication device indicating that new assessment information is available. In another example, server 151 may simply transmit the updated assessment information so that old information is overwritten.

In addition to viewing assessments on a device for data objects that are installed on that device, it may also be desirable to view assessments for data objects installed on a device from a web interface. For example, a user may wish to use his or her PC to explore assessments for applications installed on his or her device. As discussed, in an embodiment, mobile communication device 101 transmits application data for data objects it has installed to server 151. Because server 151 may store which applications are currently installed on device 101, the server can generate a user interface displaying assessments for those applications. For example, server 151 may generate and transmit a web interface allowing a user to view a list of all applications installed on a device, view an assessment for each installed application, and explore which installed applications match particular assessment values (e.g., all applications that can access my location). To prevent disclosure of private information, server 151 may require that a user log in using authentication credentials in order to view assessments for the applications on his or her device. Furthermore, an enterprise administrator may wish to view assessments for a group of devices from a central management console.

In an embodiment, server 151 generates a web interface that allows a user to view assessments for applications installed on multiple devices. For example, the web interface may allow a user to explore all apps that are installed on a group of devices that match a certain assessment field (e.g., file-sharing applications), view risk rating assessments for the group of devices, view all of the capabilities for applications installed on the deployment, and determine which devices and which apps are causing certain capabilities and risk exposures. A user may start by using server 151 to generate an overall set of security, privacy, and battery risk ratings for the group of devices then click on a rating to view the list of applications most contributing to that risk rating. A user can then view which devices have a given application. In another example, a user may start by using server 151 to generate a list of all capabilities for applications installed on the group and then click a given capability to view all of the applications installed on the group that have that capability. From there, the user may further explore which devices in the group have a given application installed. In an embodiment, assessments for a group of devices are exposed by server 151 in the form of an API for use by external services such as management consoles. For example, server 151 may expose risk ratings for the group of devices to a centralized security reporting system via an HTTP API.

On mobile communication devices, battery and network data are often limited in such a way that applications can adversely affect the device's battery life and can cause network use overage charges. An embodiment of this disclosure is directed to using assessments to make users aware of applications' network or battery usage and alert users in the case of an abusive application. Software on the device retrieves an assessment containing battery and network usage characteristics for an application from server 151 and displays the assessment to the user. As described above, a device requesting assessment information from server 151 may include application data for the application. The assessment may be customized for the particular device the user is using by the device sending device data when retrieving the assessment or by sending authentication data that associates the assessment request with previously transmitted device data. For example, the assessment may indicate that an application will likely reduce a user's model of phone's battery life by 5% or 1 hour; whereas a different model phone that has different battery life characteristics may receive an assessment that the same application reduces the phone's battery life by 10% or 3 hours. The assessment display may occur as part of an on-device application marketplace or as a user interface dialog before, during, or after installation of an application.

Furthermore, after the user installs multiple applications, it may be desirable for that user to understand which applications are most contributing to network usage or battery life based on the applications' actual behavior on the device. In an embodiment, the device collects behavioral data for the battery and network usage of an application and allows a user to view the actual behavioral data from an interface on the device. For example, the interface may allow a user to view a particular application's battery and network usage as well as view the top network and battery using applications in order to identify which applications are contributing to network overage or short battery life. In an embodiment, mobile communication device 101 reports behavioral data for applications installed on the device to server 151 and allow the user to view the actual behavioral data via a web interface generated by the server. One having ordinary skill in the art will appreciate that other characteristics of mobile applications can be monitored and shown to users as well.

Because a single application can cause significant problems with respect to battery life, network usage, or other limited resources, it may be desirable to notify a user when an application is behaving undesirably. In an embodiment, mobile communication device 101 monitors the network and battery usage of applications installed on the device and notifies the device's user when an application exceeds desirable limits. For example, the user may set thresholds for how much data applications may transmit and receive before he or she is notified. In another example, a user is notified when the device determines that an application will adversely affect the user's battery life or phone bill. If a user typically uses a phone for 20 hours before plugging it in and an application on the device reduces the estimated battery life to less than 20 hours, it's likely that the user will run out of battery. It may then be important to alert the user that there is an action he or she can take to avoid running out of battery, namely uninstalling or otherwise disabling high battery using applications.

In an embodiment, in order to prevent applications on a user's device from exceeding the user's data plan, device 101 or server 151 predicts the future data usage of a device and gathers information about the device's data plan. In order to gather information about a device's data plan, device 101 or server 151 connects to a network operator's servers to determine data plan information such as the data allocation per billing cycle, what their billing cycle is, and how much data has been used during the current billing cycle. Communications to the network operator's servers may occur in a variety of ways, such as via an HTTP API or SMS messaging. If software on a device uses SMS messaging to retrieve a user's data plan information, the software may automatically consume the response message sent by the network operator's servers in order to prevent the communication from showing up in the user's inbox. In order to predict future data usage, server 151 may analyze typical data usage for applications installed on a device and actual data usage on that device. If an application is newly installed, typical data usage may be used while for an application that has been on the device for months, actual data usage may be used. If applications on device 101 use network data at a rate that would exceed the device's data plan allocation by the end of the billing cycle, software on the device displays an alert indicating the likely overage charges. The alert may also display the applications most contributing to the data usage and give the user to uninstall or reconfigure the applications. Device 101 may report the alert to server 151 which may also send a notification (e.g., via email) indicating the potential for data overage. Software on device 101 or server 151 may display an indication of the current predicted data usage relative to the device's data allocation so that a user may adjust his or her application usage patterns accordingly. For example, if a user is worried about exceeding his or her data plan, he or she may check what the current predicted data usage is before engaging in a video chat.

Because the applications installed on a device may have a significant impact on the risk exposure of the device, it may be desirable for a user or administrator to set policy for what applications are desirable to install on a device or group of devices. The following is a discussion of how protection policy can be implemented on one or more mobile communication devices. In an embodiment, policy includes blacklists and whitelists. A blacklist is a set of applications or assessment criteria that are explicitly denied from running on a mobile communication device while a whitelist is a set of applications or assessment criteria that are explicitly allowed to run on a mobile communication device. For example, a policy may allow only applications on a whitelist or only applications not on the blacklist. In an embodiment, explicit application entries have higher priority than assessment criteria entries. For example, a policy may specify certain capabilities (e.g., sending a device's location to the internet) that are blacklisted but specify certain applications that are whitelisted. In this case, all applications that send location to the internet may be blocked unless they are explicitly on the whitelist because the explicit applications on the whitelist are of higher priority than the assessment criteria on the blacklist. One skilled in the art will appreciate that a variety of policy schemes can be implemented without departing from the scope of this disclosure.

Users may have individual preferences for the type of applications they want on their mobile devices. Some users, for example, may be sensitive to privacy issues, while other issues may want to optimize their battery life. In order to allow users to utilize application assessments to gain greater insight into the applications they use or are considering to use, an embodiment of this disclosure is directed to software on a mobile communication device allowing a user to set policies based on assessment criteria for applications, the software blocking applications that exceed an undesirability threshold. When a user attempts to install an application, the software requests an assessment for the application from server 151 and receives the assessment from the server.

For example, if the user attempts to install an application that has the capability of sending location information to the internet but has a policy to disallow any applications that can send his or her location to the internet, then software on the mobile communication device will block the installation. In another example, a user may set privacy, security, and battery life policy thresholds individually on a relative scale (e.g., 0 to 10). When the user installs an application, software on the device retrieves an assessment for the application and compares the application's privacy, security, and battery ratings with the policy thresholds and alerts the user if the application exceeds the configured policy. Instead of blocking installation of an application that is undesirable, a user may want to simply be warned of the undesirability.

In an embodiment, the user can ignore the alert and choose to accept the application anyway. In an embodiment, the device displays a user interface indicating that an application is undesirable for the user. For example, a mobile device may display an indication of whether an application being viewed for possible download in an application marketplace meets the user's desirability criteria. In another example, software on a device may allow a user to view all applications that do not meet desirability criteria. Such an interface may be useful if a user changes his or her criteria and wants to view applications that are now undesirable given the new criteria.

IT administrators, parents, network operators or other people responsible for multiple mobile communication devices may wish to set policy on multiple mobile communication devices without physical access to all of the devices. In an embodiment, server 151 allows a user or administrator to set policy for a device or group of devices. When a device 101 attempts to install an application, the device sends a request to server 151 for an assessment of the application. Based on policy configured on server 151, the assessment contains an indication of whether the application is allowed or disallowed and may also contain the policy criteria for why a disallowed application was assessed to be disallowed. In an example, policy on server 151 is configurable via a web interface.

In an embodiment, server 151 allows policy to be configured by assessment criteria as well as on a per application basis. For example, an administrator may use server 151 to block all applications that are in a certain category such as social networking applications or all applications that access certain capabilities such as the ability to transmit files or other sensitive data from a device. In an example, an administrator may wish to only allow particular applications by creating a whitelist, blocking all applications not on the whitelist. In a further example, an administrator may permit all applications other than particular applications that are on a blacklist because they are known to be undesirable. Because the set of applications allowed or denied under a policy may be pre-computed, an embodiment of this disclosure is directed to server 151 generating a set of policy definitions and transmitting the policy definitions to one or more mobile communication devices 101. For example, if a group of devices has a policy to only allow applications that are on a whitelist, server 151 may transmit a list of identifying information for the whitelisted applications to a mobile device so that the device does not need to contact the server for assessments every time it encounters an application.

When configuring policy using abstract concepts such as application categorization and capabilities, it may be desirable for a user or administrator to see what applications would be allowed/denied or whether a particular application would be allowed/denied if configuration changes were to be made. In an embodiment, the policy configuration user interface on mobile communication device 101 or server 151 includes an interface for viewing applications that would be blocked or allowed as part of a configuration change. If the configuration change interface is displayed on mobile communication device 101, the device may send requests for data to server 151 to populate the interface. It may be desirable to show all of the applications allowed or blocked after the configuration change goes into effect or only the difference in applications allowed or blocked between the current configuration and the new configuration. Because the number of applications affected by a configuration change may be very large, the interface may display summary information and allow a user to search for a particular application to determine whether the configuration change affects that application and whether the configuration change would result in that application being allowed or blocked. In an embodiment, the interface displaying the effect of a configuration change indicates whether any popular applications would be blocked. For example, application popularity may be determined based on overall distribution data determined by server 151 or by the prevalence of the application in the group of devices being managed. In an embodiment, the change result interface only displays changes that affect applications that are currently installed on at least one device in the group being managed.

In order to prevent a policy system from interfering with acceptable usage of mobile communication devices, an embodiment of this disclosure is directed to server 151 maintaining sets of acceptable apps and allowing a user or IT administrator to easily add those sets to a whitelist, the whitelist automatically including changes to the sets of acceptable apps. For example, server 151 may maintain a list of applications that are popular overall or a list of popular applications by application category. In a policy configuration interface, the server may present a way to include all popular applications or only popular applications in particular categories (e.g., games, social networks) in the policy's whitelist. In an embodiment, such dynamic list policies are of higher priority than assessment criteria entries on blacklists and whitelists but of lower priority than explicit application entries. In another example, server 151 may maintain a list of applications with high trust. In a policy configuration interface, the server may present a way to include all high-trust applications in the policy's whitelist. Whenever the high-trust list is updated, applications with high trust are effectively considered whitelisted when making policy assessments.

Because a mobile device deployment may already have a device management server or service in place, it may be desirable for server 151 to supply data to a device management server that actually performs the policy enforcement. In an embodiment, server 151 interfaces with a device management server to configure application policy on the device management server. For example, the device management server may support configurable application blacklists and whitelists. If a user sets configuration on server 151 to only allow applications that are on a whitelist or that match certain assessment criteria, server 151 generates the list of applications to be whitelisted and transmits the list of applications to the device management server in a format and over a protocol that the device management server supports. Similarly, if a user configures a blacklist on server 151, the server generates the list of applications that are on the blacklist and configures the device management server to enforce the blacklist. In an embodiment, server is capable of configuring multiple device management servers. For example, if an organization supports multiple mobile device operating systems and uses different mobile device management servers, an administrator can configure a cross-platform policy on server 151 (e.g., blocking all file sharing applications). Server 151 may then identify all of the applications across multiple platforms whose assessments match the policy and configure the appropriate application policies on device management servers. Because each device management server may only support a subset of mobile device platforms that server 151 supports, server 151 only transmits policy information to a device management server that corresponds to data objects that run on operating systems that are supported by the device management server. For example, if a device management server only supports Blackberry devices, server 151 may only configure the device management server's blacklist and/or whitelist with information about Blackberry applications.

In an embodiment, policy compliance checking can be performed by either server 151 or mobile communication device 101. For example, if server performs compliance checking, any compliance settings are stored on server 151 so that any configuration performed on mobile communication device 101 results in that configuration being transmitted to the server. When the device requests an assessment for an application from server 151, the server includes in the assessment an indication of whether the application is allowed or disallowed by policy. In another example, if mobile communication device 101 performs compliance checking, any compliance settings are stored on mobile communication device 101 so that any configuration performed on server 151 results in that configuration being transmitted to the device. When the device receives an assessment for an application, it compares the assessment to the policy configuration to determine if the application is allowed.

In an embodiment, policy management is integrated with a server-coupled anti-malware system so that signatures and assessments for applications provided by server 151 enable device 101 to block data objects that violate policy. For example, when a device 101 requests for an assessment from server 151, the server's assessment indicates that an application is undesirable if the application is considered malicious or if it violates policy. In either case, the assessment produced may indicate further information about why the application was found to be malicious or policy-violating. In another example, server 151 may pre-emptively transmit signatures for malicious or policy-violating applications to mobile communication device 101 so that the device can recognize whether a data object is desirable or undesirable without having to contact server 151.

If a device 101 has installed an application that violates a protection policy in place on either the device or server 151 or the assessment for an application has been updated to make it violate the protection policy, it may be desirable for remediation actions to be taken by the device or other systems. In an embodiment, if a device has an application installed that violates the protection policy for that device, the server or software on the device can enact remediation actions to occur. Depending on whether policy compliance is determined at the device 151 or server 101, either the device or server may determine what remediation actions to take.

For example, if a user installs an application and the assessment received from server 151 indicates that the application is acceptable but at some point in the future server determines that the application is unacceptable, server 151 transmits an updated assessment to the device including remediation actions for the device to take. In another example, if a user installs an application on a device and the device receives an assessment from server 151 indicating that the application is acceptable but software on the device gathers behavioral data that shows that the application violates policy (e.g., the application attempts to acquire the user's location), the device may undertake pre-configured remediation actions such as removing the application. The device may also transmit this behavioral data to server 151 and indicate the policy violation. One skilled in the art will appreciate that using behavioral data to enforce policy can protect mobile communication device in a variety of situations such as when a vulnerability in an application is exploited, when an application only behaves undesirably on a subset of devices (e.g., a targeted attack against employees of a particular company), or when an application only behaves undesirably after a period of time (i.e. a time bomb).

When a device is detected to be violating policy, a variety of remediation actions are possible, for example, any violating applications may have their processes ended, may be uninstalled or isolated from accessing certain system functionality (e.g., internet, private data), or may be restricted from accessing certain networks (e.g., only allowed to access Wi-Fi, not the cellular network). It may also be desirable to isolate the whole device from accessing sensitive resources such as a corporate email or VPN server while it is out of compliance to prevent information leakage. Other remediation actions may include those disclosed in U.S. patent application Ser. No. 12/255,614, filed on Oct. 21, 2008 and incorporated in full herein.

If an administrator is able to set policy using server 151, it may also be desirable for a user to use server 151 to view the compliance status of devices that the policy applies to. In an embodiment, server 151 determines whether a group of mobile communication devices is in compliance with application policy and which applications are installed on devices in the group. For example, if mobile communication devices report the applications they have installed and server 151 contains policy configuration, the server can determine which devices currently violate the policy set by an administrator. To allow an administrator to view the compliance status, server 151 may generate a web interface listing whether or not all devices are in compliance and if any devices are out of compliance, how many there are. The interface may also allow the administrator to view specific devices that are out of compliance, view which applications make the devices out of compliance, and initiate remediation actions (e.g., removing an application) remotely.

In an embodiment, server 151 presents a one-click remediation action whereby an administrator can click a single button to remotely initiate remediation actions on all devices in the group the administrator is managing. For example, if an administrator managed 100 devices and 10 of the devices had applications that violated policy, the administrator could click the one-click remediation button on the web interface to cause the server to send indications to each of the 10 out-of-compliance devices to remove the undesirable applications without any user intervention required. Once the remediation actions completed, each device 101 may send an indication to server 151 indicating whether it was successful or not. During the remediation process, server 151 may generate an interface by which the administrator can view the status of the remediation. Other methods of server exposing compliance status include server 151 exposing an API (e.g., for use by a security management console) and server 151 generating reports that can be downloaded.

In some cases, it may be desirable for a user or administrator to receive a notification if he or she installs an application that is considered undesirable or if a previously installed application is newly considered to be undesirable based on an updated assessment. In an embodiment, mobile communication device 101 transmits information about the installation of a data object to server 151. If server 151 determines the data object to be undesirable based on universal undesirability characteristics or characteristics for the user, the server transmits a notification. For example, if a user installs an application that is assessed as desirable, but at some point in the future, the application begins to exhibit malicious or other undesirable behavior such as wasting battery, the server may change its assessment to indicate that the application is undesirable. The notification may take a variety of forms, such as an email, SMS message, or user interface dialog displayed on a web page, on a PC, or on a mobile communication device.

For an IT administrator managing a plurality of mobile communication devices, policies can be set for a specific application, even if the application is available on multiple platforms and has multiple versions. For example, it is not uncommon for an IT administrator to manage a fleet of mobile communication devices running different operating systems. The fleet of mobile communication devices can include iPhones, BlackBerry devices and Android devices. However, if a certain application is known to be undesirable on all three device operating systems, such as a social networking application that can disclose private information, then the IT administrator can block all versions of the application from installation, regardless of platform. However, if an application can share sensitive information on one platform but not others, then the IT administrator can allow installation of the application on only the platforms that don't share sensitive information. As discussed above, it may also be desirable for an IT administrator to make policy decisions about all versions of an application at once instead of having to maintain a policy that treats multiple versions of an application as separate decisions. Because there are some applications that are updated very frequently, it would quickly become a very difficult task to manage application policy if an administrator could not treat all versions of a particular application as one policy decision.

Because an application may drastically change between updates, it's desirable for an administrator to be aware of any changes that could affect the administrator's decision of whether or not to allow the application. An embodiment of this disclosure is directed to server 151 sending a notification in the case of an application that is present on a blacklist or whitelist changing its capabilities or characteristics significantly. For example, if a new version of an application that is on an administrator's whitelist has the capability to transmit files from a user's device while previous versions did not, then server 151 may send an email or text message to the administrator indicating the change. The policy management interface on server 151 may also display a list of applications that may need attention based on changed characteristics.

In order to simplify configuration, an embodiment of this disclosure is directed to software on mobile communication device 101 or server 151 may provide default policies that account for common use cases. For example, a user may be able to select that they are concerned with battery life and location privacy but they are not concerned with network usage and phone number privacy. By selecting such concerns, the device or server automatically configures policies and thresholds for undesirable applications. In an embodiment, server 151 or device 101 contains pre-set policies for compliance with regulations. For example, financial industry or healthcare industry workers may be required to have a particular set of application policies in place to prevent the disclosure of sensitive information. Because the set of applications allowed or denied under these regulations may change over time, server 151 may automatically update the specific policy decisions that enforce the regulation without an administrator needing to specifically configure them. In order to allow for inspection and auditing, server 151 may generate a list of policy decisions it is employing to comply with regulation and may notify an administrator when policy decisions will change. If an administrator rejects certain policy decisions, he or she may override the default policy set by server 151.

As it may be desirable to simplify the policy configuration process, an embodiment of this disclosure is directed to server 151 or mobile communication device 101 presenting a series of questions to a user or administrator, the answers to the questions being used to automatically set policy. For example, when a user is first setting up application policy software on his or her device, the software may ask whether the user has an unlimited data plan, whether the user wants to allow services to access the device's location, and whether the user wants to block all tools that can be used to spy on the device. Based on the answers to the questions the device may set policy of whether to block high data usage applications, whether to alert the user in the case of a high data usage application, whether to block applications that send a user's location to the internet, and whether to block espionage applications. After this initial setup, a user may desire to tweak policy decisions, while other users may accept the automatically configured policy.

Because abusive applications may have a substantially negative impact on wireless networks, an embodiment of this disclosure is directed to providing "early-warning" information about potentially abusive applications. In an embodiment, server 151 may use information such as behavioral data and other data available to it in order to produce an assessment of whether an application has network access characteristics that may be harmful for mobile networks. For example, an application that receives or transmits a large amount of data, sends a large number of SMS messages, or opens a large number of persistent connections may adversely affect a mobile network's performance. After assessing an application to determine if it is potentially harmful to a mobile network, server 151 stores the assessment. In an embodiment, server 151 notifies an administrator when a potentially harmful application is identified. For example, the notification may be in the form of an email or text message that contains information about the potentially harmful data object.

In an embodiment, server 151 generates a web interface that displays applications that have been assessed as potentially harmful to a mobile network. The web interface may be designed to support a review workflow so that potentially harmful applications can be further analyzed by an administrator. After examining an application, the administrator may want to take remediation action in some cases while, in other cases, the administrator may want to take no action. If an administrator chooses to take no action, the application will not be considered potentially harmful unless its behavior significantly changes, triggering server 151 to identify the application for re-review. In order to prevent multiple data objects for a given application being repeatedly identified as potentially harmful, if an administrator chooses to ignore an application, all versions of that application will also be ignored, as server 151 can determine whether multiple data objects belong to the same application or other grouping.

If an administrator is aware of a potentially harmful application, he or she can take preemptive measures to avoid serious problems if the application is installed on more devices. In an embodiment, server 151 generates a web interface allowing an administrator to take remediation actions for an application that is considered harmful. A variety of remediation actions are possible. For example, server 151 may present an interface allowing the network administrator to communicate with the publisher of the application and work through a resolution for the harmful behavior. Server 151 may extract the publisher's email address from marketplace data and allow a network administrator to type in a message via the server's web interface that server 151 sends to the publisher. When server 151 sends the email, the reply-to address in the outgoing email is specially set so that when the publisher responds, server associates the response with the initial message and publishes the response in the web interface for administrator to view and potentially continue the conversation. In an embodiment, server 151 generates a web interface allowing an administrator to configure security software installed on a group of devices. For example, the administrator may wish to configure the security software to block the potentially harmful application or isolate the application so that it cannot communicate via a cellular network. If the administrator desires to block the application, server 151 may use a variety of mechanisms, such as those disclosed herein to block the application from being installed on devices or to remove the application if it is already installed on devices. Because server 151 can identify multiple data objects that correspond to the same application, if an administrator blocks an application, all data objects for the application are considered to be blocked. If an application that was potentially harmful is fixed in a subsequent version, server 151 may allow the administrator to specify a range of versions of the application to block.

Because it may be desirable to prevent the download of undesirable applications, an embodiment of this disclosure is directed to server 151 generating network infrastructure configuration data. For example, server 151 may store a set of blacklisted data objects and be able to generate a set of intrusion prevention system or HTTP proxy rules. The rules may attempt to match identifiers used by mobile devices to download data objects from an application marketplace or to identify the content of undesirable data objects as they are transmitted across a network.

In an embodiment, server 151 generates network infrastructure configuration data to block network traffic associated with undesirable applications. Server 151 generates network infrastructure configuration rules that prevent network communication associated with undesirable applications by server 151 using behavioral data for an undesirable application to characterize the network communications associated with the application and generating rules that block similar network traffic (e.g., traffic to the same IP address, subnet, or hostname). In order to prevent legitimate traffic from being blocked, server 151 may analyze how unique the undesirable application's network traffic is relative to desirable applications and only block network traffic that is particular to the undesirable application. For example, if an application communicates with two servers, one which is a well-known server used by a variety of legitimate applications and another which is an unknown server only communicated with by this application, server 151 would treat the unknown server as particular to the undesirable application.

After determining the appropriate network traffic to block, server 151 generates firewall or other network configuration rules to block undesirable applications' network traffic. For example, if a malicious application is using a particular server to exfiltrate sensitive data from peoples' phones, behavioral data for the application may indicate the IP address, port, and protocol used to transmit the sensitive data. When an administrator wishes to block the malicious application's capability to steal data, he or she may see the list of servers the application communicates with and how many other applications known to server 151 typically communicate with that server. The administrator then has the ability to choose which servers to block. After selecting the servers to block, server 151 generates rules that block the network traffic. In an embodiment, sever 151 makes configuration data, such as Snort® intrusion detection and prevention system rules, available for download via a web interface. In an embodiment, server 151 is configured to directly connect with a network infrastructure management system to deploy configuration data.

Because an administrator may be primarily concerned with a particular network, an embodiment of this disclosure is directed to server 151 producing both aggregate assessments and operator-specific assessments to identify potentially harmful applications and generating a user interface containing both. For example, if an application misbehaves only when running on a device connected to a particular type of mobile network, the aggregate behavioral data may be within normal bounds; however, the behavioral data for a particular network may be harmful. A network administrator may want to view the behavior of an application on the type of network he or she is administrating. Because individual mobile networks may treat different behavior as abusive, a user on server 151 can configure the criteria for considering an application harmful to the network.

Figure 13:
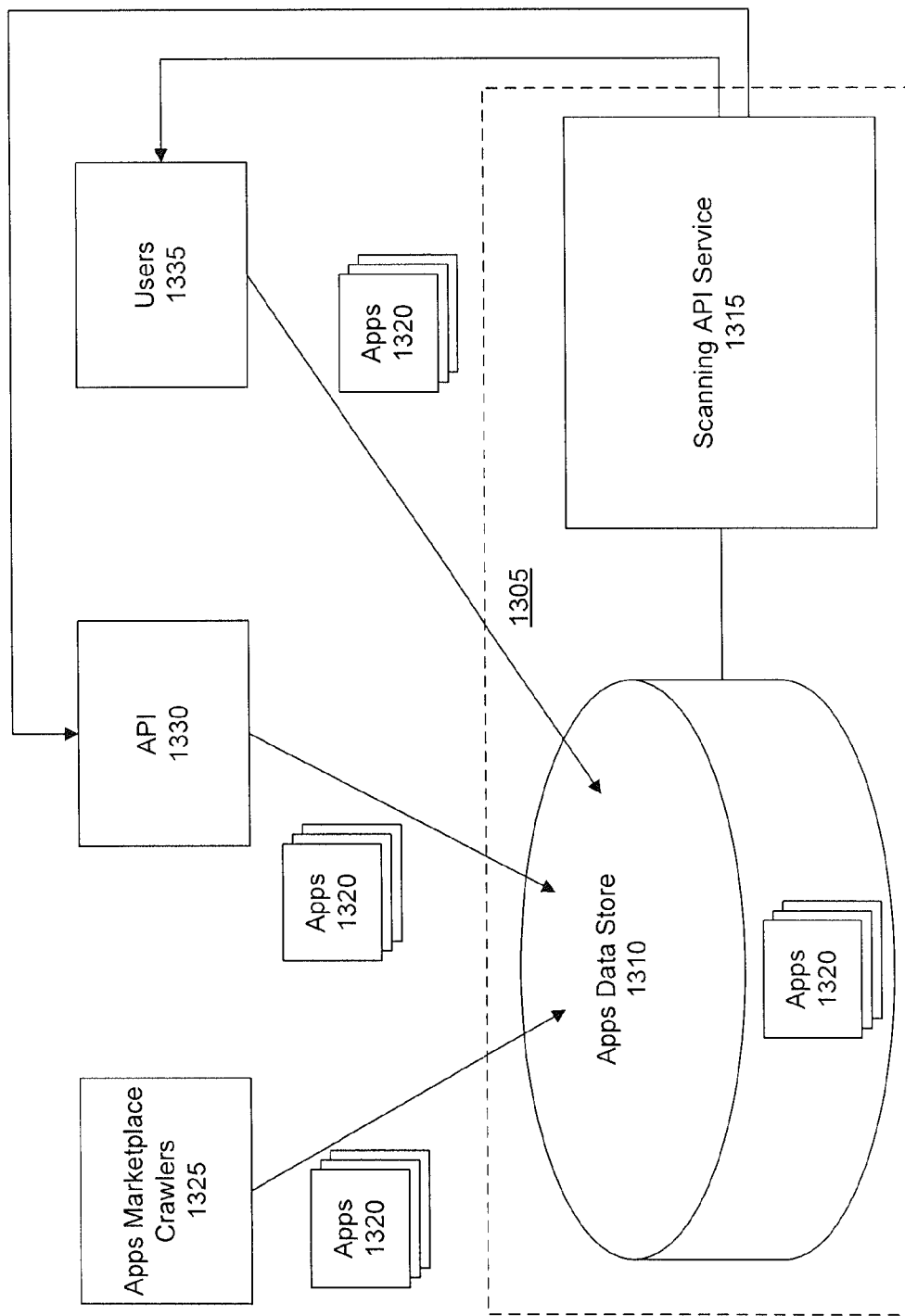
FIG. 13 is a simplified block diagram of a specific implementation of the Application Assessment and Advisement System.

FIG. 13 shows a block diagram of a specific implementation of the Application Assessment and Advisement System. In this specific implementation, a system 1305 includes a data store 1310 and a scanning application programming interface (API) service 1315. The data store stores a collection of application programs or apps 1320. The data store may receive the apps through app marketplace crawlers 1325, API submissions 1330, user submissions 1335, or combinations of these. In other words, apps in the data store or corpus can come from multiple sources, including, for example, apps submitted via API, crawling markets/web sites, submission from software on client devices, or combinations of these.

The scanning API service analyzes the apps stored in the data store and can report or otherwise make available the results of the analysis. The results may be returned programmatically or through an API interface, through a user interface, or both. Generally, having a data store or corpus that gets data from multiple sources (e.g., not only through API but also through crawlers) makes the corpus much larger and thus the system is able to provide good or better profiling results. The system is likely or more likely to have an app in the repository to avoid having to upload it when clients query the system. This can provide a faster response time and improved result data (e.g., correlations with other apps that may be similar or related, or changes in an app's characteristics over time that may tell a user whether or not to upgrade).

In various specific implementations, a submitter or requester can make an app scan request and receive result data for the app immediately in response or as a callback, or can request result data for an app. If an app has already been scanned, the scanning API service can look up the app by its identifier (e.g., hash of its contents) and provide the results. As discussed above, some examples of types of scan results data that may be provided include categorization (e.g., game, news, weather, social networking, pornographic, mapping, or file sharing), characterization (e.g., battery consumption, network consumption, etc.), metadata (e.g., where else has this app been seen, distribution data such as popularity and ratings, or authorship information), or security issues (e.g., malware, spyware, adware, vulnerabilities) detected in the app.

In a specific implementation, the scanning API service provides a technique that may be referred to as "continuous scanning." In this specific implementation, after an app is submitted, the service can "continuously" or "repeatedly" scan it (e.g., scan the app two or more times) and notify any registered callbacks if the scan result data changes. For example, if an app is good today, but references a server to control its functionality, and the app turns bad tomorrow as a result of the server changing, then the service detects this change (e.g., by running the app under dynamic analysis, by manual characterization, or both) and notifies the submitter's assessment update callback information.

The callback notification may depend on the type of scan result data change (e.g., minor change in battery use may result in no callback, new vulnerability found may trigger an email or URL callback, but an app being detected as malware may trigger a phone call, SMS message, email, and URL callback, and so forth). This helps to ensure that entities, such as app marketplace owners, do not unintentionally distribute malware. The system can provide information about an app before the app marketplace owner begins distributing the app, and can also provide a notification to the app marketplace owner when something new about the app is discovered during a scan.

Figure 14A:
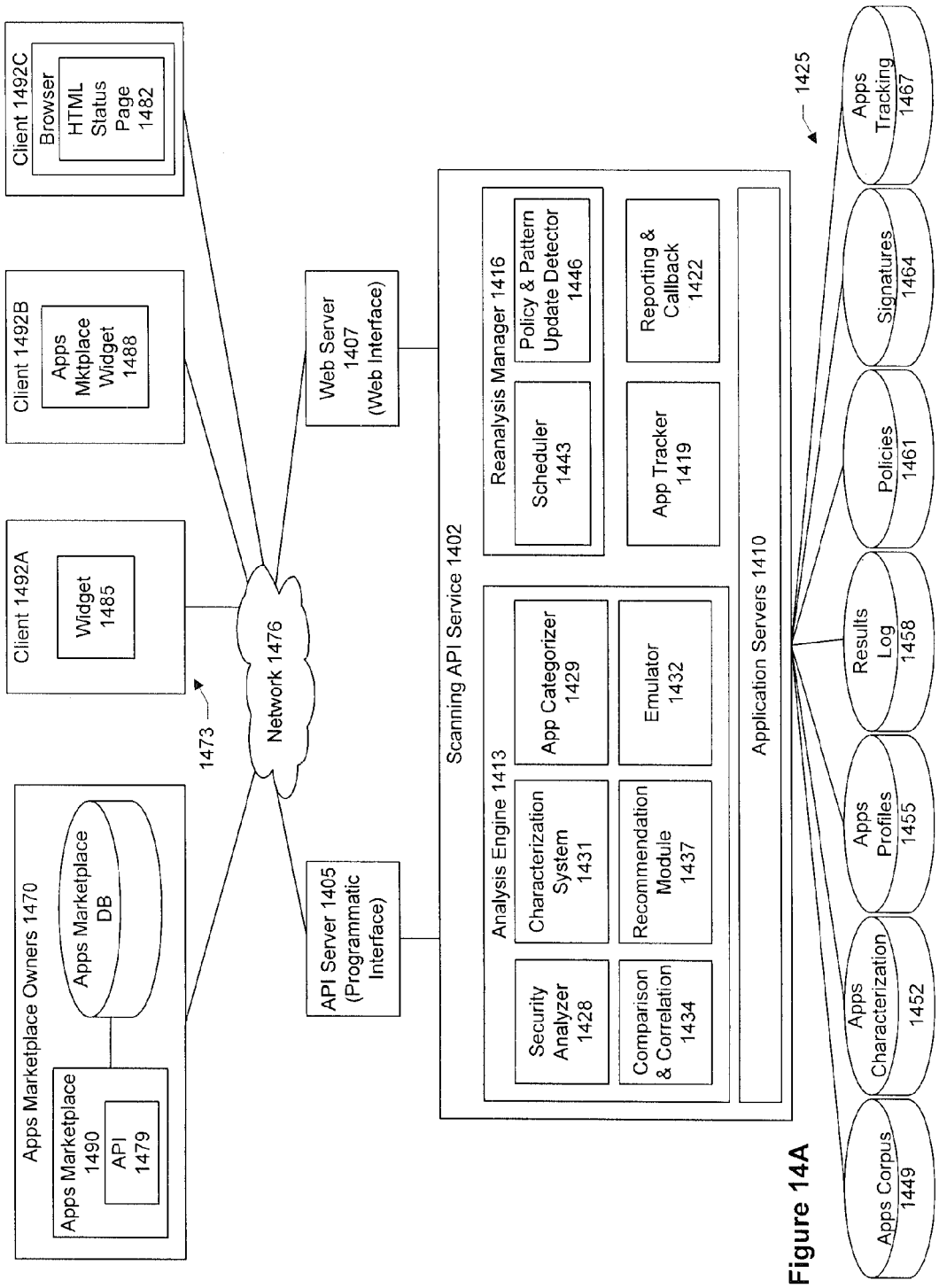
FIG. 14A is a more detailed block diagram of the system shown in FIG. 13.

FIG. 14A shows a more detailed block diagram of a system in which a scanning API service 1402 may be implemented. In a specific implementation, the system includes API servers 1405, and web servers 1407 coupled to application servers 1410 which host various components of the scanning API service. The service may include an analysis engine 1413, a reanalysis manager 1416, an app tracker 1419, and a reporting and callback engine 1422. Application servers 1410 may be coupled to database servers (not shown) to provide access to databases 1425 of the system. It is noted that the blocks in FIG. 14A are functional rather than structural so that it is possible to have many different hardware configurations that can perform the illustrated functions.

Analysis engine 1413 may include an app security analyzer 1428, an app categorizer 1429, an app characterization system 1431, an emulator 1432, a comparison and correlation module 1434, and a recommendation module 1437. Reanalysis manager 1416 may include a scheduler 1443, and a policy and pattern update detector 1446. Databases 1425 include one or more databases or repositories such as an apps corpus 1449, app characterization database 1452, app profiles database 1455, results reporting log 1458, policies database 1461, signature database 1464, and app tracking database 1467. Again, the current description is focused more on function components rather than particular instantiations.

App security analyzer 1428 may include a malware scanner to search an app in apps corpus 1449 for malware signatures. A malware signature is any matching criteria (such as a pattern of bytes present in the application, a hash or checksum of an application, an identifier for the application, identifying information for a cryptographic key used to digitally sign applications, etc.) that can determine whether an app is a certain type of malware or family of malware. These signatures may be stored in signature database 1464. If the scanner finds a match between a signature and an application, the system may categorize or classify the app as malware. If the scanner does not find such a pattern, the system may categorize the app as not malware or non-malware. Of course, the absence of these patterns is not necessarily, by itself, conclusive of whether the app is or is not malware. Similarly, other types of undesirable applications (e.g., adware, spyware) may be identified based on signatures in the signature database 1464.

App categorizer 1428 is responsible for categorizing the apps in apps corpus 1449. The app categorizer can help determine the category or categories that the app should be placed in. The app categorizer can search other data that may be associated with an app (e.g., metadata or marketplace metadata) to help categorize the app. For example, the categorizer may search a description associated with the app in order to determine whether the app should be categorized as news, entertainment, finance, sports, and so forth. The categorizer may be configured to search for key words in the description that may be indicative of the category to which the app should belong.

For example, an app description that includes words such as "stock," or "quote" may be mapped to the category "finance" and may indicate that the app should be in the finance category. The categorizer may search user behavior data associated with an app to determine what category the app should be placed in. For example, an app that, through its users, accesses servers associated with news web sites (e.g., www.nytimes.com, www.wsj.com, or www.latimes.com) as determined by the app's DNS requests or network connections may be categorized as "news." The behavior data may be determined via analysis on a server or may be gathered from devices, as described herein. Data gathered from devices may be stored anonymously to help protect and respect user privacy.

App characterization system 1431 analyzes behavioral data stored in app behavior database 1452 so that the app can be characterized. As discussed, behavioral data may include information about how an application interacts with or uses a mobile communication device's resources, such as memory, battery, network, storage, central processing unit (CPU), and the like. Behavioral data may include operations performed by an app, the degree to which an app performs an operation such as a number of times an operation is performed, the frequency with which an operation is performed, or combinations of these.

Some examples of operations that an app may perform include accessing a user's contacts or telephone directory, accessing a user's files stored on the mobile device, accessing the mobile device's global positioning system (GPS) unit to determine a location of the device, sending messages such as text or SMS messages that may include information from the contacts directory, the user's files, or the device's location, sending messages to a particular recipient, receiving messages, receiving messages from a particular sender, processing received messages, contacting internet servers or services, or accessing the mobile device's antenna. The processing of this type of behavioral data can be used to characterize particular apps.

In a specific implementation, the system gathers behavioral data by monitoring the app over a period of time (e.g., several hours, days, weeks, or months). The behavioral data may be collected from actual users of an app, from an emulator running the app, or both. Behavioral data may be collected from many users of an app such as dozens, hundreds, thousands, hundreds of thousands, or even millions of users. This allows a very accurate assessment of the behavior of an app because actual data from the field and from many different users is collected. The app characterization system can use the collected behavioral data to assess various attributes of an app such as an app's battery requirements. For example, an app's battery requirements may be determined by calculating an average battery usage across many users of the app.

Emulator 1432 represents a virtual mobile device, i.e., a software implementation of a mobile device that runs on a computer. The emulator allows an app to be analyzed in a simulated or virtual environment. Using the emulator to probe and test an app can be more cost-effective than purchasing the actual physical mobile device and installing the app onto the physical mobile device. The system can quickly provision a virtual mobile device with any desired configuration for running in the emulator. A configuration may be based a mobile device type or model (e.g., Android-based devices versus Apple iOS-based devices), operating system version, other apps installed on the virtual mobile device, and so forth.

The emulator can output a list of actions or operations that the app performed during emulation, the outcomes of the operations, events that occurred during emulation, or combinations of these. Some examples of actions or operations that an app may perform during emulation include invoking other apps, accessing the network, playing audio, playing video, making a call, sending a message, storing data, deleting data, copying data, retrieving data, or modifying data. The output from the emulator may be provided to app characterization system 1431 for characterization.

Comparison and correlation module 1434 can compare two or more apps to determine whether the apps are related, similar, or both. Apps may be similar if, for example, the apps have the same signer or package name, even though each app may be a different version. A technique to determine if two or more apps are similar include a content similarity analysis (e.g., how similar are the contents of the two files?). Content similarity can be based on static code analysis to determine program similarity. Based on the comparison and correlation module, recommendation module 1437 can provide recommendations of other apps that may be more desirable than the app for which an analysis was requested.

More particularly, in a specific implementation, a request is received for an analysis of a first app. A determination is made that the first app is similar to a second app. Based on a value of at least one attribute of the second app being different from a value of a corresponding attribute of the first app, the recommendation module recommends the second app. That is, the recommendation module may recommend or suggest that a user download, install, or purchase the second app instead of the first app, that an apps marketplace owner host the second app instead of the first app, or both.

In some cases, the second app is recommended based on the value of the at least one attribute of the second app being less than the value of the corresponding attribute of the first app. For example, in various specific implementations, the at least one attribute may be price where the price of the second app is less than the price of the first app. The at least one attribute may be app size or storage size (e.g., in megabytes) where the size of the second app is less than the size of the first app. The at least one attribute may be battery usage where the battery usage of the second app is less than the battery usage of the first app. The at least one attribute may be CPU load where the CPU load of the second app is less than the CPU load of the first app. The at least one attribute may be background CPU load where the background CPU load of the second app is less than the background CPU load of the first app. The at least one attribute may be vulnerabilities where a number of vulnerabilities of the second app is less than a number of vulnerabilities of the first app. The at least one attribute may be mobile device resource consumption where the mobile device resource consumption of the second app is less than the mobile device resource consumption of the first app. The at least one attribute may be likelihood of piracy where the likelihood of piracy of the second app is less than the likelihood of piracy of the first app. The at least one attribute may be a risk rating where the risk rating of the second app is less than the risk rating of the first app. For example, an app that has the capability to transmit a user's browser history may be determined to be more risky than an app that does not have the capability to transmit the browser history.

In other cases, the second app is recommended based on the value of the at least one attribute of the second app being greater than the value of the corresponding attribute of the first app. For example, the at least one attribute may be professionalism where the professionalism rating of the second app is greater than the professionalism rating of the first app. The at least one attribute may be popularity where the popularity rating of the second app is greater than the popularity rating of the first app. The at least one attribute may be reputation where the reputation rating of the second app is greater than the reputation rating of the first app. The at least one attribute may be application version where the version number of the second app is greater than the version number of the first app. The at least one attribute may be a stability rating (e.g., based on a number of application crashes) where the stability rating of the second app is greater than the stability rating of the first app. Further examples of app attributes are provided elsewhere in this patent application.

Some examples of specific techniques that may be used to compare two or more apps include a binary difference analysis, graph isomorphism algorithms, block comparison, symbolic execution, theorem proving, and others. Binary difference analysis measures the amount common binary code between two applications. High rates of common binary may indicate similar applications. Graph isomorphism measures how similar the structure of the possible executions graphs of two applications are. High rates of graph matching may indicate similar applications. Symbolic execution tracks the symbolic rather than actual parameters and internal values in an application. This allows simulations of the applications to understand when particular control paths will be taken. Programs that yield similar executions when presented with similar parameters may indicate similar applications.

A benefit of the comparison and correlation module is if a new app is submitted but it has not been fully analyzed (e.g., has not been run under dynamic analysis, no battery profiling data, or not enough behavioral data) such as in the case of a newly submitted app, the module can identify similar apps and use their scan result data to generate or provide substitute scan result data for the new app. Thus, scan result data can be based on similarity to other apps in the corpus. The scan result data for a given or newly submitted app may contain scan result data for that new app as well as information for a related app. For example, app security analyzer 1428 may analyze the new app and generate a list of security issues present in the new app, but characterization system 1431 may not provide battery characterization information because such characterization information may not yet be available. So, the system can provide the new app's list of security issues, but a related app's battery characterization information. If scan result data for a new app includes data for a related app, the system will note that the scan result data includes data for a different, but related app. For example, the new and related app may not be an exact match, but the two apps can be related based on being different versions, from the same developer, and so forth.

The output of the analysis engine may be included in an app profile to be stored in app profiles database 1455. In a specific implementation, each app in apps corpus 1449 is analyzed by the analysis engine to generate an app profile for the app. The analysis may include analyzing the app via app security analyzer 1428, categorizing the app via app categorizer 1429, analyzing the behavior via characterization system 1431, running and probing the app in a virtualized environment via emulator 1432, comparing the app to one or more other apps to determine relatedness via comparison and correlation module 1434, generating an alternative app recommendation via recommendation module 1437, or combinations of these.

Below is an example of an app profile that may be provided by the system. This example of the app profile is formatted as an XML document. It should be appreciated, however, that the app profile may be provided in or outputted using other formats (e.g., text format, or HTML format). Further, an app profile may not necessarily include all of the app profile data shown below. That is, an app profile may include a subset of the app profile data shown below.

```
<Application name="AnApp" hash="ad34869580868686603458bc045">
 <Capabilities riskRating="8">
  <Capability name="ReadContacts" riskRating="3">
   <Description>This application has the ability to read your contact list; however, in the past, it
has not transmitted your contact information to the Internet.
   </Description>
  </Capability>
  <Capability name="SendBrowsingHistoryToInternet" riskRating="8">
   <Description>This application has the ability to send your browser history to the internet.
   </Description>
  </Capability>
  <Capability name="SendPremiumSMS" riskRating="8">
   <Description>This application has the ability to send premium-rate SMS messages which
may result in charges to your phone bill.
   </Description>
  </Capability>
  <Capability name="SendLocationToInternet" riskRating="5">
   <Description>This application has the ability to send both your exact and approximate
location to the Internet.
   </Description>
  </Capability>
 </Capabilities>
 <Libraries riskRating="6">
  <Library name="adVendorLibrary">
   <Capabilities>
    <Capability name="SendLocationToInternet" riskRating="6">
     <Description>This application has the ability to send both your exact and approximate
location to adVendor, a mobile advertising network. adVendor states that it will only use this
location to serve relevant ads and does not archive or store it.
     </Description>
    </Capability>
   </Capabilities>
  </Library>
  <Library name="analyticsVendorLibrary">
   <Capabilities>
    <Capability name="SendIMEIToInternet" riskRating="4">
     <Description>This application has the ability to send a unique identifier for your device to
analyticsVendor. This identifier can be used to uniquely identify your device even if you remove
this application.
     </Description>
    </Capability>
   </Capabilities>
  </Library>
 </Libraries>
 <Behavior>
  <Event name="gpsLocation" frequency="10/day" averageDuration="60 secs" >
   <Description>This application uses GPS to locate your device on average 10 times per day
for about 1 minute each time.
   </Description>
  </Event>
  <Event name="notRespondingError" frequency="0.1/day" />
```

```
<Event name="crash" frequency="0.2/day" />
<Network>
  <Cell transmitSize="100 kB/day" receiveSize="12 kB/day"/>
  <Wifi transmitSize="190 kB/day" receiveSize="12 kB/day"/>
<Network>
<CPU>
  <Background always="true" time="2 min/day"/>
  <Foreground time="10 min/day"/>
</CPU>
<GPU time="0.2 min/day"/>
<IO>
  <Background io="0.012 kB/sec"/>
  <Foreground io="1.3 kB/sec"/>
</IO>
<Memory>
  <Background pageFault="1.2/sec" contextSwitch="0.1/sec" proportionalSharedSize="10234 kB" uniqueSize="4123 kB"/>
  <Foreground pageFault="10/sec" contextSwitch="14/sec" proportionalSharedSize="12133 kB" uniqueSize="8013 kB"/>
</Memory>
</Behavior>
<Privacy riskRating="8">
  <AdNetwork name="adVendor" riskRating="6" source="adVendorLibrary">
    <Description>This application displays ads provided by adVendor, a mobile advertising network. adVendor gathers your location in order to serve you relevant advertisements.
    </Description>
  </AdNetwork>
  <AdNetwork name="anotherAdVendor" riskRating="1" source="webview">
    <Description>This application displays ads provided by anotherAdVendor, a mobile advertising network. anotherAdVendor does not recored any of your information in order to serve you ads.
    </Description>
  </AdNetwork>
  <AnalyticsService name="analyticsVendor" riskRating="4" source="analyticsVendorLibrary">
    <Description>This application provides information to an analytics service run by analyticsVendor. analyticsVendor records unique identifying information for your device.
    </Description>
  </AdNetwork>
  <SharesData name="Location" riskRating="3" fromCapability="SendLocationToInternet">
    <Description>This application shares your location with Facebook, a social network. This social network allows you to control who receives your location information.
    </Description>
  </SharesData>
  <SharesData name="BrowsingHistory" riskRating="8" fromCapability="SendBrowsingHistoryToInternet">
    <Description>This application shares your browsing history with an unknown server on the Internet. This server has not been evaluated for security or privacy practices.
    </Description>
  </SharesData>
</Privacy>
<Battery riskRating="7" backgroundCurrent="6.8 mA" foregroundCurrent="20 mA" averageCurrent="7.5 mA">
  <Description>This application uses 10% of a typical device's battery per day.</Description>
  <CPU percentage="30" riskRating="5"/>
  <Network percentage="40" riskRating="7"/>
  <GPS percentage="25" riskRating="7"/>
  <GPU percentage="5" riskRating="4"/>
</Battery>
<Performance riskRating="3">
  <Description>This application will not noticeably affect your device's performance.</Description>
  <Memory riskRating="3"/>
  <CPU riskRating="2"/>
  <IO riskRating="1"/>
</Performance>
<Security rating="6">
  <Vulnerability severity="6" type="OutOfDateLibrary" name="libpng" cve="CVE-2011-2690">
    <Description>This application contains an out of date library with a medium-severity vulnerability.
    </Description>
  </Vulnerability>
  <Vulnerability severity="5" type="DataDisclosure" name="plantext_http">
    <Description>This application transmits data to a server without encryption, making it susceptible to interception.
    </Description>
  </Vulnerability>
</Security>
<Quality riskRating="4">
```

```xml
<Description>This application occasionally crashes.
</Description>
</Quality>
<Authenticity riskRating="10">
  <Piracy likelyPirated="true" registeredAppSimilarityRating="10"/>
</Authenticity>
<Reputation>
  <Application averageUserRating="2.3" numberOfRatings="3123" popularityRating="2"/>
  <Developer piratesSoftware="true" writesMalware="false" numberOfApplications="200" averageUserRating="2.1" numberOfRatings="100121" popularityRating="4"/>
</Reputation>
</Application>
```

Reanalysis manager 1416 is responsible for determining whether and when apps in the corpus or a particular app in the apps corpus should be reanalyzed. The reanalysis manager 1416 includes scheduler 1443 and policy and signature update detector 1446. The scheduler is responsible for selecting and scheduling apps for reanalysis and, in a specific implementation, for a dynamic analysis or emulation.

As a result of the reanalysis initiated by the reanalysis manager, an app previously categorized as non-malware may be re-categorized as malware. Without undergoing reanalysis, the app may remain categorized as non-malware or may not be categorized as malware when that is not an accurate characterization of the app at the particular moment of access by a user. Unsuspecting users may then continue to have and use these now-malicious apps on their mobile devices which may ultimately wreak havoc through identity theft, loss of information, and so forth. The reanalysis feature helps to catch malware developers who evade conventional analysis techniques by publishing benign apps which pass analysis, but then become malicious through, for example, reference changes at a server or receipt of malicious instructions. A well-managed re-analysis procedure reduces the instances where this type of evasive behavior is successful.

Figure 17:
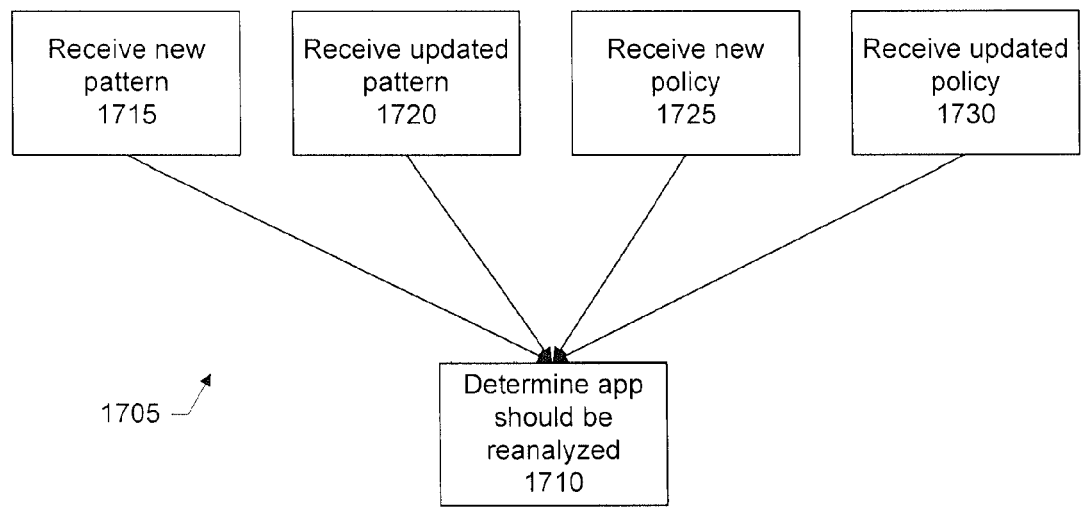
FIG. 17 is an exemplary flow diagram illustrating the steps for determining whether an application should be reanalyzed in an embodiment of the disclosure.

Policy and signature update detector 1446 can detect when a new malware signature has been created or added to signature database 1464, detect when an existing signature has been modified, edited, altered, or changed in the signature database, detect when a new policy has been created or added to policies database 1461, or detect when an existing policy has been modified, edited, altered, or changed in the policies database. The detector may poll the databases for changes, receive updates on changes via database triggers, or both. When, for example, a policy is changed or there is a new malware signature, the reanalysis manager can direct the analysis engine to reanalyze the apps corpus to generate new or updated app profiles. See FIG. 17 and accompanying description below for further details.

App tracker 1419 is responsible for storing in app tracking database 1467 records that can be used to identify a particular mobile device, and the apps installed on that particular mobile device. Such information may be gathered, with the mobile device user's consent, by a collection agent installed on the particular mobile device. Table A below shows an example of some information that may be stored in the app tracking database 1467.

TABLE A

| Mobile Device Number | Installed Apps |
|---|---|
| (415) 555-8675 | app A, app C, app K |
| (215) 555-0143 | app B, app F, app K |
| (650) 555-9843 | app A, app G, app Y |

As shown in Table A above, a first column lists contact information for a mobile device such as the mobile device telephone number. A second column lists the apps installed on the mobile device. Thus, the mobile device identified as or having the number "(415) 555-8675" includes apps A, C, and K. The mobile device having the number "(215) 555-0143" includes apps B, F, and K. The mobile device having the number "(650) 555-9843" includes apps A, G, and Y. The information shown in Table A above is merely an example of some of the information that may be stored. Other information that may be stored include mobile device type, operating system version, user notification preferences, and so forth.

The app tracker 1419 allows the system to send an alert or notification to the mobile device users if any of installed apps are found to be malicious. In some cases, the system may initially not have the app to analyze. For example, users 1335 (FIG. 13) may not have submitted the app to the system. When, however, the app is eventually submitted to the system, the system can analyze the app and, if a malware or other undesirable result is found, the system can send an alert to each user that may have that app installed on their mobile device.

An alert can be provided to both the entity (e.g., user) who submitted the app for analysis and to other entities (e.g., other users) who did not submit the app for analysis, but had the app installed on their mobile devices. For example, if the analysis engine discovers that app K is malware, the scanning API service can use the app tracking database to lookup which mobile devices have app K (i.e., mobile devices "(415) 555-8675" and "(215) 555-0143"). The system can then send alerts to these devices even if the system did not receive the app K from these devices to analyze. This proactive technique helps to provide protection benefits to many different users.

In a specific implementation a method includes storing a set of records, each record including contact information for a mobile device, and information identifying application programs installed on the mobile device. The method further includes after the storing step, receiving an application program to analyze, determining that the received application program includes malware, and transmitting an alert to each mobile device having the received application program installed on the mobile device. The contact information may be a mobile device phone number as shown in Table A above. Instead or additionally, the contact information may include an email address of a user of the mobile device or push notification identifier. The alert may be a text message, email, push notification, or any other type of notification. Notifications may be designed to be consumed by a user or administrator so they can take corrective action. A notification may also be designed to be consumed by software on a mobile device so the software can take corrective action with or without user intervention.

Reporting and callback module 1422 is responsible for reporting app analysis results data, logging the reporting in results reporting log 1458, and making callbacks if, for example, based on a reanalysis there is a change in an assessment of an attribute of an app.

Apps marketplace owners 1470 and clients 1473 can connect to the API scanning service through a network 1476 to receive apps analysis results. In various specific implementations, results are provided programmatically through an API interface 1479, an HTML status page 1482, a widget 1485, an apps marketplace widget 1488, or combinations of these.

An application programming interface (API) includes a set of rules and specifications that software programs can follow to communicate with each other. It serves as an interface between different software programs and facilitates their interaction, similar to the way the user interface facilitates interaction between humans and computers. Specifically, there may be an online apps marketplace 1490 (e.g., Android Marketplace, Apple App Store, GetJar, or Handango) executing on third party servers. The online apps marketplace accesses services and functions of the scanning API service via the programmatic interface provided by the API servers. In a specific implementation, the API is provided as part of an app marketplace owner dashboard. Through the dashboard, marketplace owners can see an app that they are being asked to distribute. Before the owner places the app on the marketplace, the owner requests an analysis of the app from the system. The system returns an assessment. Based on the assessment, the app marketplace owner may or may not decide to place the app in the marketplace.

As another example, clients such as clients 1492A and 1492B may include widget 1485 and apps marketplace widget 1488, respectively, which via API servers 1405 can programmatically access app analysis results provided by the scanning API service 1402. The widgets may be provided through a browser program at the clients. In another specific implementation, app analysis results are provided through a native application user interface or web page such as an HTML web page 1482 at a client 1492C. The web page may be provided by web servers 1407.

In a specific implementation, the API interface includes an HTTP API. In this specific implementation, a scan request is submitted e.g., POST/application_instance. The parameters may include an app download URL, app data, a scan completion callback URL, an assessment change email address, phone number, URL, or combinations of these. The app download URL or app data may be supplied in body raw or in a multi-part encoding. In some cases, an immediate scan result may be provided if such scan results are available. In a specific implementation, the system generates a first identifier for a previously submitted app based on, for example, a hash of the app data. The first identifier is associated with the scan results of the previously submitted app. Upon receipt of a newly submitted app, the system generates a second identifier for the newly submitted app by hashing the app data. The system compares the first and second identifiers. Matching identifiers can indicate that the previously submitted app and the newly submitted app are the same. The system can retrieve and immediately return the stored or cached scan results of the previously submitted app.

In other cases where the app has not already been scanned, there may be a callback after the scan finishes if the system is configured to operate asynchronously or the system may wait for the scan to finish before returning a result to the POST request if the system is configured to operate synchronously. The callback may be to a scan completion callback URL. The completion callback may be an HTTP POST to a user supplied URL that contains scan result data. The API can include the ability to get a scan result by an application identifier (such as a hash of the app data) e.g., GET/application_instance/abcdef01234567890. If scan result data is not immediately available because, for example, the app has yet to be analyzed, the system may provide status to indicate, for example, that the system is currently downloading the app for analysis, is currently analyzing the app, or both. The ability to get an app's scan result by its identifier allows the API to provide results for applications that have already been scanned without having to re-submit the app data (which may be large) every time.

In another specific implementation, an interface includes an HTML status page (e.g., /application_instances/abcdef01234567890). The status page may show scan result data. Some scan result data may be provided to users without cost or without requiring users to login. Other scan result data may be provided to users only after login or authorization. In other words, the service may have separate categories of data, such as a free and pro (or premium) and may require login for pro or premium data. Based on the analysis of the app by analysis engine 1413, the service may offer recommendations. For example, the service may offer an app or other purchase based on scan result data. For example, if scan result data of the app indicates that the app is malware, the service may offer an anti-malware app for download. If scan result data of the app indicates that the app consumes large amounts of battery power (e.g., is a battery abuser), the service may offer battery protection software. If scan result data of the app indicates that the app should be categorized as a game, the service may provide an advertisement for another game.

Figure 14B:
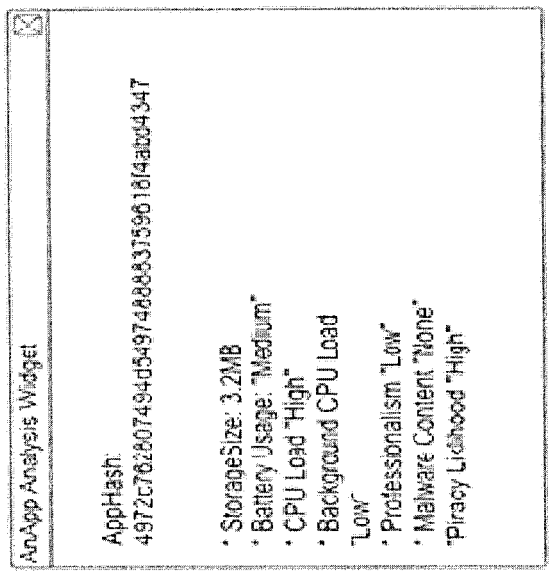
FIG. 14B shows an example of an app analysis widget.

In another specific implementation, an interface includes a widget. For example, the interface may be a web page having an integrated HTML/Javascript widget. In this specific implementation, the widget is configured to display information about a particular file hash that may be specified by a URL. A Javascript file is loaded from a URL (e.g., /application_instance/abcdef01324567890/widget) that contains the result data and code to programmatically construct the widget in the HTML pages it is loaded into. Alternatively, the result data may be provided in raw form without code to programmatically construct the widget, the calling code in the HTML page determining how to construct the widget. In either case, the browser retrieves result data associated with an application's hash or the URL where it is located and displays a widget. As an example, JSONP may be used to load the data dynamically. In another example, Javascript may dynamically augment download links (e.g., that are of a certain class being applied to links or that match a certain target URL), displaying result data about the application the link points to. In a specific implementation, the widget displays the message "Download now" and a visual representation (e.g., "Protected by Lookout"). The widget can request result data from the API (e.g., via an included Javascript file, JSONP, or just an image). If there has been no scan yet and the result data is being requested based on a target download URL, then the server may retrieve the application located at the download URL and the widget may wait for the result data to become available. A waiting indicator may show until there is a scan. FIG. 14B shows an example of an app analysis widget.

In this specific implementation, if there is a threat, the service warns a user before allowing the download by, for example, an interstitial in-window popup. This helps to offer security protection. Alternatively, clicking on the download link brings up an interface showing information about the app (e.g., permissions, security data, etc.) for a user to review. Some of the data may be "pro only" or "premium" and a user may be required to login with an account to view. Logging in may set a cookie on the user's browser so that they will see the "pro" or "premium" data across multiple download sites.

In another specific implementation, an interface includes a native mobile interface (e.g., integrated into an app store or online app marketplace). In this specific implementation, there is a UI widget that requests result data from the server or service. The server returns result data. UI widget displays result data summary (e.g., malicious/OK, or risk level). Tapping the widget displays full result information. Based on the result, the service may offer an action (e.g., purchase antivirus, purchase battery protector, purchase a related application that is better on some result such as a different calculator app that uses less private data).

Figure 15:
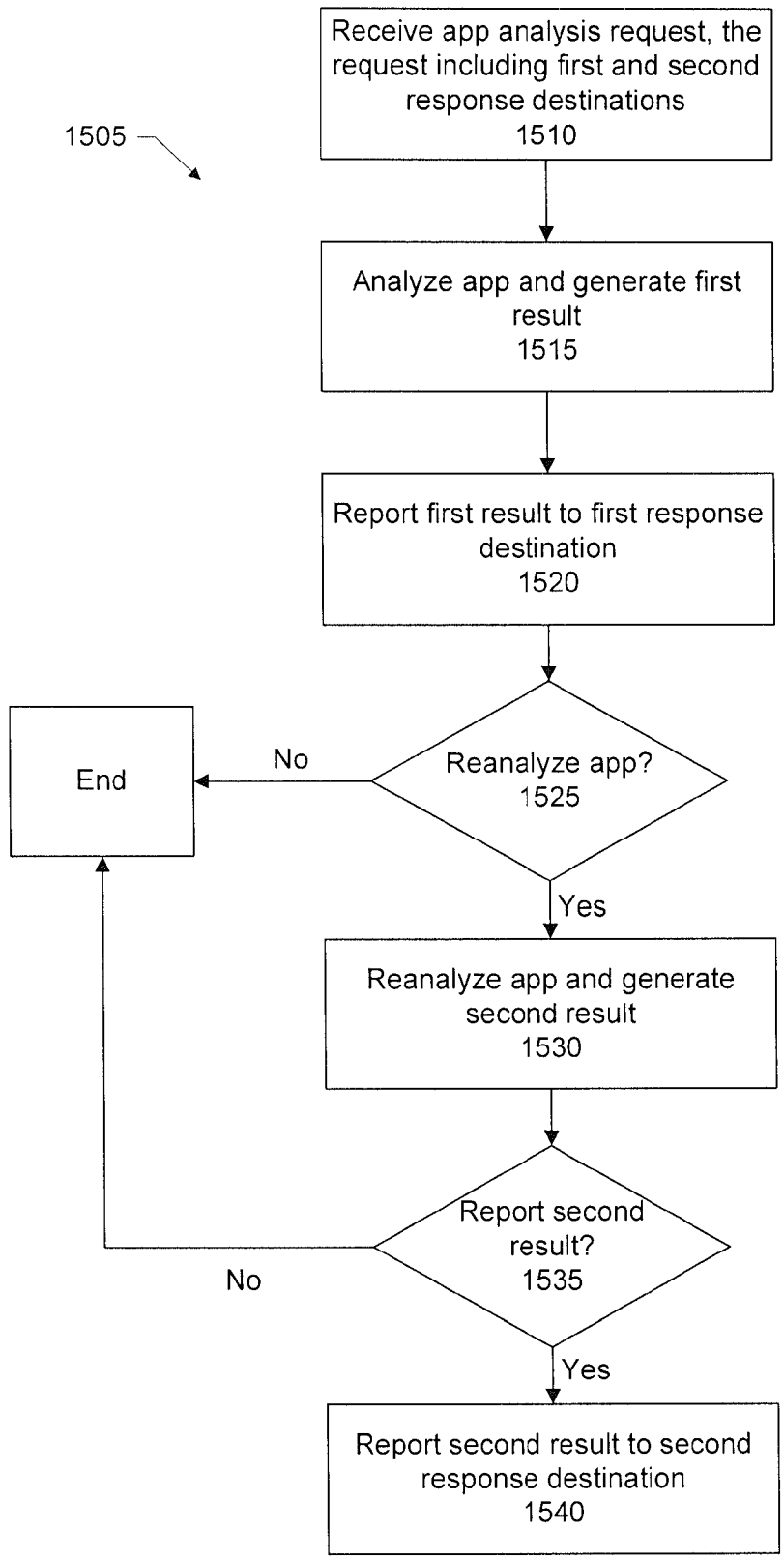
FIG. 15 is an exemplary flow diagram illustrating the steps for sending changes in assessment in an embodiment of the disclosure.

FIG. 15 shows an overall flow 1505 of an embodiment of the scanning API service. Some specific flows are presented in this application, but it should be understood that the techniques are not limited to the specific flows and steps presented. There can be additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular application or based on the data. Moreover, the functionality may also be distributed amongst hardware configurations that are different in structure from the configuration shown in the FIG. 15.

In a step 1510, the scanning API service receives a request for an analysis of an app. The request includes first and second response destinations. In a step 1515, the service analyzes the app and generates a first scan result. In a step 1520, the first scan result is reported to the first response destination specified in the request. In a specific implementation, the request is received (step 1510) before the service analyzes the app (step 1515). For example, the app may not yet be in apps corpus 1449 (FIG. 14A) for the scanning API service to analyze. In other words, in this specific implementation, after a request to analyze the app is received, the service analyzes the app.

In another specific implementation, the service analyzes the app (step 1515) before the request is received (step 1510). In other words, after the service analyzes the app, a request for an analysis of the app is received. For example, before the request to analyze is made by a user, the crawler 1325 (FIG. 13) may download the app into apps corpus 1449 for the scanning API service to analyze. This crawling allows the service to quickly return the analysis results after receiving an analysis request from a user because the app will have already been analyzed. The entity (e.g., user or requesting application) does not have to wait while the service analyzes the app because it has already done so.

An initial request for an analysis of an app may include an identifier for the app so that the app can be identified. The identifier can be any value or combination of values that helps to identify an app or distinguish one app from another app. For example, the identifier may include a package identifier or title of an app. In a specific implementation, the identifier includes a value that is a hash of the app. The value may be generated using a hash function (e.g., MD5, or SHA-1 hash function) and the app data itself may be omitted from the initial request. This allows the size of the initial request to be kept small and lightweight which can help to reduce network congestion.

The scanning API service upon receiving the initial request can use the identifier to lookup any scan result data for the app. If scan result data cannot be found (e.g., the app is not in the apps corpus), the system can include in a response to the initial request an indication for the requesting entity to supply the app or an address (e.g., URL) that identifies a location from which the service can retrieve or download the app. Thus, a request for analysis of an app may or may not include the app data or a URL where it can be downloaded from as a part of the request.

In a specific implementation, the app analysis request includes first and second response destinations. The first response destination specifies the location to which the scanning API service should return analysis results. The second response destination specifies the location to which the scanning API service should return reanalysis results (e.g., assessment changes). A response destination may include a Uniform Resource Identifier (URI), Uniform Resource Locator (URL), email address, phone number, or combinations of these. For example, a URL may reference a server that will perform actions, such as automatically removing applications identified as malware from an application market when the URL is requested. The server may be implemented in a variety of ways, including a PHP script or a Java, Ruby, or Python application server.

The first response destination may be the same or different from the second response destination. This allows the requesting entity or requester to specify the same or different destinations for receiving analysis and reanalysis results. For example, a requester's process or backend process for managing reanalysis results may be different from the process or backend process for managing first or previous analysis results. Thus, a first response destination may include a URL and the second response destination may include a phone number. A first response destination may include a first URL and the second response destination may include a second URL. The second URL may be the same or different from the first URL. In a specific embodiment the service may provide default settings for the destination information for the first response and the second response. The service may also provide as part of the user interface a series of options for delivery of the first and second responses. Alternatively (and possibly simultaneously), the system can provide the user with the capability to configure the response destination configuration for the first and second responses.

Figure 16:
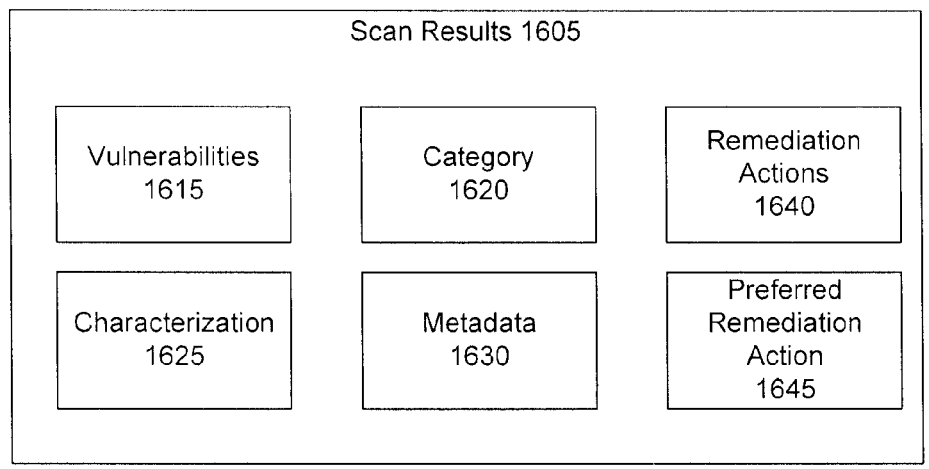
FIG. 16 is a block diagram of result types.

In step 1520, the first scan result is reported to the first response destination. As discussed above, in a specific implementation, the scan result is reported programmatically through an API to a callback URL specified in the request. In another specific implementation, the scan result is reported to a user interface such as to HTML status page 1482 (FIG. 14A). FIG. 16 shows a block diagram of various types of scan results 1605 that may be reported. A scan result may be an assessment of various attributes or properties of an app. As shown in FIG. 16, a scan result may include security issues 1615, an app category 1620, characterization 1625, and metadata 1630, a set of remediation actions 1640, or a single or preferred remediation action 1645.

In a specific implementation, the scan results are provided in an app profile. It should be appreciated, however, that a profile may not necessarily include all the scan result types shown in FIG. 16. A profile may include any combination of the scan results shown in FIG. 16. For example, a profile may include security issues 1615, and remediation actions 1640 and 1645 may be omitted from the profile. A profile may include the category 1620 that the app should belong to, and characterization 1625, metadata 1630, or both may be omitted from the profile. The amount of information present or not present in the profile may also be determined by the user's status as a subscriber or not, as a premium subscriber or not, etc.

In a specific implementation, the type of scan result provided by the scanning API service is based on factors such as whether the requesting entity is a paying or non-paying entity, whether the entity is or is not logged in, a number of previous requests made by the entity, a time of the request, the availability of the scan result data, or combinations of these. For example, an app marketplace owner who is a paying customer may receive vulnerabilities 1615 and characterization 1625. An app marketplace owner who is a non-paying customer may receive security issues, but not characterization information.

In another embodiment, the system may provide users with a certain number of complete scan results for free or without charge, provide a certain number of complete scan results for a specific time period without charge, or both. For example, an app marketplace owner who has requested less than a threshold number of requests may receive security issues 1615 and characterization 1625. An app marketplace owner who has requested more than the threshold number may receive security issues 1615, but not characterization 1625 or the more frequent user has to pay consideration for an upgrade in service. This allows the app marketplace owner to receive some trial results in order to evaluate the benefits provided by the scanning API service without making a large investment.

In some cases, such as with new apps, the system may have security issues 1615, but not characterization 1625 because characterization analysis may take longer to perform than a security analysis. So, in a specific implementation, the system may provide security issues 1615 and characterization 1625 separately. A benefit of this feature is that the requester does not have to wait for the characterization to be completed in order to receive the vulnerabilities. For example, security issues may be provided while app characterization system is analyzing behavioral data. Thus, characterization may be provided after security issues are provided. Characterization may be provided in a transmission or operation separate from the security issues. The characterization may be provided via a callback URL specified in the request. A requesting entity may receive security issues before receiving characterization. That is, the requesting entity may receive characterization 1625 after security issues 1615 have been received.

Security issues 1615 may include an identification of the security issues, a number of the security issues, coding flaws, a number of coding flaws, or combinations of these. In a specific implementation, characterization system 1428 provides a list of the app's permissions. Specifically, some apps such as Android apps can access features or data on a mobile device by declaring certain permissions. For example, an Android app that monitors incoming SMS messages would specify:

```
<manifest xmlns:android="http://schemas.android.com/apk/res/android"
    package="com.android.app.myapp" >
    <uses-permission android:name=
    "android.permission.RECEIVE_SMS" />
    ...
</manifest>
```

As other examples: "android.permission.ACCESS_FINE_LOCATION" allows an application to access fine (e.g., GPS) location, "CALL_PHONE" allows an application to initiate a phone call without going through the Dialer user interface for the user to confirm the call being placed, "READ_CONTACTS" allows an application to read the user's contacts data—just to name a few examples. The Android Developers Reference for Android 3.2 r1, Sep. 22, 2011, available at <http://developer.android.com/reference/android/Manifest.permission.html>, which is incorporated by reference, includes an extensive list of permissions which the scanning API service may identify when analyzing an Android app.

Characterization 1625, as previously discussed, includes an analysis of app behavioral data such as measurements of app battery consumption, network consumption, and so forth.

Category 1620, as previously discussed, indicates the category in which the app should be placed in (e.g., game, news, weather, social networking, pornographic, mapping, file sharing, and so forth). In a specific implementation, a scan result includes categorization for the app such as contains a particular ad network or uses a particular analytics system. Third party ad networks and analytics systems provide features which app developers may integrate into their apps. An app having integrated ad network features may display advertisements such as text and image ads inside the app (e.g., in-app advertising).

The app developer may receive compensation or payment for including ad network features in the app. Some examples of ad networks include Madvertise, BuzzCity, Adfonic, Admoda/Adultmoda, Mojiva, InMobi, AdMob, Hunt Mobile Ads, Millennial Media, Greystripe, Madhouse, Jumptap, Mobile Theory, YOC Group, Hands, NAVTEQ Media Solutions, Microsoft Mobile Advertising, Advertising.com/AOL, and many others. Analytics systems can track how the app is being used such as how long, when, and where the user used the app. These are merely a few examples of some of the metrics that an app using an analytics system may collect. App users may be concerned about the privacy issues related to advertising and tracking of consumer data through such mobile applications. Some ad networks and analytics systems may gather more detailed and personal information than others. Thus, it is desirable to identify, if any, which ad network, analytic system, or both an app uses.

Metadata 1630, as previously discussed, may include an identification of other places (e.g., other online marketplaces) where the app is available, app distribution data such as popularity and ratings, authorship information, the cost of an app, the cost of an app in a particular marketplace, or combinations of these.

Remediation actions 1640, as previously discussed, may include dynamic network protection data (e.g., block these hosts or IPs), information about how to block the app (e.g., signatures), or both. In a specific implementation, a result includes two or more remediation actions. For example, if there are multiple options, the system can transmit all of the options with the API consumer determining which to use. In another specific implementation, a result includes a single or preferred remediation action 1645. That is, the system can determine which to send to the API consumer (sending only a preferred remediation action). For example, a system may look up a classification for the user and phone trying to load an application in a central database. The system may choose a block remediation action if the user is classified as a juvenile and a user warning otherwise. That is, the type of remediation action provided may be based on a user profile. For example, in a specific implementation, an app is analyzed and a determination is made to provide a remediation action based on the analysis. If a user profile of a user of the app indicates the user's age is less than a threshold age, a first remediation action is provided. If the user profile indicates the user's age is greater than the threshold age, a second remediation action is provided, different from the first remediation action. The user profile may be stored at the mobile device or at a location remote from the mobile device such as at a server of the system.

In a specific implementation, an app analysis result includes an overall severity or security assessment. For example, the "safeness" of an app may be ranked along a safety or severity scale. A rating of 1 on the scale may indicate that the app is very safe. A rating of 10 on the scale may indicate that the app is very dangerous (e.g., is malware). Thus, in this example, the "safeness" of the app may range from 1 to 10. A benefit of the scale is that the system can provide more accurate or detailed assessments as compared to a binary assessment where an application is considered either safe or not safe. That is, the scale can reflect that some apps may be more malicious than other apps. For example, an app that transmits a user's passwords may be considered more malicious than an app that deletes directory information. In another specific implementation, however, the system provides binary assessments because in other cases users may prefer simple or "yes/no" type answers (e.g., is this application safe or not?).

Referring now to FIG. 15, in step 1525, the scanning API service determines whether apps in the corpus or a particular app in the corpus should be reanalyzed. In a specific implementation, as shown in a flow 1705 of FIG. 17, a determination 1710 that an app should be reanalyzed is based on factors including receiving a new malware signature 1715, receiving an updated malware signature 1720, receiving a new policy 1725, receiving an updated policy 1730, or combinations of these. In a specific implementation, the app that is reanalyzed (step 1530) is the same app that was initially analyzed (step 1515). That is, the app referred to in step 1515 is the same app (or application binary) referred to in step 1530 rather than the app being a modified version. In this specific implementation, determining whether or not to reanalyze the app is based on factors that are external to or independent of the application code. In another specific implementation, reanalysis of the app (step 1530) is based on the app being a modified version of the app initially analyzed (step 1515).

As described in the discussion accompanying FIG. 14A, a malware signature can be used to identify malicious application code. Security analyzer 1428 can include a malware scanner to scan an app and compare code in the app against the malware signature. A string of bits or binary pattern found in the code that matches a pattern in the malware signature may indicate that the app includes malware. A signature may be updated, a new signature may be created, or both as new malware is discovered. Reanalyzing the apps corpus when there is an updated or new pattern helps to ensure that apps in the corpus are properly classified based on the latest malware information.

A policy can include one or more rules which specify how an app should be categorized, how an app should be characterized, or both. For example, a policy on battery characterization can specify that apps having a battery usage rate or consumption greater than a threshold value should be characterized as having heavy battery usage requirements. In some cases, such a policy may be updated. For example, it may be desirable to change the threshold value at which app is characterized as having heavy battery usage requirements because of improvements in battery capacity and technology. When the policy is updated, the reanalysis manager may direct the analysis engine to reanalyze the apps in the corpus so that the battery characterizations for the apps may be updated in accordance with the updated policy. A policy can be an arbitrary model, created by a human, or as a result of a machine learning system.

Based on the determination in step 1525, in step 1530, the app is reanalyzed and a second scan result is generated. In step 1535, the system determines whether the second scan result should be reported. In some cases, the second scan result is reported (step 1540). In other cases, the second scan result is not reported. For example, if the second scan result is the same as the first scan result, the second scan result may not be reported because there has not been any change. Alternatively, the second scan result may be reported even if the scan results are the same so that the app analysis requestor can receive a status update that there has been no change in assessment.

If the second scan result is different from the first scan result, the second scan result may or may not be reported. For example, if the difference between the first and second scan results is minor (e.g., a minor change in an app's battery usage), the second scan result may not be reported. If however, the difference between the first and second scan results is significant (e.g., first scan result indicated app does not include malware, second scan result indicates app includes malware), the second scan result may be reported.

More particularly, in a specific implementation, the system makes and reports a first assessment of an attribute associated with an app. The attribute may include application data such as behavioral data discussed above. The system reanalyzes the app and makes a second assessment of the attribute. Based on a difference between the second and first assessments, a type of the attribute, or both the second assessment is or is not reported.

For example, in a specific implementation, the type of attribute indicates whether the app is or is not malware, the first assessment of the attribute indicates the app is not malware, and the second assessment indicates the app is malware. In this specific implementation, the second assessment is reported.

In another specific implementation, the type of attribute is battery usage, the first assessment of the attribute indicates a first battery usage rate. The second assessment indicates a second battery usage rate. If the difference or absolute difference between the second and first battery usage rates is less than a threshold value, the second assessment is not reported. If the difference is greater than the threshold value, the second assessment is reported.

In another specific implementation, the type of attribute is vulnerabilities, the first assessment of the attribute indicates a first set of vulnerabilities. The second assessment indicates a second set of vulnerabilities. At least one vulnerability in the second set is not in the first set, the at least one vulnerability being a new vulnerability. The second assessment is reported.

As shown in step 1540, the system can send changed assessment results to the second response destination specified in the request. As previously discussed, the second response destination may be the same or different from the first response destination. In a specific implementation, a request includes two or more second response destinations. The system selects which of the two or more second response destinations to send the result based on the severity of the change in assessment. For example, if the change includes finding a new vulnerability in the app, a selected second response destination may be an email. If, however, the change includes finding malware in the app, a selected second response destination may be a phone call, SMS message, email, URL callback, or combinations of these. This type of notification scheme helps to provide, for example, immediate notification of critical security issues so that administrators can respond to the critical security issues first before addressing less critical security issues.

Thus, if the analysis process changes because there is a new heuristic, a new set of signatures, policy changes, or combinations of these the system can reprocess the entire apps corpus, look for any changes in assessment, and notify publishers if the assessment on something changes. For example, heuristics, signatures and policy changes may be added to the system by the organization maintaining the system. The system can be configured to rescan the corpus manually at operator request or to trigger the rescan whenever the heuristics, signatures or policies change. The re-scan may or may not depend on user profile.

Figure 18:
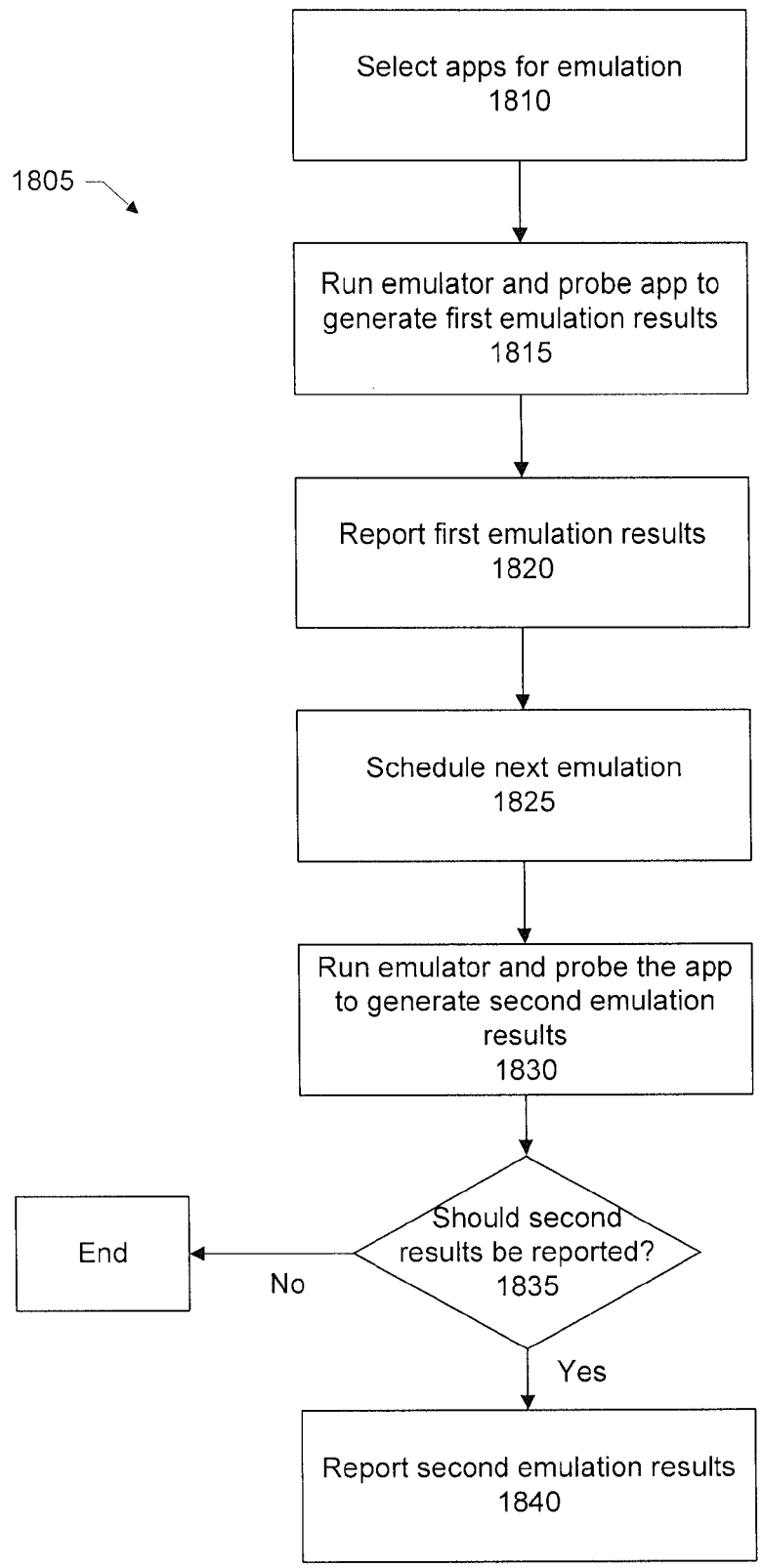
FIG. 18 is an exemplary flow diagram illustrating the steps for application emulation in an embodiment of the disclosure.

FIG. 18 shows a flow 1805 for analyzing apps in emulator 1432 (FIG. 14A), a process that may be referred to as dynamic analysis. As previously discussed, during emulation, the app can be probed and its operations can be monitored. Emulation can be beneficial in cases where an app includes a reference to a server which controls the functionality of the app. In some cases, a change at the server can cause the app to perform undesirable operations, e.g., send spam to all contacts in directory. As another example, a benign app may be designed to receive malicious instructions that cause the app to perform undesirable operations. By monitoring applications over time, an adverse application that manifests itself after a period of time can be detected.

In a step 1810, the system selects one or more apps from the apps corpus for emulation. In a step 1815, the emulator is run and the one or more apps are probed to generate first emulation results. Emulation durations may vary greatly depending on factors such as the particular app attribute or time-based attribute being assessed, the complexity of the app, and so forth. Generally, longer durations can provide more accurate results, but it is also desirable to provide results as soon as possible. Durations for which a particular app may be run within the emulator can range from about a few minutes to a few hours, including, for example, 1, 2, 3, 4, 5, 10, or 24 minutes or 1, 2, 3, 4, or 5 hours. In some cases the duration may be less than 1 minute or greater than 5 hours.

In a step 1820, the system reports the first emulation results. In a step 1825, a next or subsequent emulation is scheduled. In a step 1830, the emulator is rerun and at least a subset of the one or more apps is probed to generate second emulation results. In a step 1835, the system determines whether the second emulation results should be reported. Based on the determination, in a step 1840, the second emulation results are reported.

In a specific implementation, emulation is a subprocess of the app analysis and result reporting shown in FIG. 15 and described in the discussion accompanying FIG. 15. For example, analyzing the app (step 1515) may include probing the app in the emulator. Reporting first results to the first response destination (step 1520) may include reporting the first emulation results to the first response destination. Determining whether second results should be reported (step 1535) may include determining whether second emulation results should be reported. In another specific implementation, the emulation results or output from the emulator is provided as input to app characterization system 1431.

Selecting and scheduling apps for emulation may be based on factors, rules or policies including application or characterization data such as app functionality, behavior, reputation, capabilities, app popularity, app release date, or combinations of these. For example, apps having lower trust ratings than other apps may be selected over the other apps for emulation or may be scheduled for more frequent emulations than the other apps. Apps that are more popular than other apps may be selected over other apps that are less popular. Apps having later release dates may be selected over other apps that have earlier release dates or vice versa (e.g., exponential decay: when an app is initially released there may be frequent reanalyses, but as the time from the release date grows longer, the frequency of the reanalyses decreases). Apps having more extensive or dangerous permissions may be selected over other apps having less extensive or dangerous permissions. Emulations may be scheduled, for example, hourly, daily, or weekly.

Figure 19:
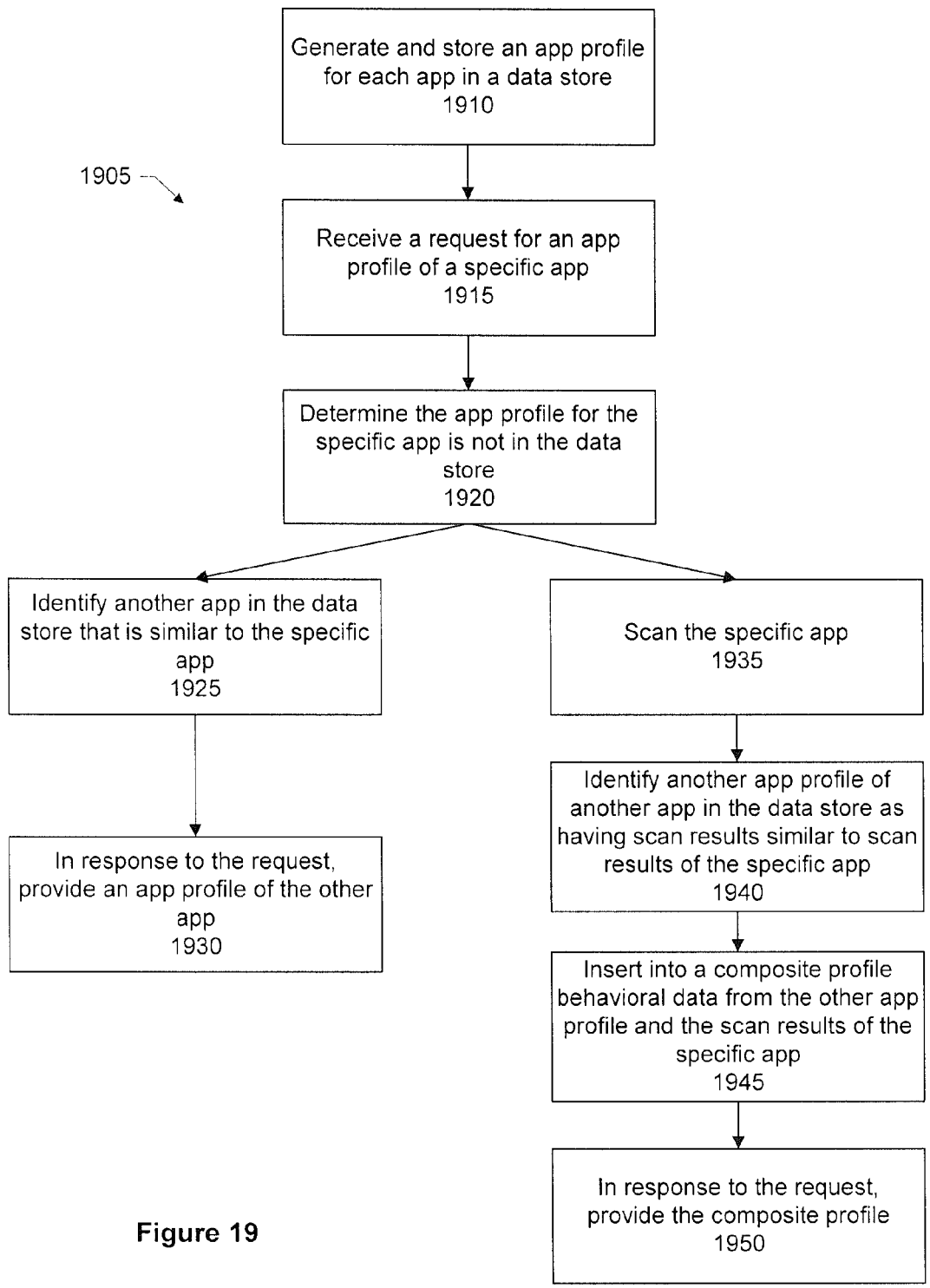
FIG. 19 is an exemplary flow diagram illustrating the steps for providing a substitute application profile.

FIG. 19 shows a flow 1905 of a specific implementation for providing a substitute app profile if the specifically requested app profile is not in app profile database 1455. In a step 1910, the system generates and stores an app profile for each app in the apps corpus. Generating the app profiles may include analyzing the apps using analysis engine 1413 (FIG. 14A). In a step 1915, the system receives a request for an app profile of a specific app. The request may be received in a manner similar to receiving an app analysis request (step 1510—FIG. 15).

In a step 1920, the system determines that the app profile for the specific app is not in the app profile database. In this specific implementation, the system can return a substitute app profile. The substitute app profile may be the profile of a similar or related app (see steps 1925-1930) or a composite profile (see steps 1935-1950). Returning a substitute app profile provides the requester with at least some relevant information concerning the specific app. If some information about the specific app is available, but other information is not available, the unavailable information may be drawn from a substitute app profile to form a composite app profile. If no relevant information about the specific app is available a substitute app profile may be returned.

Referring to the flow in steps 1925-1930, in a step 1925 the system may identify another app in the app data store that is similar to the specific app. Any suitable technique may be used for determining similarity. In a specific implementation, the system compares the app signer and package of the specific app with the app signer and package of one or more other apps. In this specific implementation, if the signers and packages match, the system determines that the apps are similar even though the apps may be of different versions. Below is an example for correlating apps based on signer and package.

TABLE B

| Application | Signer | Package | Version |
|---|---|---|---|
| App A | Cindy | Pkg5 | 3.0 |
| App B | Ben | Pkg1 | 2.6 |
| App C | Joe | Pkg6 | 2.0 |
| App B' | Ben | Pkg1 | 2.7 |

The above table shows a few entries of app data from apps profiles database 1455. To simplify explanation, only a selected subset of data fields in each entry is shown in the table. Given a specific app "App E" having a signer "Ben" and package "Pkg1" the system can correlate App E to Apps B and B' based on each app having the same signer and package. In this example, related Apps B and B' are of different versions. In a specific implementation, the system selects the highest or latest version of a related app that has the desirable profile information. This helps to ensure that the system provides the most up-to-date profile information available. In this example, the profile for related App B' would be provided in response to the request for the App E profile (step 1930).

In another specific implementation, the system performs a content similarity analysis to determine how similar or the degree of similarity between the contents of the two files (i.e., the specific app and the other app). In a specific implementation, content similarity is based on a static code analysis to determine program similarity.

In another specific implementation, another app is related to the specific app if both apps are the same with different packaging (e.g., Amazon DRM, or resigned app), or apps correlated to malware but not actually malicious themselves. The system can compare the specific app with a first app in the apps corpus and determine that both apps are the same even if one of the specific app or first app has been packaged with a particular app packaging tool and the other of the specific or first app has not been packaged with the tool. A package may include a license, license text to explain to a user the purpose of the license, digital rights management (DRM) objects such as controls, controllers, protectors, encryption, app usage rules or conditions, installer, publisher name, signature, and the like. Different packaging may refer to different types of installers, different publisher names, different signatures, or combinations of these.

A technique to determine relatedness may include correlation of publisher, authorship, publisher accounts, signing keys, or combinations of these. The system may compare the publisher of the specific app with the publishers of other apps in the apps corpus to determine whether there is a match. This can help to inform the results returned for the specific app. For example, there may be a case where although the specific app does not include malware, that other apps from the same publisher do include malware. The system may advise that caution be used when providing or downloading the specific app.

More particularly, in some cases, the system will provide an app profile of a related app even if there is an app profile for the specific app. The app profile of the related app may be provided in addition to or instead of the app profile for the specific app. One example of a scenario where this may occur is if the specific app is correlated to known bad apps (e.g., malware). An app may be suspect if it is correlated to known bad apps. Consider the following example, a specific app is not malware, but there is an app classified as malware that is from the same developer as the specific app. In this case, the specific app may be suspect because although it may not be classified as malware, it is from a developer who has published malware in the past. It may then be desirable to provide the app profile of the related app that is malware, a warning notification that the specific app is from a developer known for publishing malware, or both. Thus, in a specific implementation, the system may determine that although two apps are not similar, the two apps are related because they are from the same developer (or signer or publisher) where one of the apps is malware.

In a step 1930, in response to the request for the app profile of the specific app (step 1915), the system provides the app profile of the other app that is similar or related to the specific app.

Referring now to steps 1935-1950, if the app profile of the specific app is not in the app profile database or the app's profile does not contain all of the required information, the system may instead or additionally provide a composite profile. More particularly, in a step 1935, the system scans the specific app and generates scan results. For example, an analysis of the app may include scanning the app using a malware scanner of security analyzer 1428. The system compares the scan results of the specific app with scan results of one or more other apps in the apps corpus. In a step 1940, based on the comparison, the system may identify another app profile of another app in the apps corpus as having scan results similar to the scan results of the specific app. In a specific implementation, the system compares the sequence of computer calls each app program can make. If the sequences are similar enough (e.g., there is a high degree of similarity), the system may decide that the two apps are similar.

A determination of similarity may be based on results from security analyzer 1428. Instead or additionally, a determination of similarity may be based on one or more other analysis components of analysis engine 1413. In a specific implementation, there is a model to determine comparable apps. Inputs to the model can include any number of measurements such as popularity, price, size, and so forth. Below is a list of some of the inputs or factors that may be used by the model to determine whether an app is comparable (e.g., similar or related to another app).

(1) Popularity: App popularity may be based on third party ratings (e.g., Nielsen ratings), a number of "Likes" (e.g., "thumbs up"), a number of "Dislikes" (e.g., "thumbs down"), a number of app downloads, or combinations of these. Apps having similar popularity ratings may be determined to be comparable.

(2) Price: Apps having similar prices may be determined to be comparable.

(3) Size: Apps having similar sizes (e.g., similar number of megabytes) may be determined to be comparable.

(4) Signer, developer, publisher: Apps having the same signer, developer, or publisher may be determined to be comparable.

(5) App content: Apps having similar content may be determined to be comparable.

(6) App packaging: Apps having similar packaging may be determined to be comparable.

(7) App title and description (e.g., metadata): Apps having similar titles, descriptions, or both may be determined to be comparable.

(8) Scan results data: Apps having similar scan results data may be determined to be comparable.

In a step 1945, the system inserts into a composite app profile usage analysis results (e.g., behavioral data or other characterization data) from the other app profile and scan results of the specific app. That is, the composite app profile includes scan results of the specific app and usage analysis results of the other app. In a step 1950, in response to the request, the system provides the composite app profile.

Thus, a scan result for an app may draw information from other apps in the app corpus. For example, the system may receive an analysis request for version 2.0 of a particular app. Version 2.0 may have just been recently released so the system may not have app behavioral data such as the battery impact or usage requirements of version 2.0. The system, however, may have the battery usage requirements for version 1.0 of the particular app. The system can determine that versions 1.0 and 2.0 are similar and return scan results for version 1.0 (e.g., battery usage requirements for version 1.0).

As another example, scan results for other apps in the app corpus can inform the results for a particular app. More particularly, in a specific implementation, a technique to determine whether a particular app is pirated includes receiving a request for an analysis of the particular app, the request including an indication that the particular app is free or is without cost. The system examines the corpus and determines that another app is the same as the particular app. The other app is available in a marketplace different from a marketplace of the particular app, and is not free. That is, a user is required to submit a payment in order to use the other app. The system determines that that particular app is pirated.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method comprising:
  receiving, by an Application Programming Interface (API) operating on a server, a request for an analysis of an application;
  downloading the application to be analyzed from an application source accessible to the server into a data store accessible to the server;
  analyzing, at the server, the application;
  returning, to a client device, a first result based on the analysis including a first assessment of an attribute associated with the analyzed application;
  after the returning a first result, determining, at the server, whether the analyzed application should be reanalyzed, the determining being based on at least one of a change in or an addition of policies stored on one or more databases accessible to the server;
  reanalyzing, at the server, the analyzed application upon determining that the analyzed application should be reanalyzed;
  based on the reanalysis, returning, to the client device, a second result including a second assessment of the attribute and at least one of a plurality of remediation instructions to be performed at the client device, wherein the second assessment is different from the first assessment; and
  receiving, at the server, confirmation from the client device that the at least one of a plurality of remediation instructions was performed and an indication whether remediation was successful or not.

2. The method of claim 1 wherein the determination that the application should be reanalyzed is determined without having received at the API a request to reanalyze the analyzed application.

3. The method of claim 1 wherein the analyzing the application is performed before the receiving, by an Application Programming Interface (API), a request for an analysis of an application.

4. The method of claim 1 wherein the analyzing the application is performed after the receiving, by an Application Programming Interface (API), a request for an analysis of an application.

5. The method of claim 1 wherein the step of based on the reanalysis, returning a second result includes:
  sending, from the server, a notification to an address specified in the request.

6. The method of claim 5 wherein the address comprises an email address.

7. The method of claim 5 wherein the address comprises a Uniform Resource Locator (URL).

8. The method of claim 1 wherein the request for the analysis of the application includes the application.

9. The method of claim 1 wherein the request for the analysis of the application does not include the application.

10. The method of claim 1 wherein downloading the application to be analyzed from the application source accessible to the server comprises downloading the application to be analyzed from the client device, the method further comprising storing the received application in the data store accessible to the server.

11. The method of claim 1 wherein downloading the application to be analyzed from the application source accessible to the server comprises crawling, at the server, a website to download the application to be analyzed into a data store accessible to the server.

12. The method of claim 1 wherein the first result includes an indication that the analyzed application should be associated with a first category.

13. The method of claim 1 wherein the first result includes an identification of an ad network used by the analyzed application.

14. The method of claim 1 wherein the first result includes an identification of an analytics system used by the analyzed application.

15. The method of claim 1 wherein the change in policies stored on the one or more databases includes a modification to at least one of the policies existing on the one or more databases accessible to the server.

16. The method of claim 1 wherein the determining whether the analyzed application should be reanalyzed is further based on at least one of a change in or an addition of malware signatures stored on the one or more databases accessible to the server.

17. The method of claim 16 wherein the malware signatures residing on the one or more databases accessible to the server are hashes.

18. A method comprising:
  receiving, by an Application Programming Interface (API) operating on a server, a request for an analysis of an application;
  analyzing, at the server, the application;
  returning, to a client device, a first result based on the analysis including a first assessment of an attribute associated with the analyzed application;
  after the returning a first result, polling, at the server, one or more databases for additions or changes to policies and malware signatures residing on the one or more databases accessible to the server;
  when at least one of an addition or a change to the policies is detected by the polling, reanalyzing, at the server, the analyzed application;
  based on the reanalysis, returning, to the client device, a second result including a second assessment of the attribute and at least one of a plurality of remediation instructions to be performed at the client device, wherein the second assessment is different from the first assessment; and
  receiving, at the server, confirmation from the client device that the at least one of a plurality of remediation instructions was performed and an indication whether remediation was successful or not.

19. The method of claim 18 wherein the change to the policies and the malware signatures residing on the one or more databases accessible to the server includes a modification to at least one of the policies or the malware signatures existing on the one or more databases accessible to the server.

20. The method of claim 18 wherein the malware signatures residing on the one or more databases accessible to the server are hashes.

\* \* \* \* \*